United States Patent [19]
Bliven et al.

[11] Patent Number: 5,111,497
[45] Date of Patent: May 5, 1992

[54] ALARM AND TEST SYSTEM FOR A DIGITAL ADDED MAIN LINE

[75] Inventors: David C. Bliven, San Jose; Anthony Vranicar, Santa Clara; Philip B. Vail, San Leandro; Gerald L. Shimirak, Danville, all of Calif.; Julian S. Mullaney, Raleigh, N.C.

[73] Assignee: Raychem Corporation, Menlo Park, Calif.

[21] Appl. No.: 584,325

[22] Filed: Sep. 17, 1990

[51] Int. Cl.[5] .......... H04B 3/46; H04M 1/24; H04M 9/00; H01R 13/44

[52] U.S. Cl. .......... 379/27; 379/442; 379/451; 379/29; 370/14; 361/356

[58] Field of Search .......... 379/27, 29, 442, 451, 379/453, 457; 370/14; 361/356, 391, 390, 393, 419

[56] References Cited

U.S. PATENT DOCUMENTS

| | | | |
|---|---|---|---|
| 3,922,493 | 11/1975 | Brenig et al. | 179/15 AP |
| 4,046,964 | 9/1977 | Daugherty et al. | 179/15 BF |
| 4,270,030 | 5/1981 | Brolin et al. | 179/175.2 D |
| 4,380,810 | 4/1983 | Canniff | 370/15 |
| 4,393,491 | 7/1983 | Ashlock et al. | 370/13 |
| 4,417,333 | 11/1983 | Cochennec | 370/66 |
| 4,430,530 | 2/1984 | Kandell et al. | 179/175.2 D |
| 4,748,651 | 5/1988 | Collins et al. | 379/27 X |
| 4,788,680 | 11/1988 | Kikuchi et al. | 370/68 |
| 4,924,489 | 5/1990 | Lawrence et al. | 379/29 X |
| 4,924,492 | 5/1990 | Gitlin et al. | 378/93 |
| 4,979,209 | 12/1990 | Collins et al. | 379/442 X |

FOREIGN PATENT DOCUMENTS 0370423  5/1990  European Pat. Off.

OTHER PUBLICATIONS

"Requirements and Objectives for Digital Added Main Line (DAML)," Pacific Bell PUB L-780057-PB/NB, Issue 1, May 1989.

"Requirements for Compatibility of Telecommunications Equipment with Bell Systems Surveillance and Control Systems," Bell System Technical Reference PUB-49001, Jul. 1982.

"Interface Between Loop Carrier Systems and Loop Testing Systems," Bell Communications Research Technical Reference TR-TSY-000465, Issue 2, Apr. 1987.

Optilink Corporation, "PAIRSPAN-2 Digital Subscriber Carrier System Product Line Description," Jul. 20, 1989.

Optilink Corporation, "Pairspan-2 Two-Line Digital Carrier System," 1989.

Pacific Bell Request for Quote, Jun. 14, 1989.

Kaiser et al., "Digital Two-Wire Local Connection Providing Office Subscribers with Speech, Data and New Teleinformation Services," ISSLS, Mar. 20-24, 1978.

Letter from David C. Bliven to Nynex Material Enterprises dated Jan. 23, 1989 (with Request for Quote).

Wheelock, Inc. advertising materials for "DAM-L-100".

Pair Gain Technologies, Inc. advertising materials for "Pairgain2 Digital Pair Saver".

Memo from Giorgio Anania to Vern Norviel dated Oct. 19, 1990.

Keptel, Inc. "SNI-2100/2200 Network Interface System Installation Data," Jul. 1987.

Raychem Corporation advertising brochure for "Miniplex Two-In-One Digital Subscriber Multiplexer," Apr. 21, 1990.

Graybar Elec. Co. sales material (transmitted May 30, 1991).

*Primary Examiner*—Stafford D. Schreyer
*Attorney, Agent, or Firm*—Vern Norviel; Herbert G. Burkard; A. Stephen Zavell

[57] ABSTRACT

A test system directed to apparatus for transmitting and receiving multiple telephone transmission signals over a single twisted pair. The system converts an analog signal from a local switching station to an 80 ksymbols/sec signal for transmission over a twisted pair by a line card. A remote terminal converts the 80 ksymbols/sec signal back into a conventional analog signal for use in conventional telephone, facsimile or other related equipment. The test equipment separately tests the entire system, the line card portion of the system, the remote terminal portion of the system, and the twisted pair.

71 Claims, 32 Drawing Sheets

Microfiche Appendix Included
(10 Microfiche, 819 Pages)

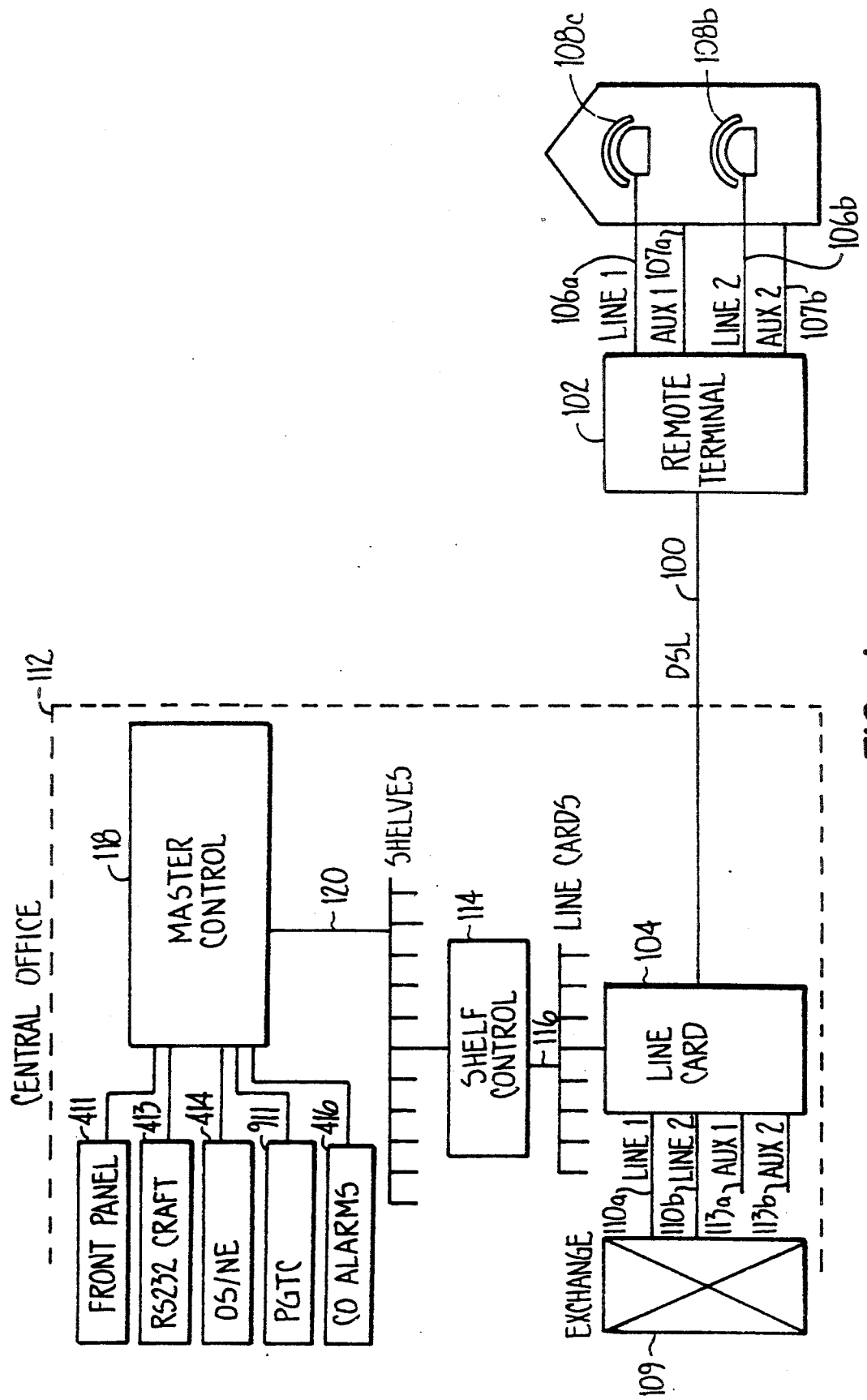
FIG._1.

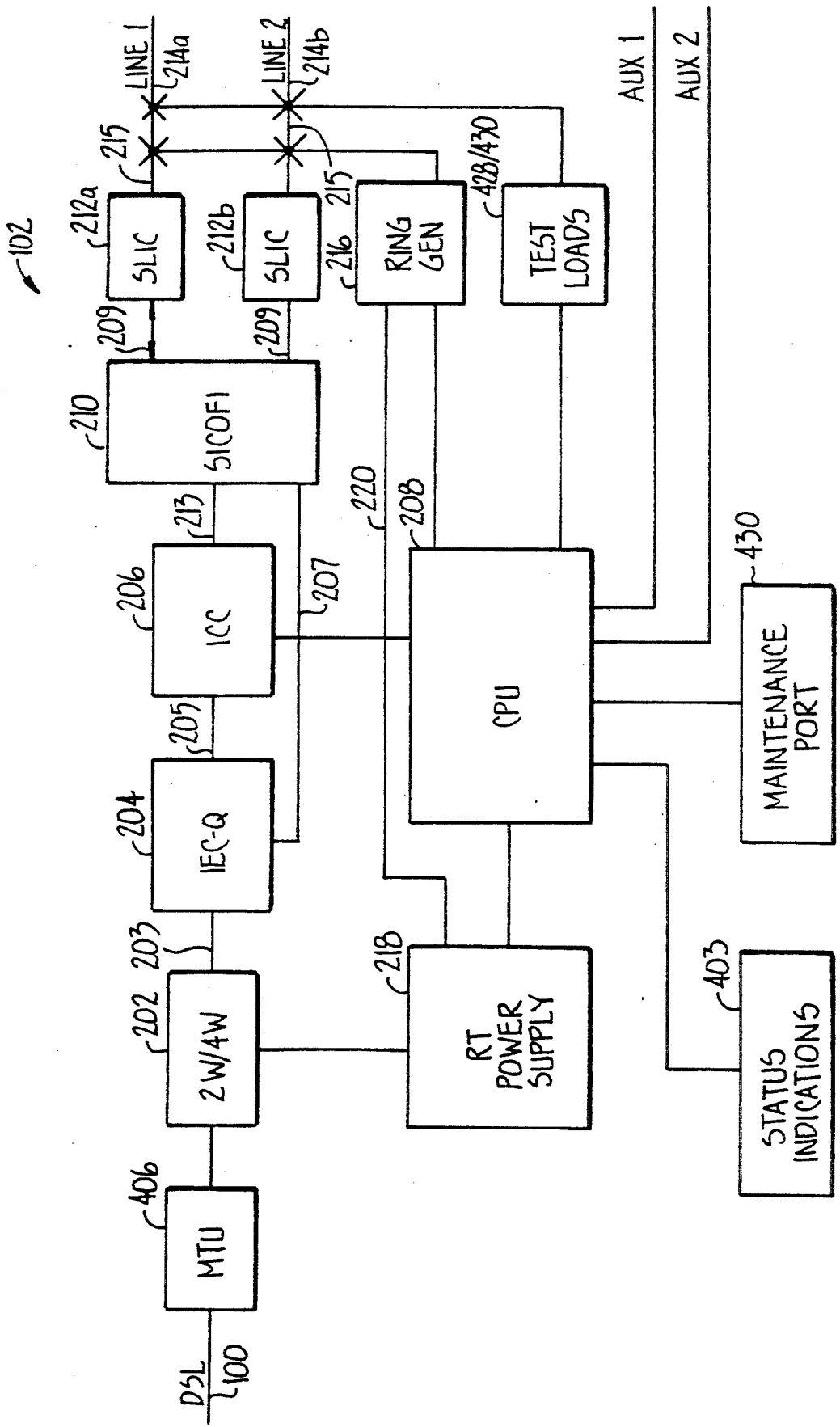
FIG._2.

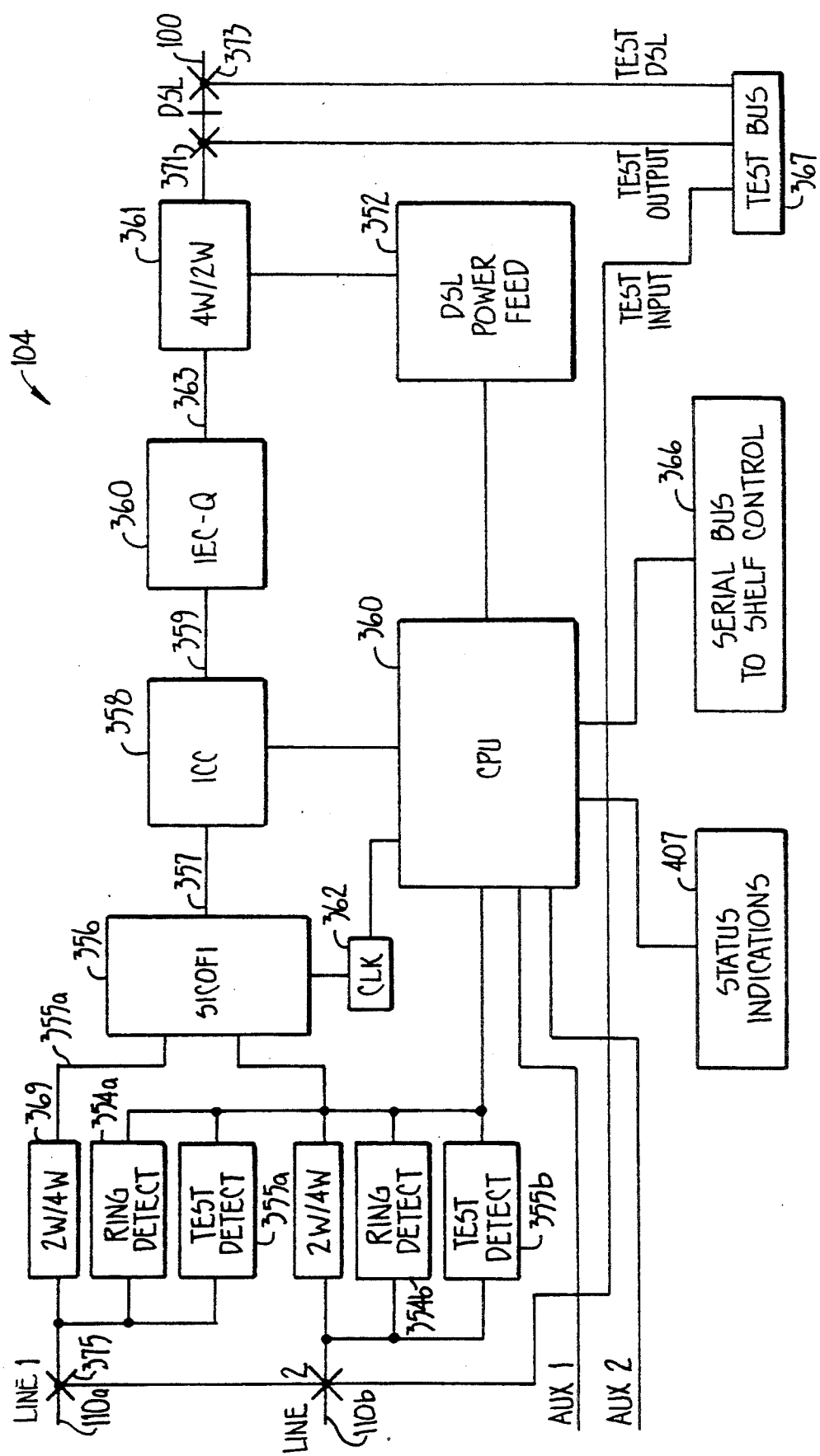
FIG._3.

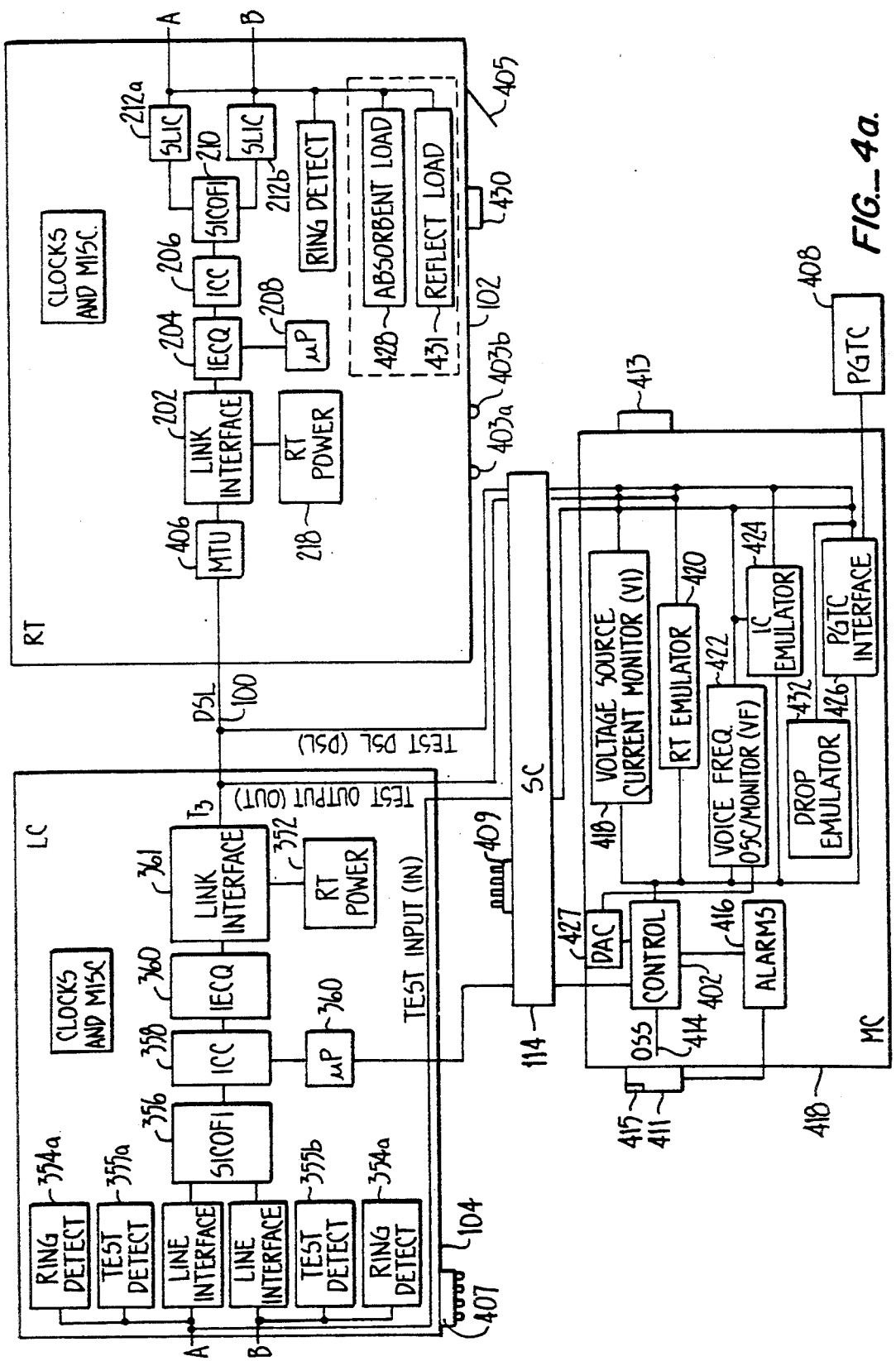
FIG._4a.

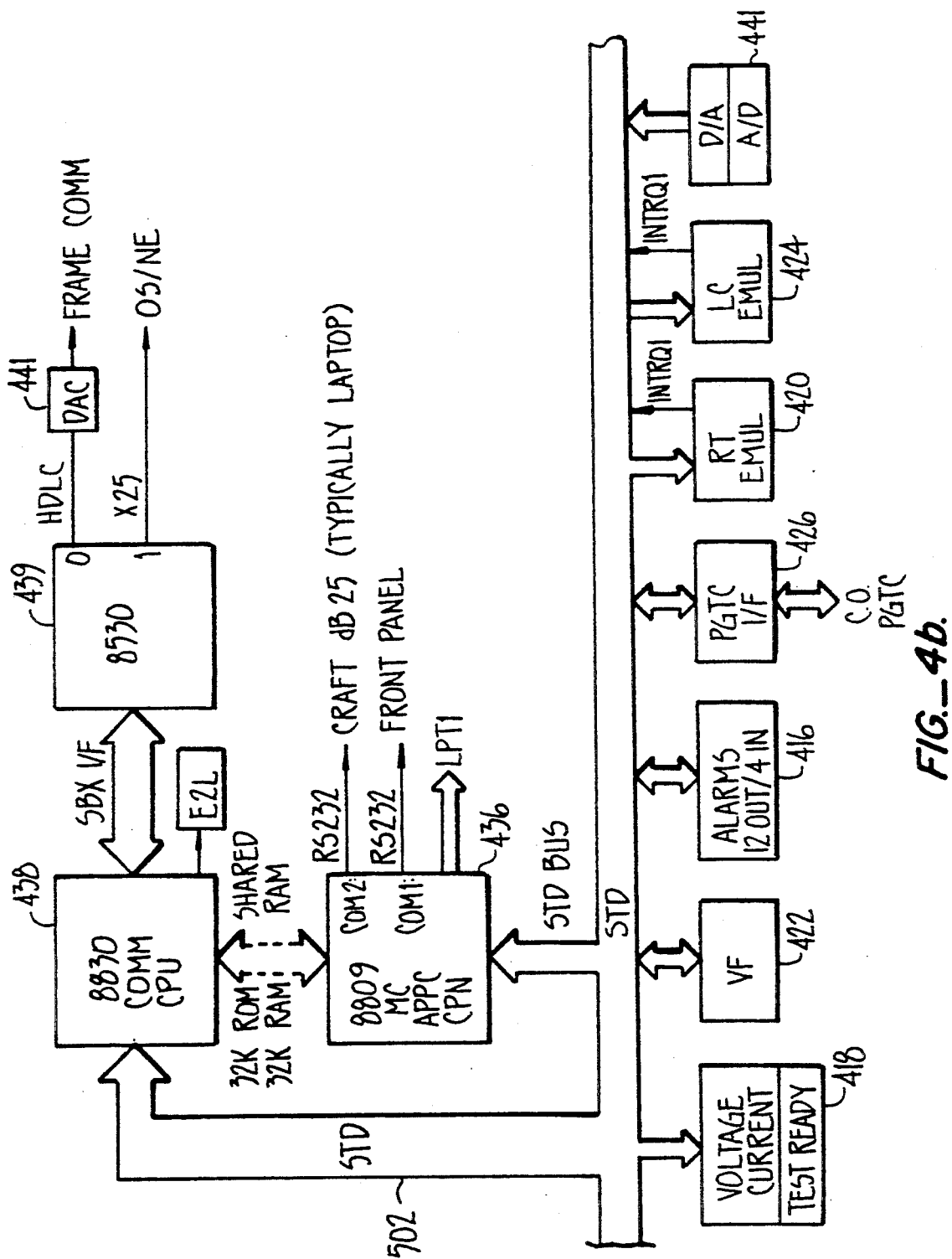
FIG._4b.

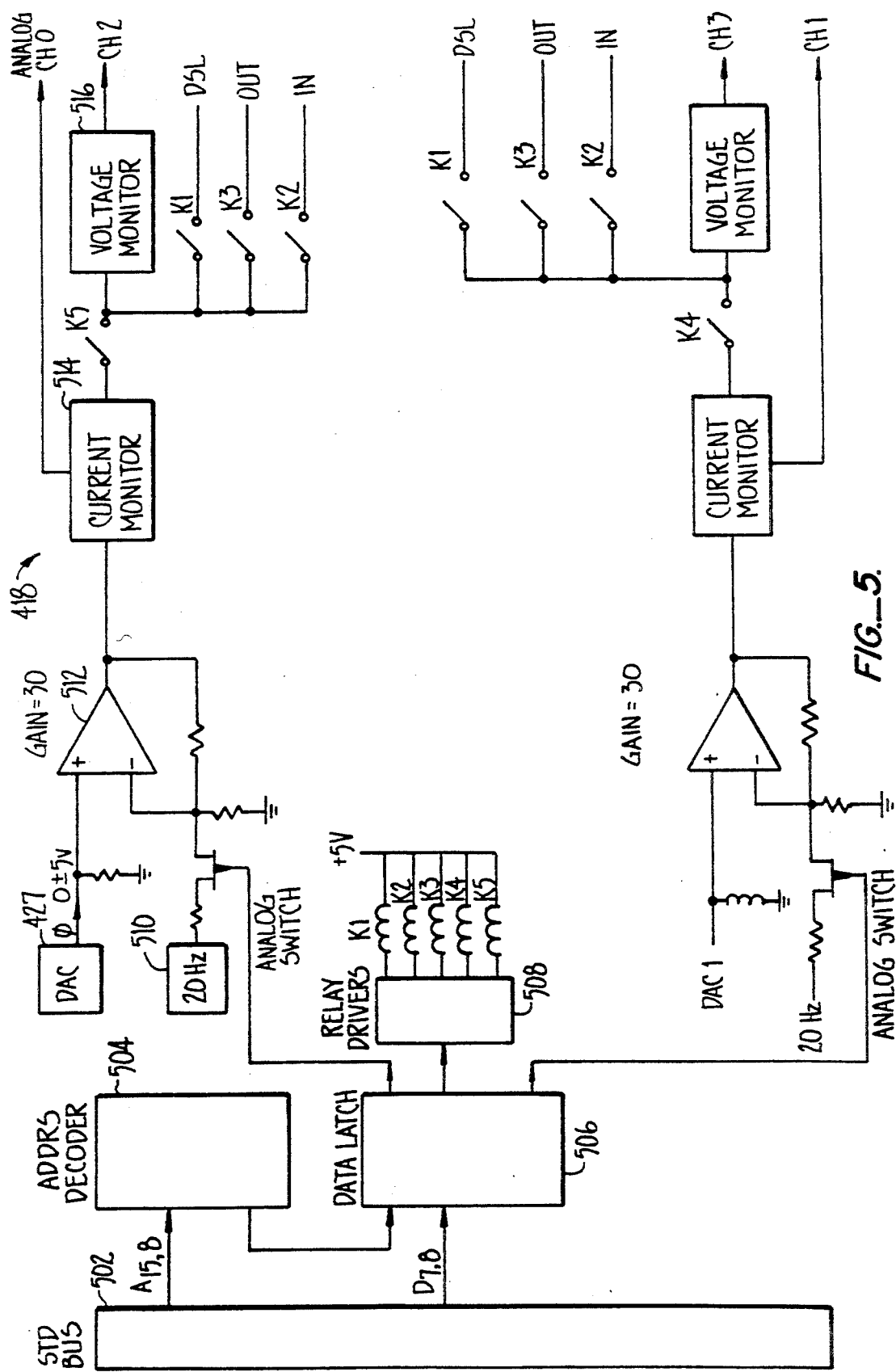
FIG._5.

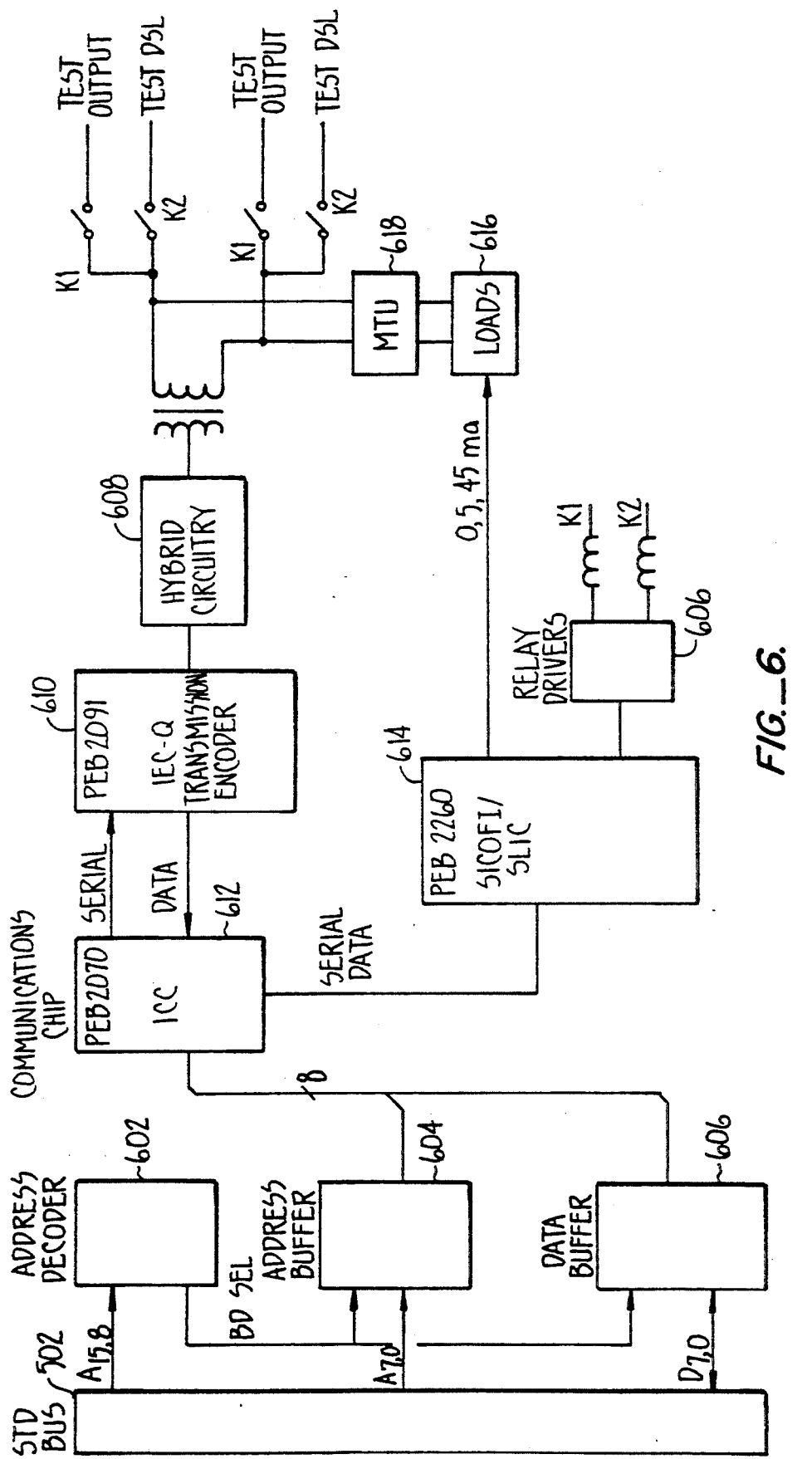
FIG._6.

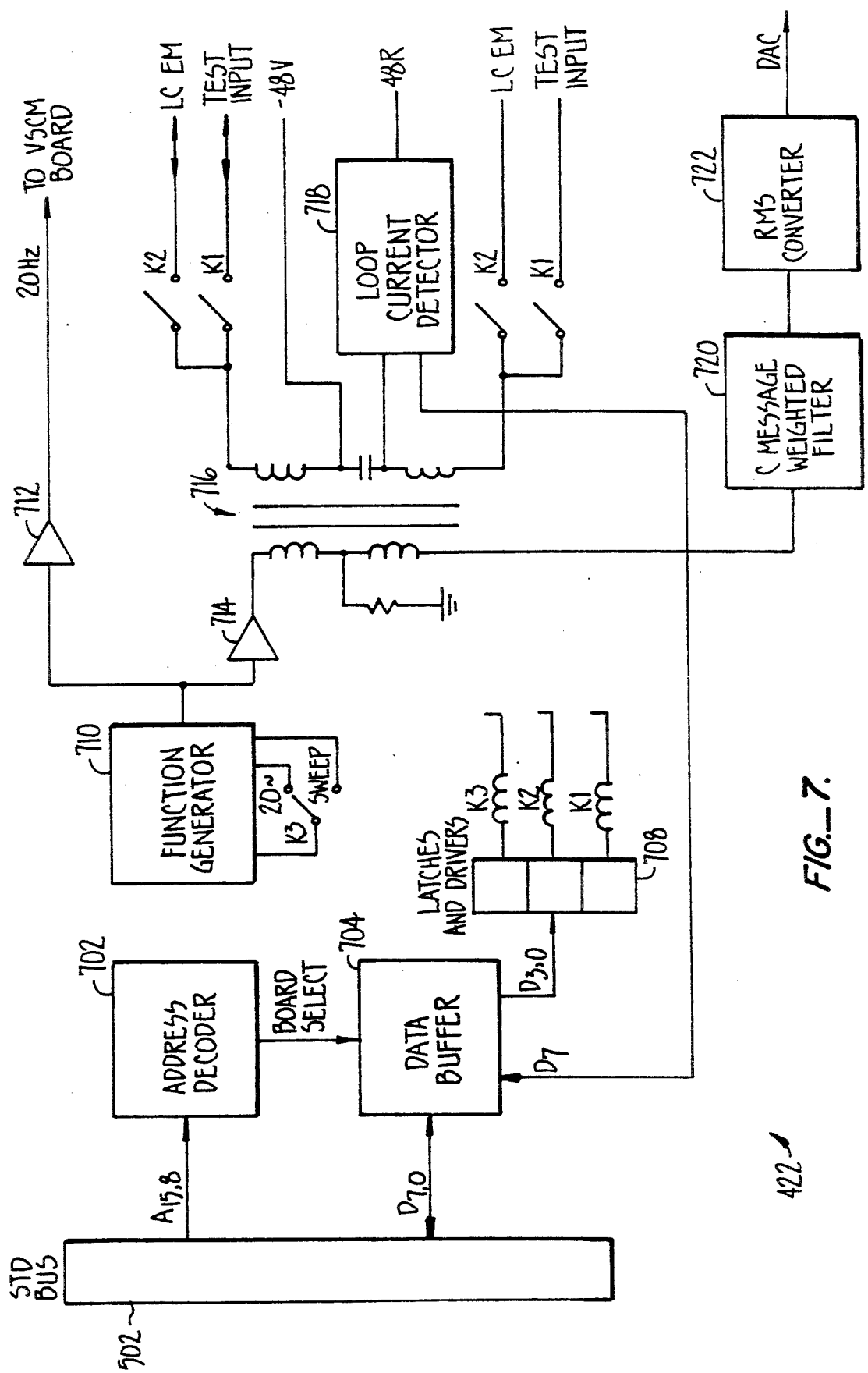
FIG._7.

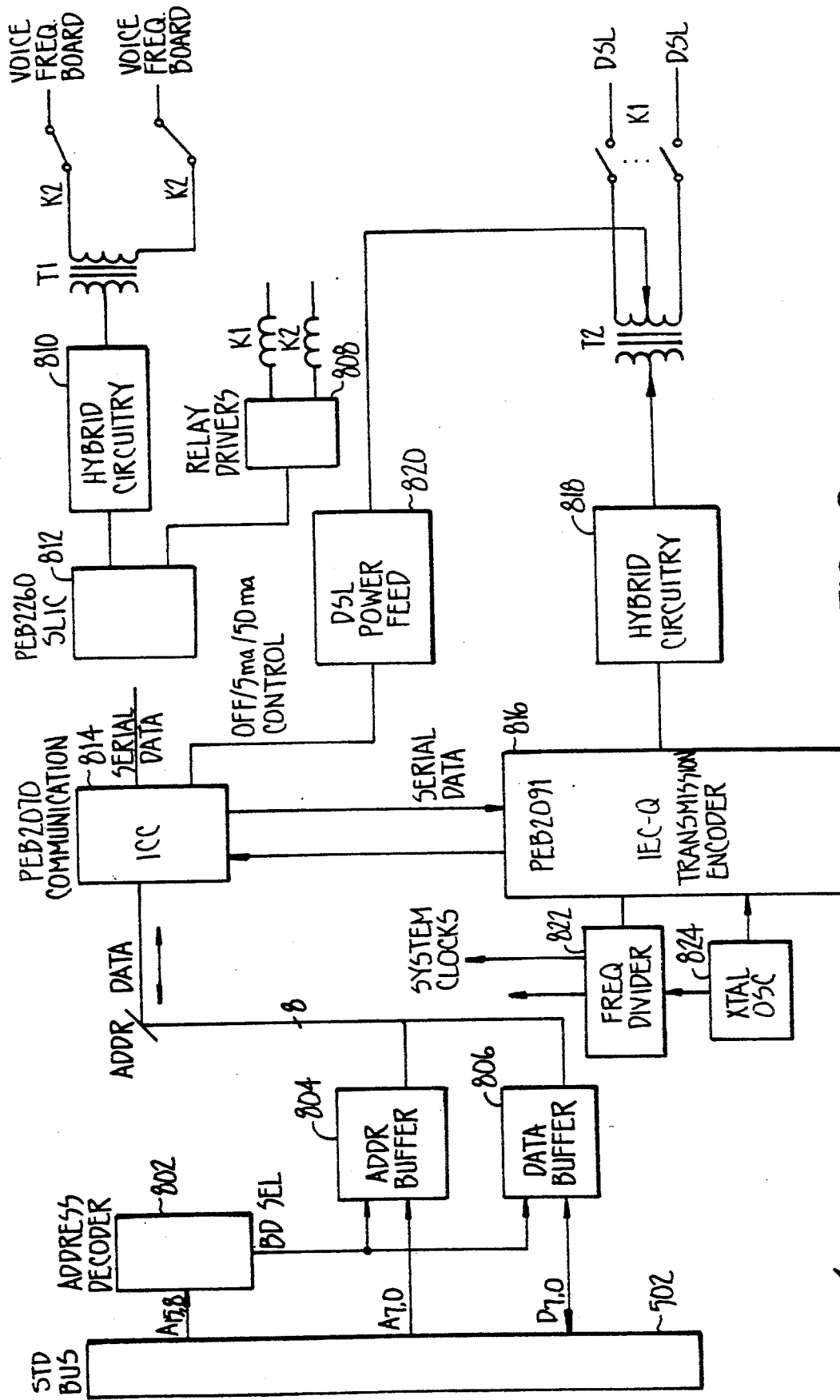
FIG._8.

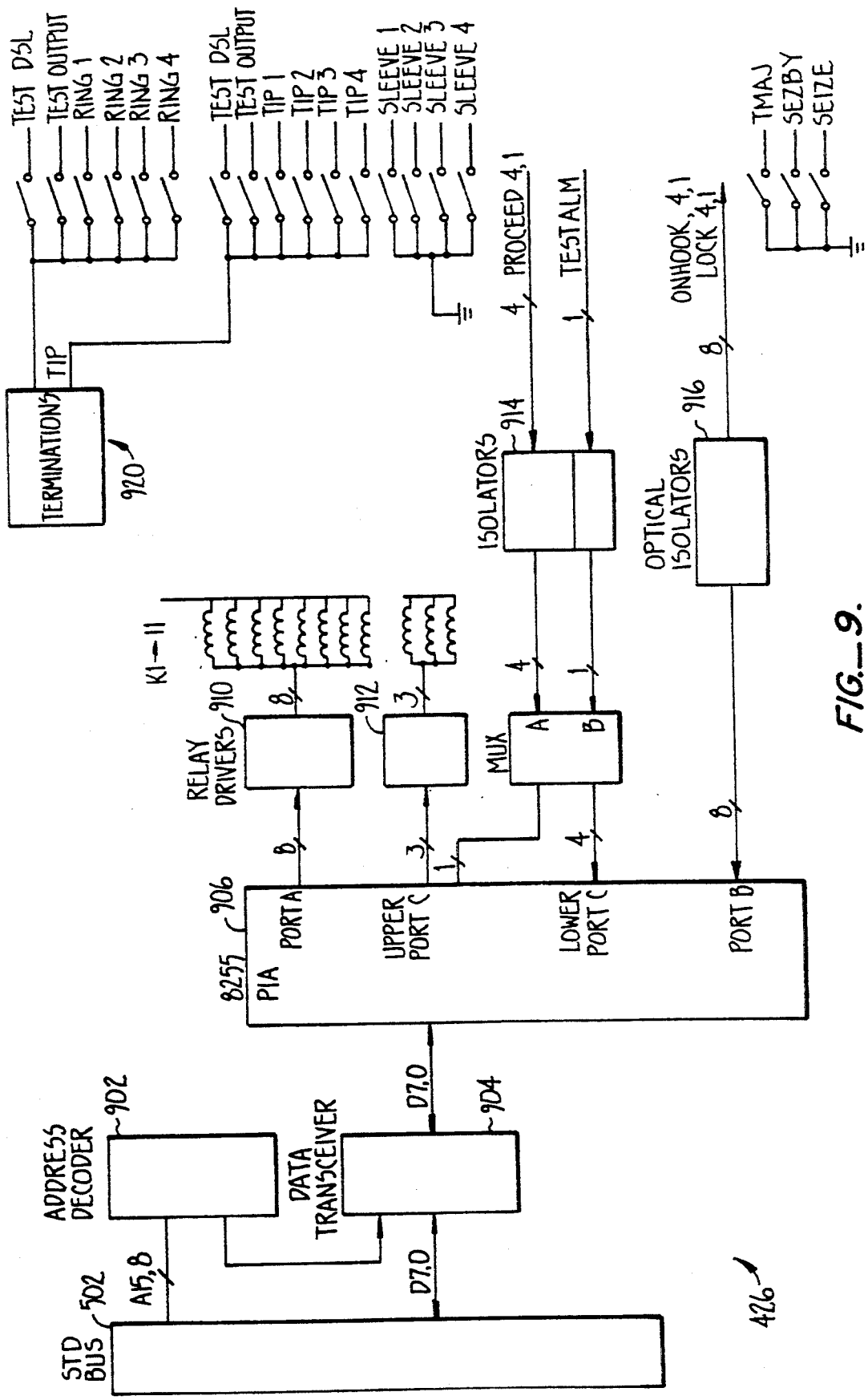
FIG._9.

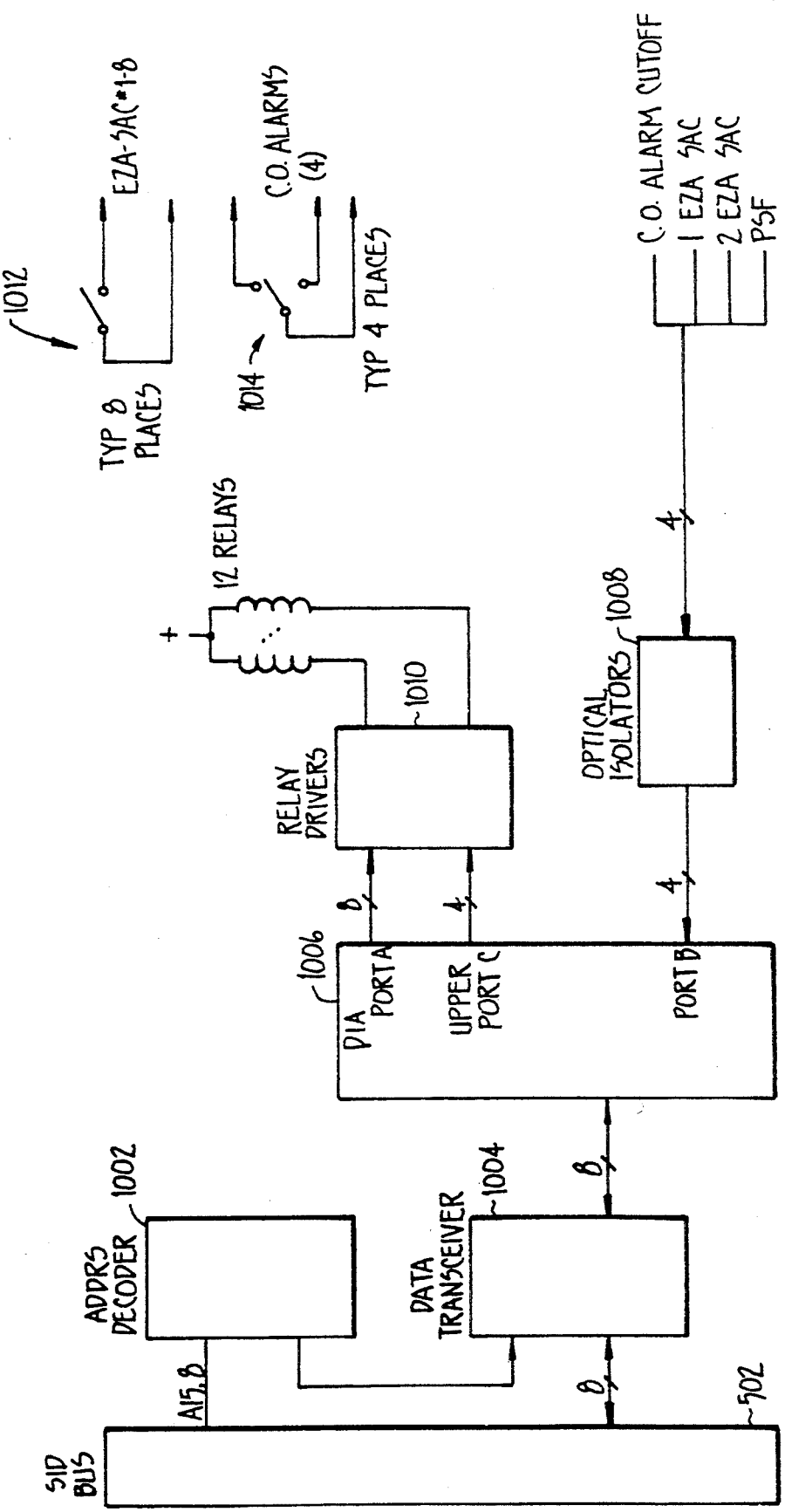
FIG._10.

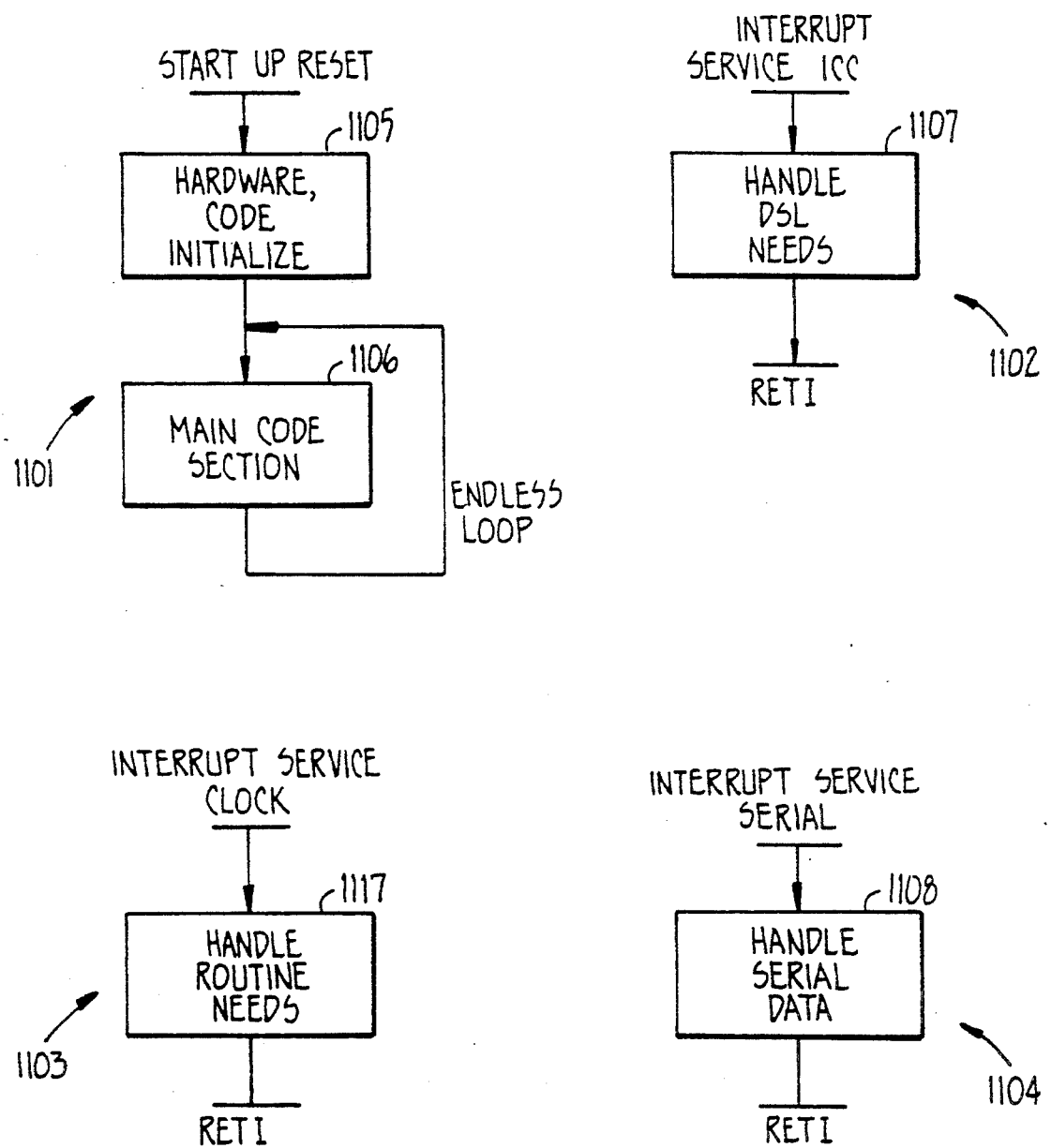
FIG._11a.

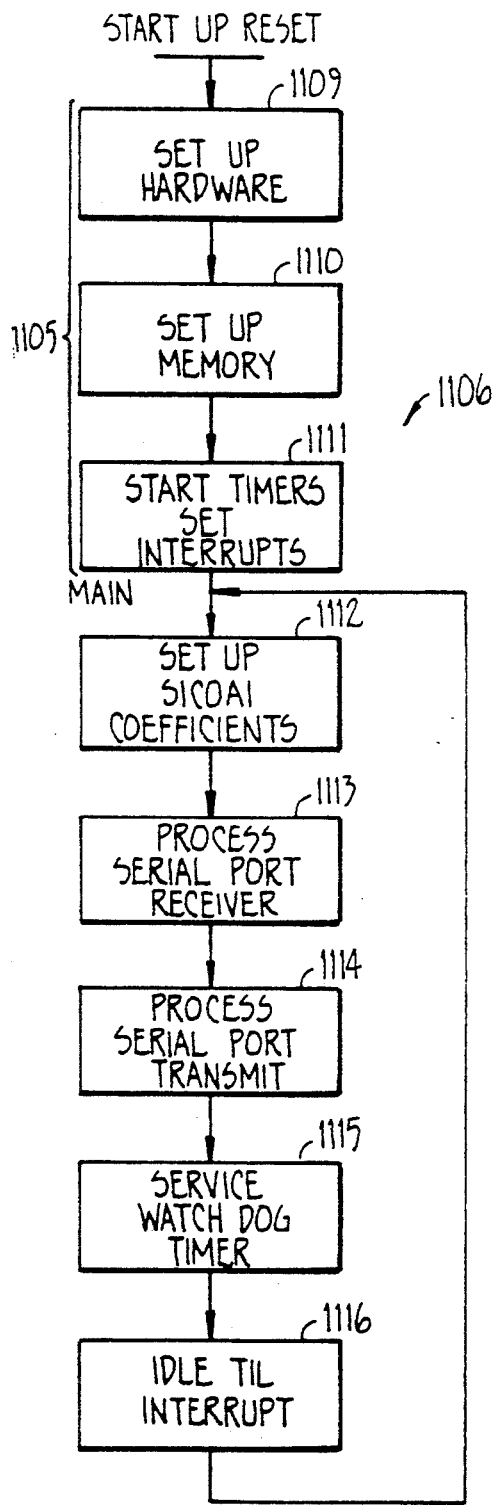
FIG._11b.
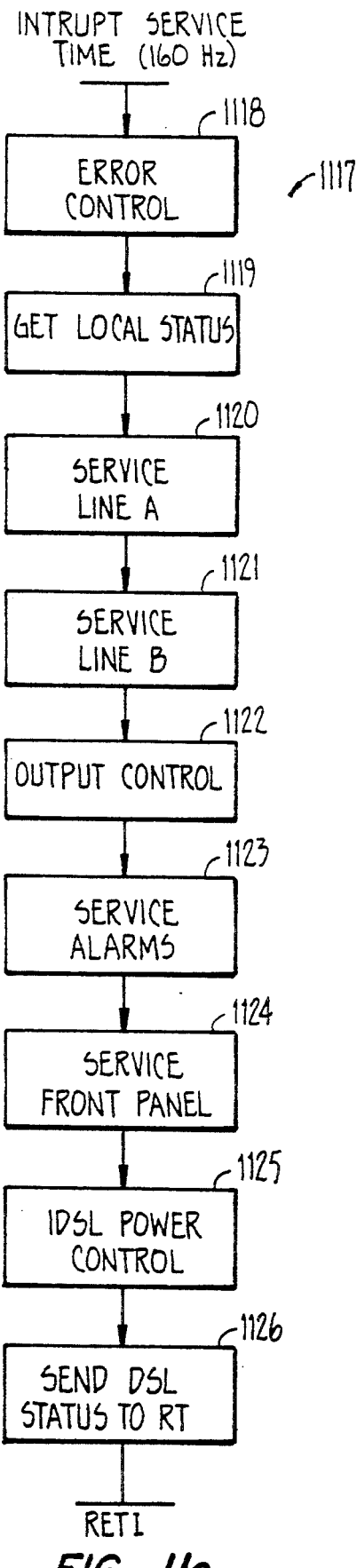
FIG._11c.

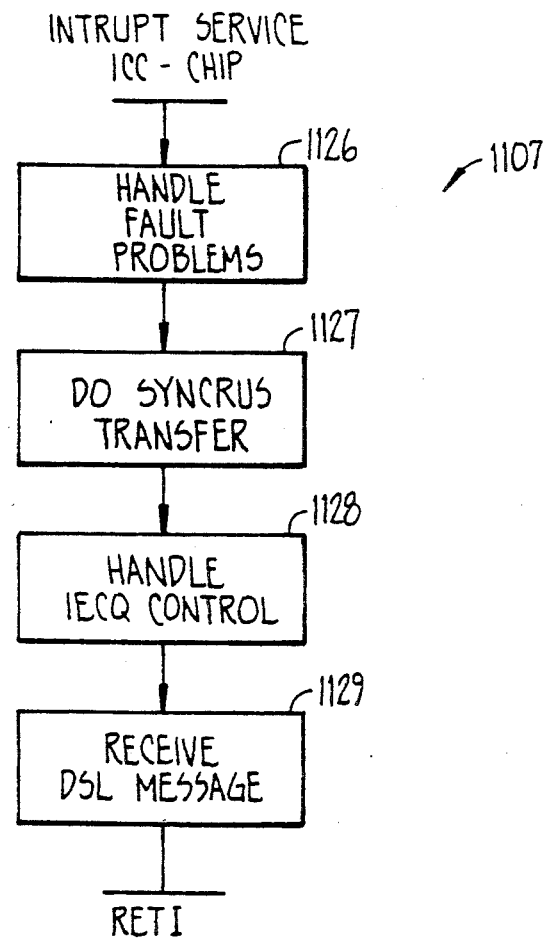
FIG._11d.
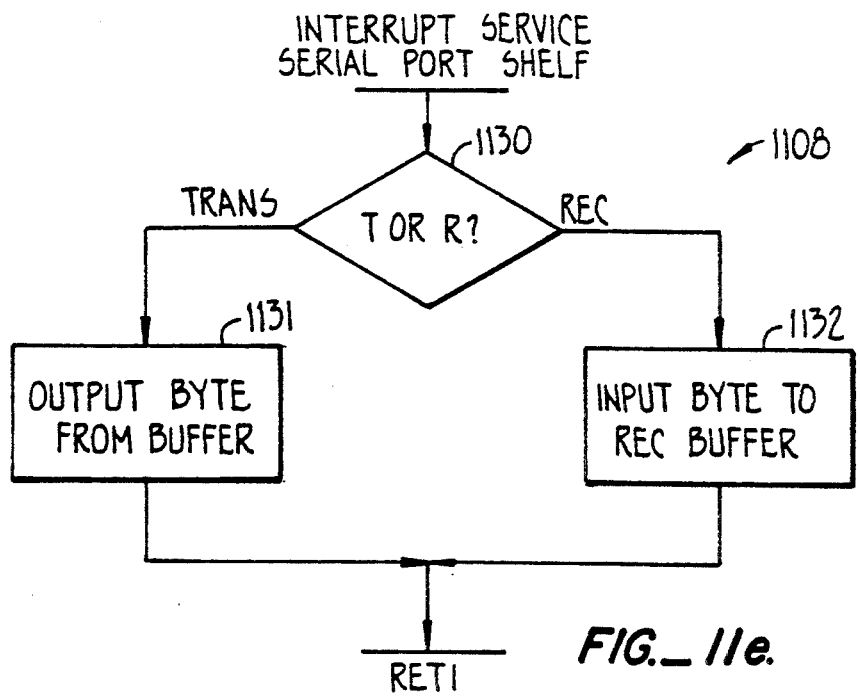
FIG._11e.

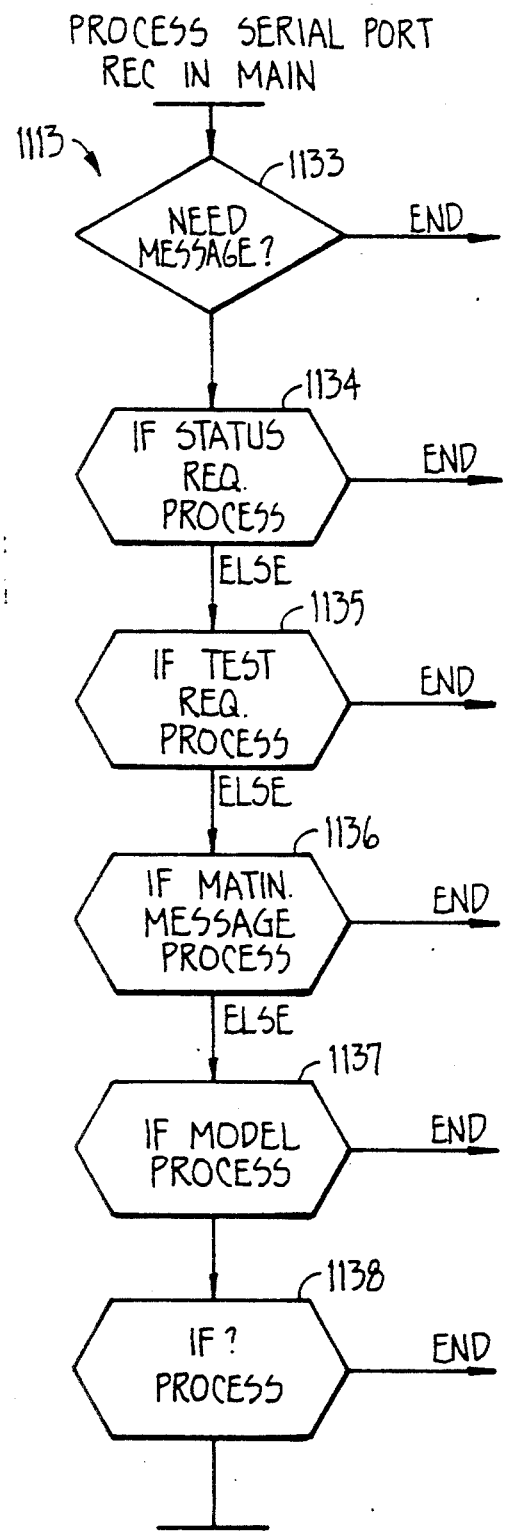
FIG._11f.
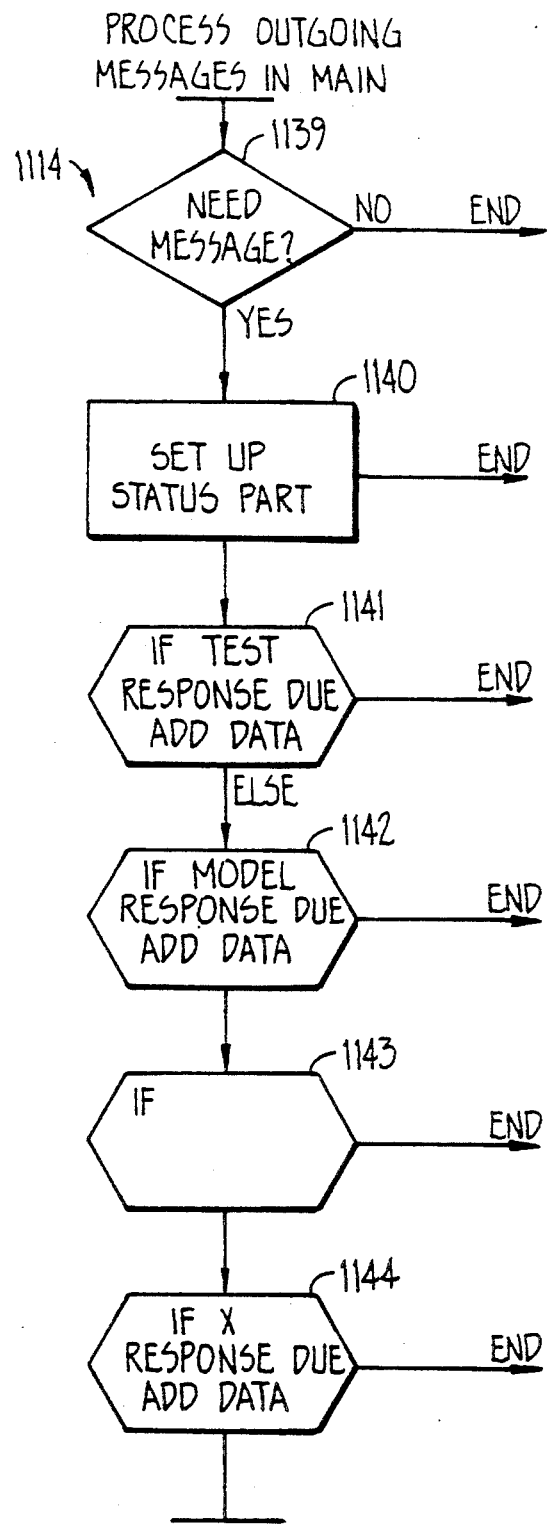
FIG._11g.

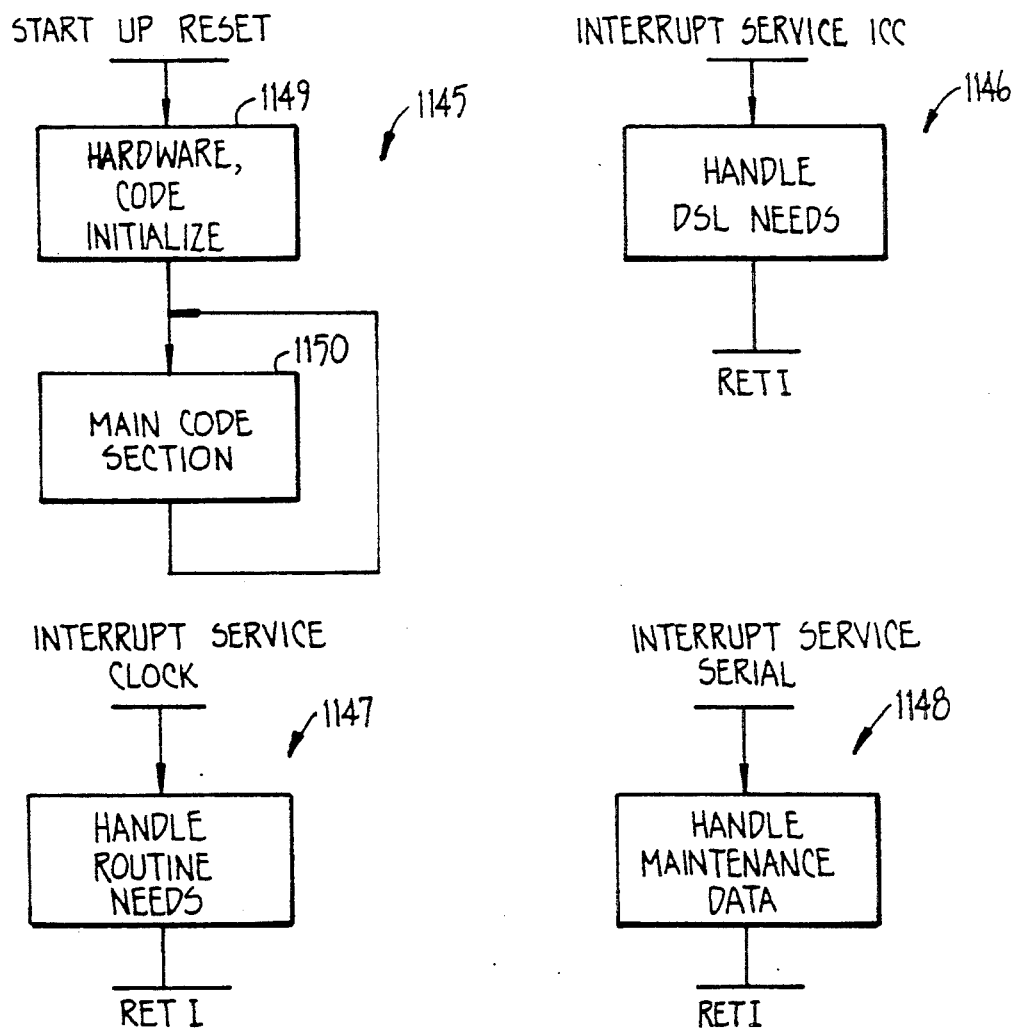
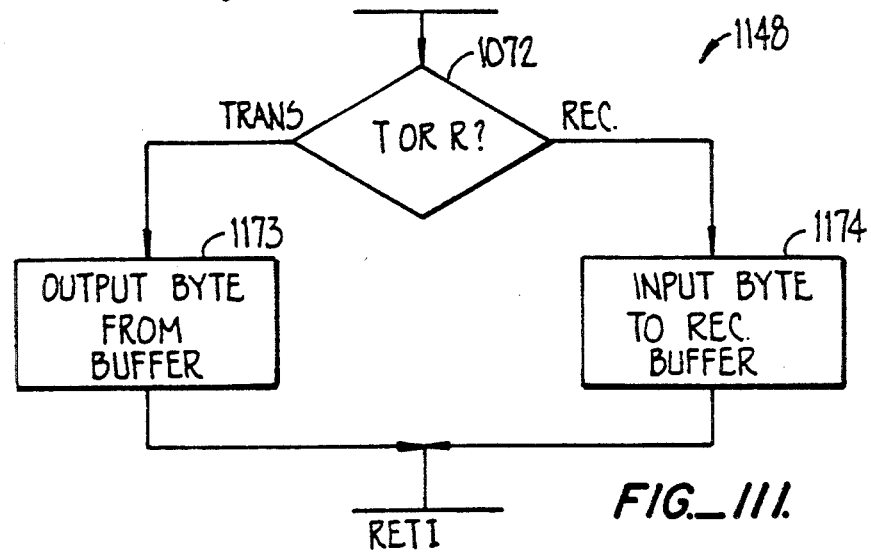
FIG._11h.
FIG._11i.

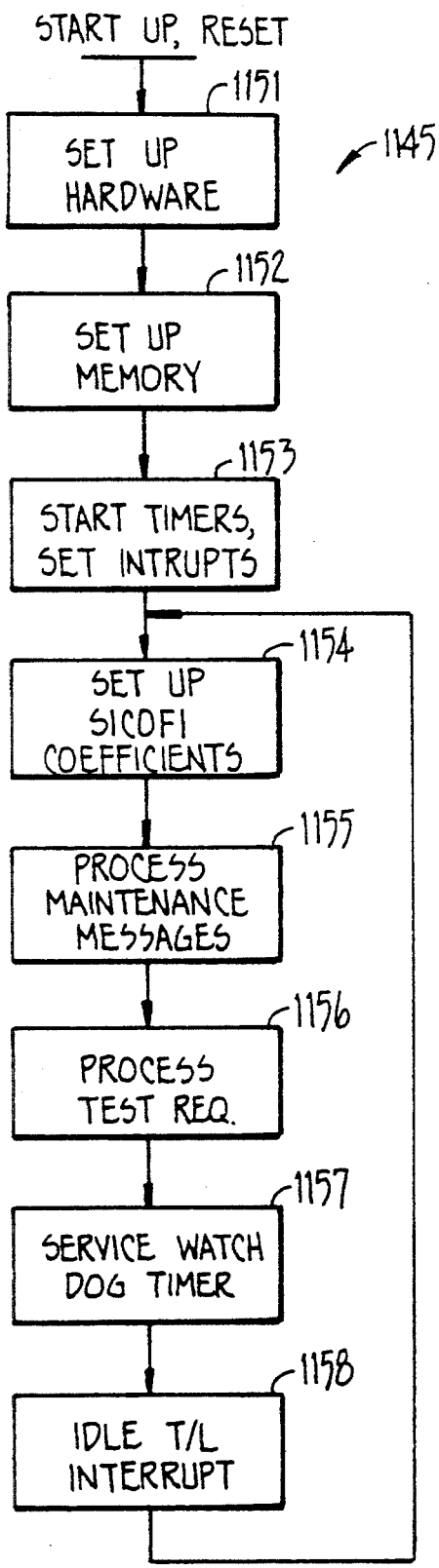
FIG._11i.
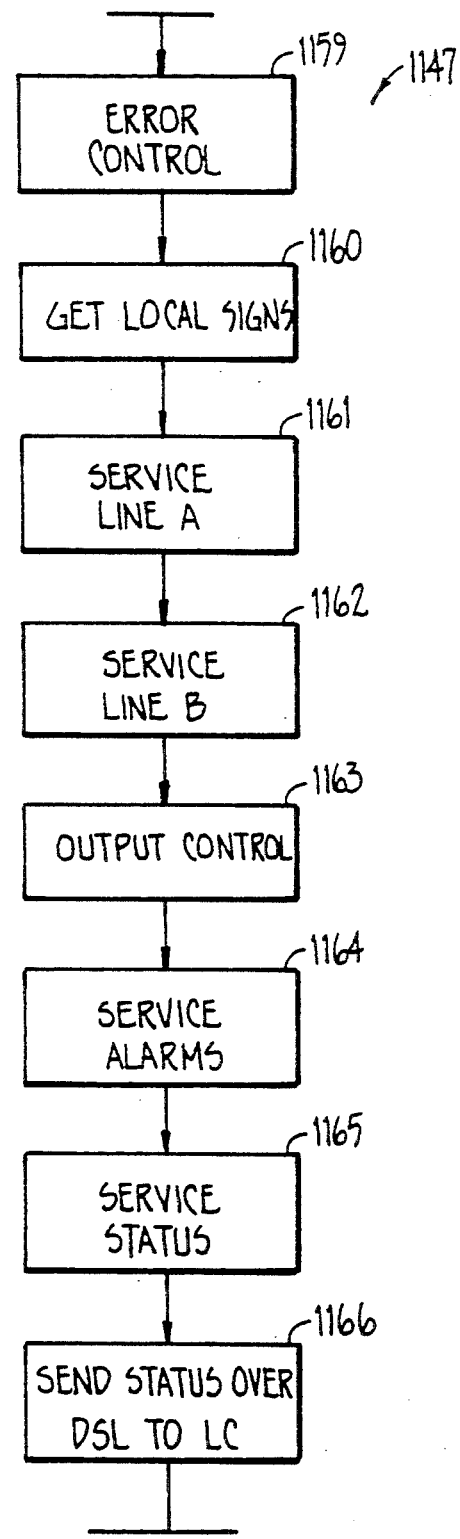
FIG._11j.

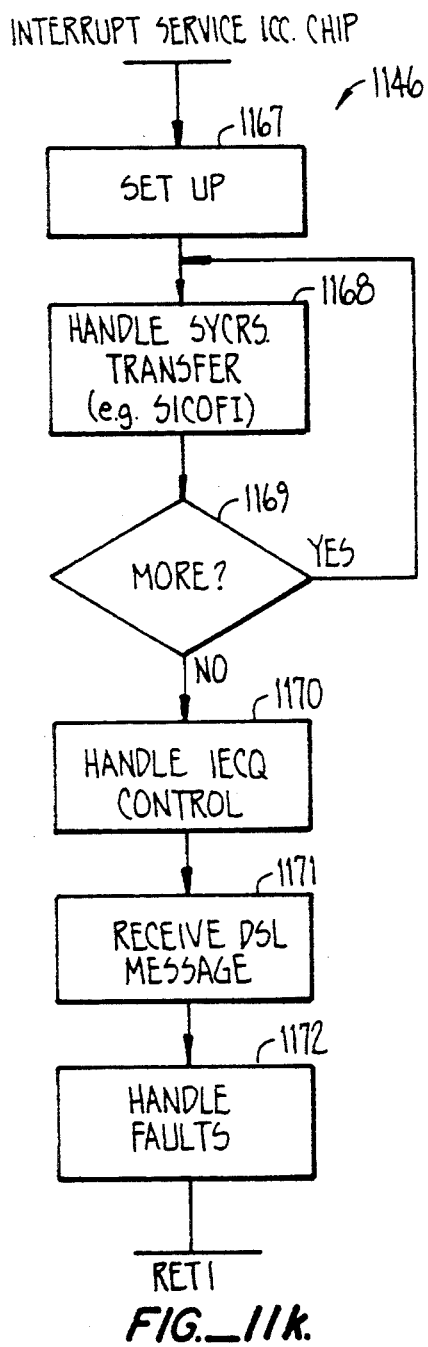
FIG.__11k.
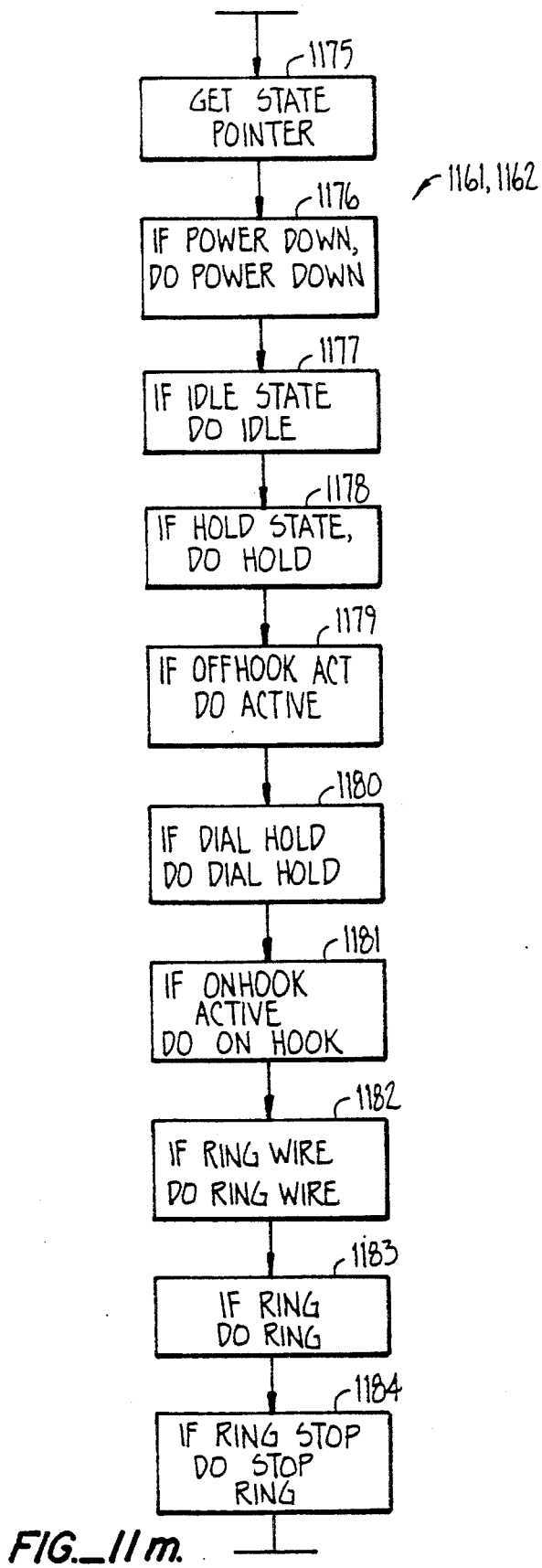
FIG.__11m.

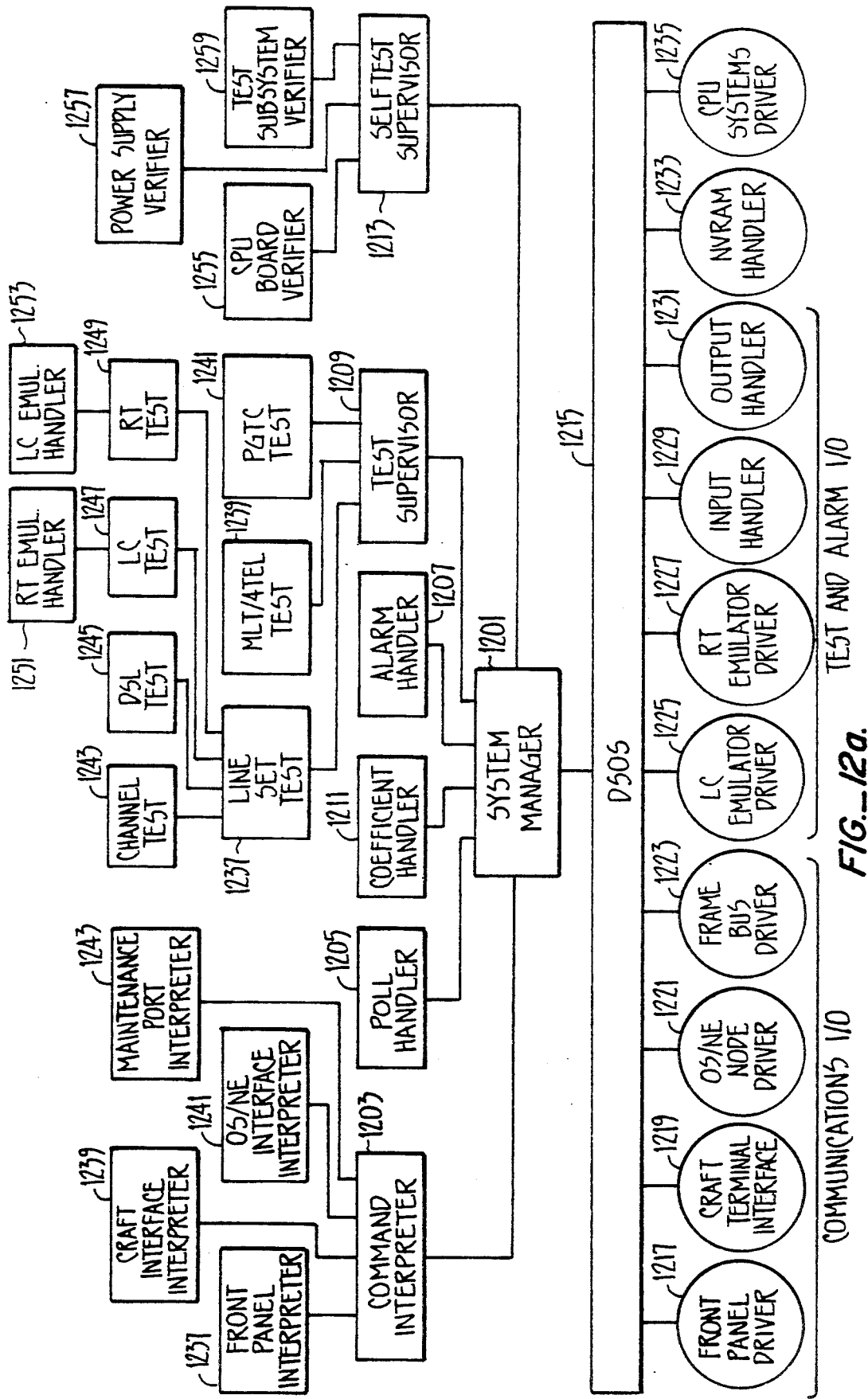
FIG._12a.

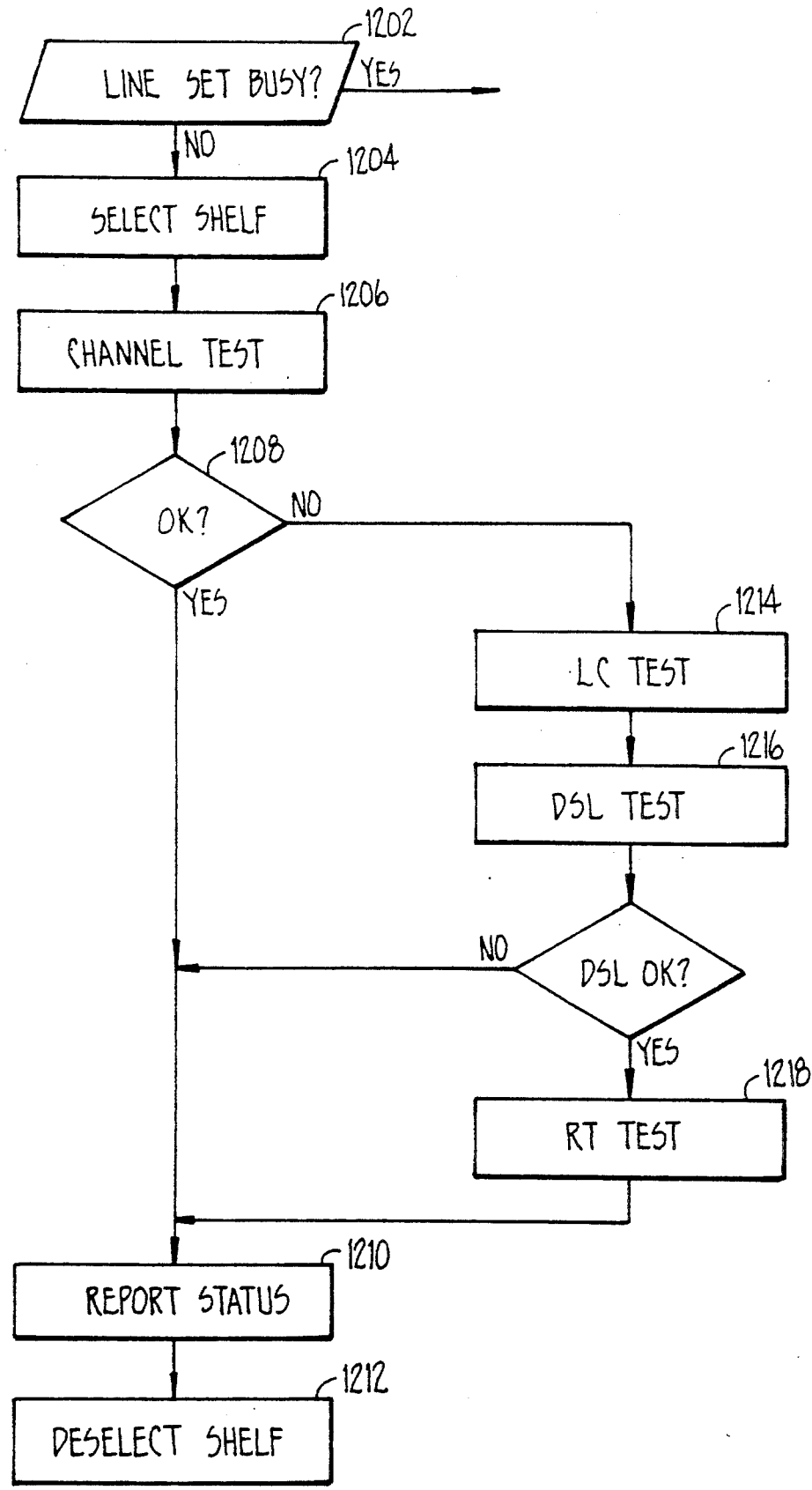
FIG._12b.

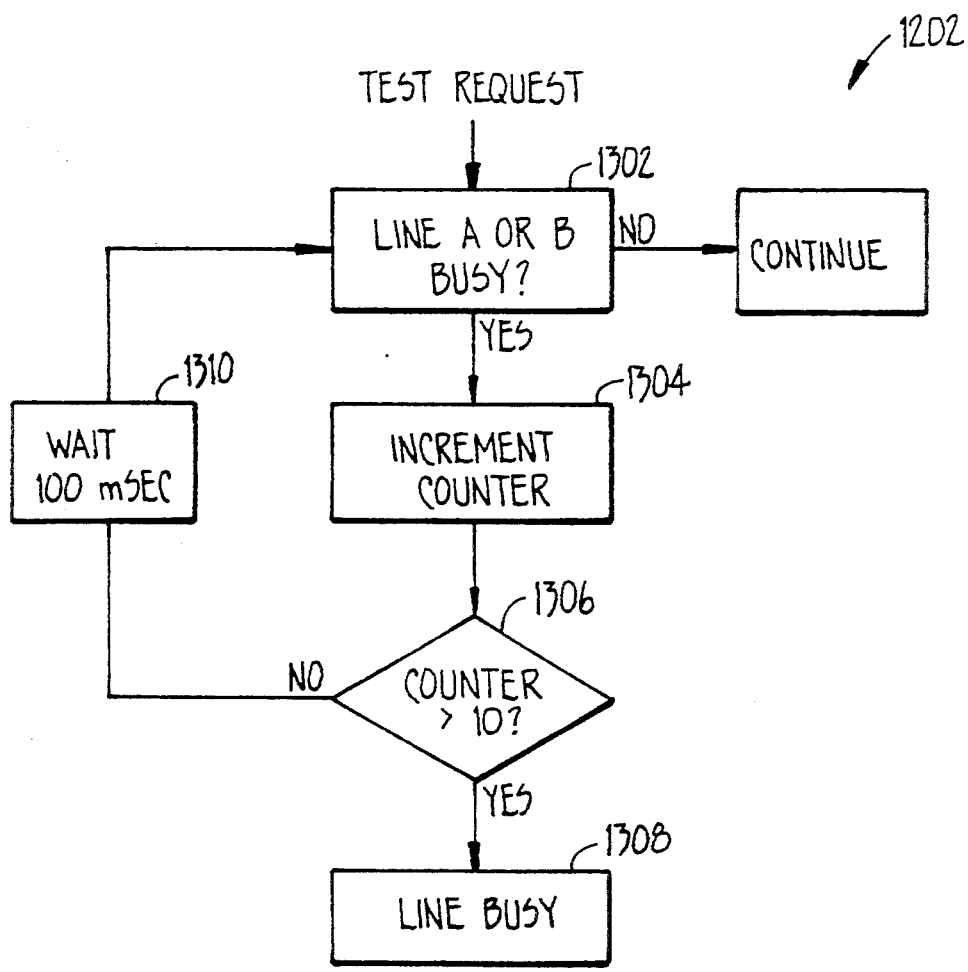
FIG._13a.
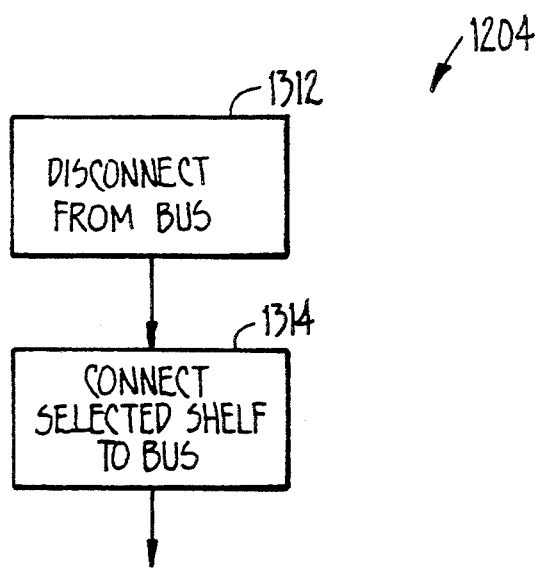
FIG._13b.

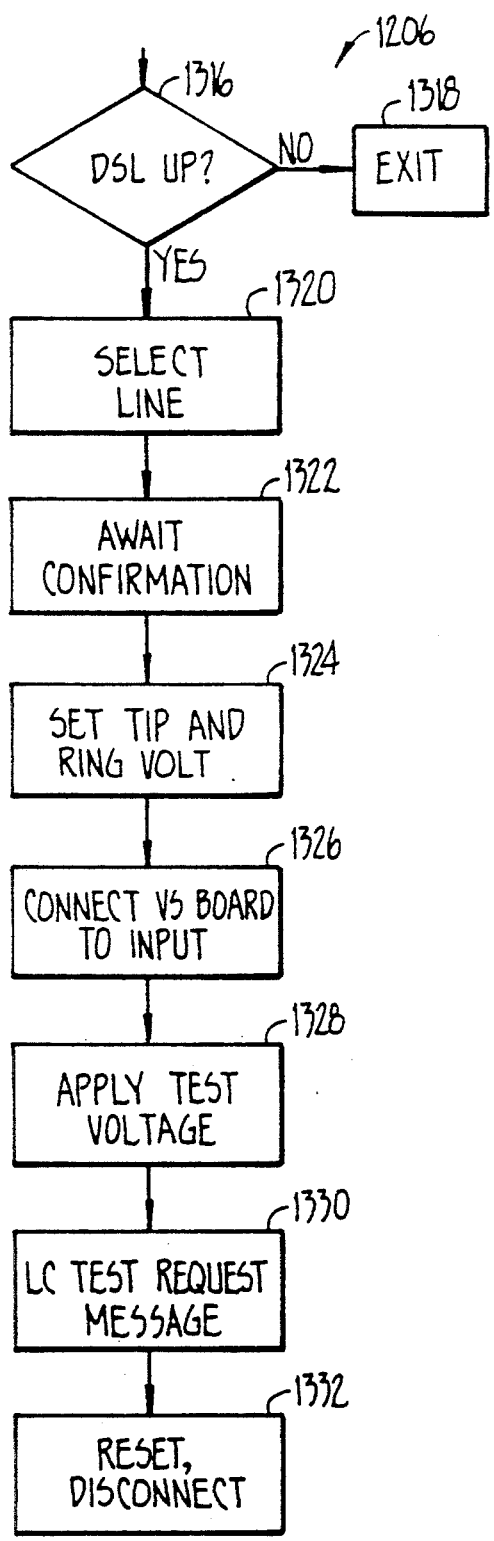
FIG._13c.
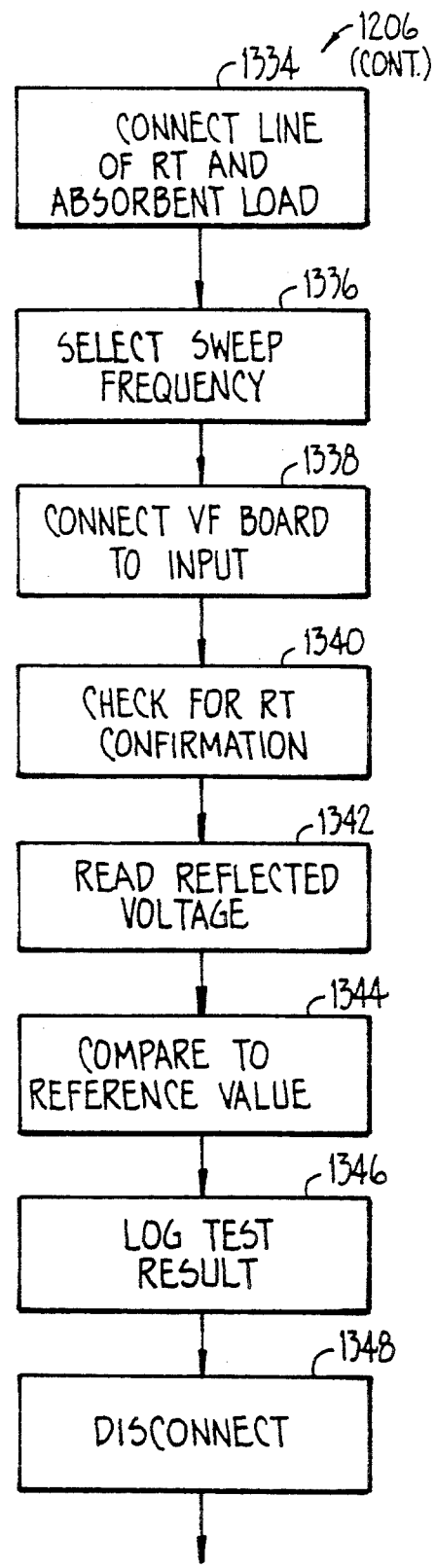
FIG._13d.

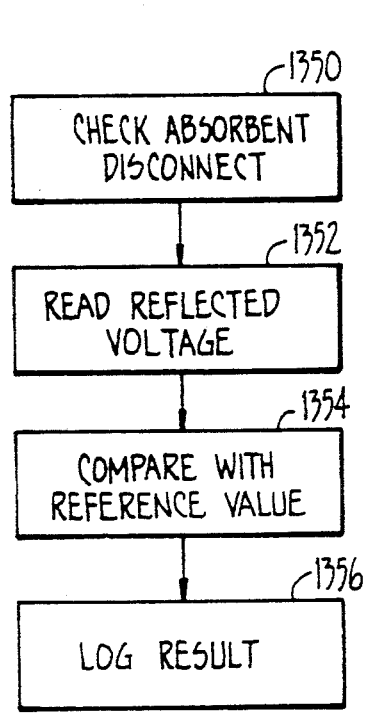
FIG._13e.
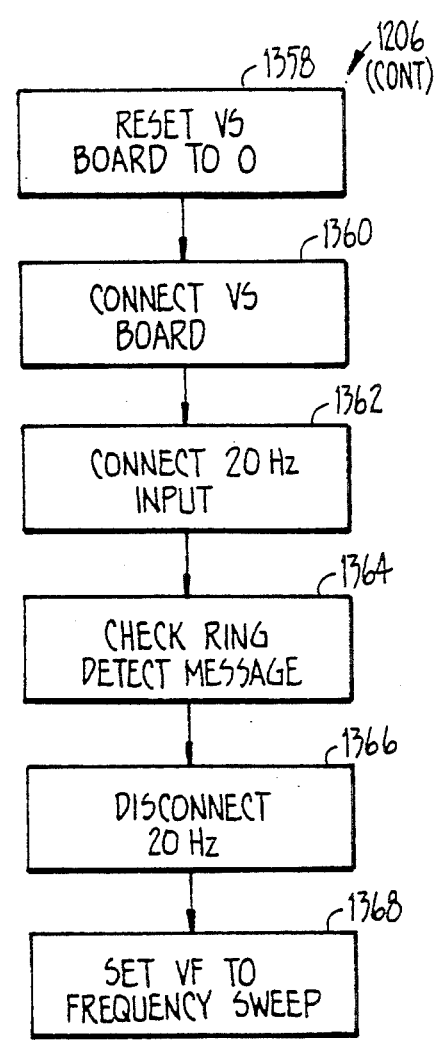
FIG._13f.
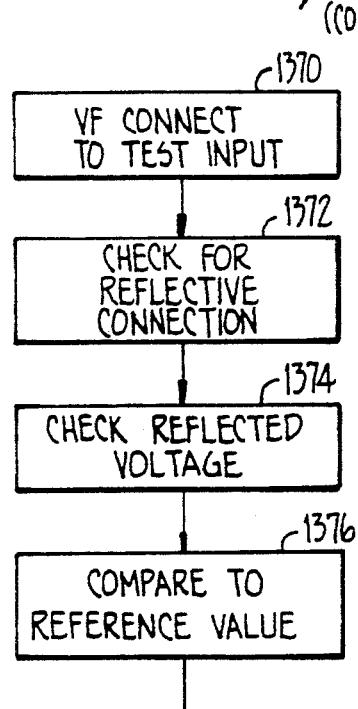
FIG._13g.
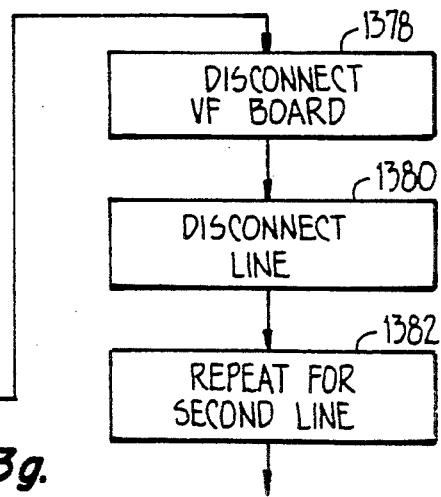

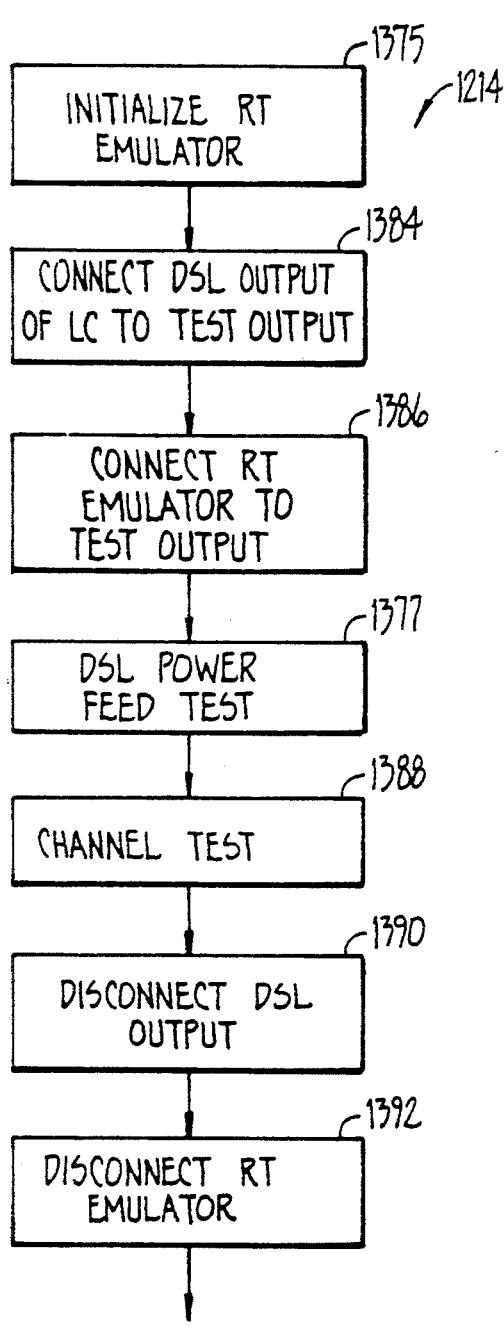
FIG._13h.
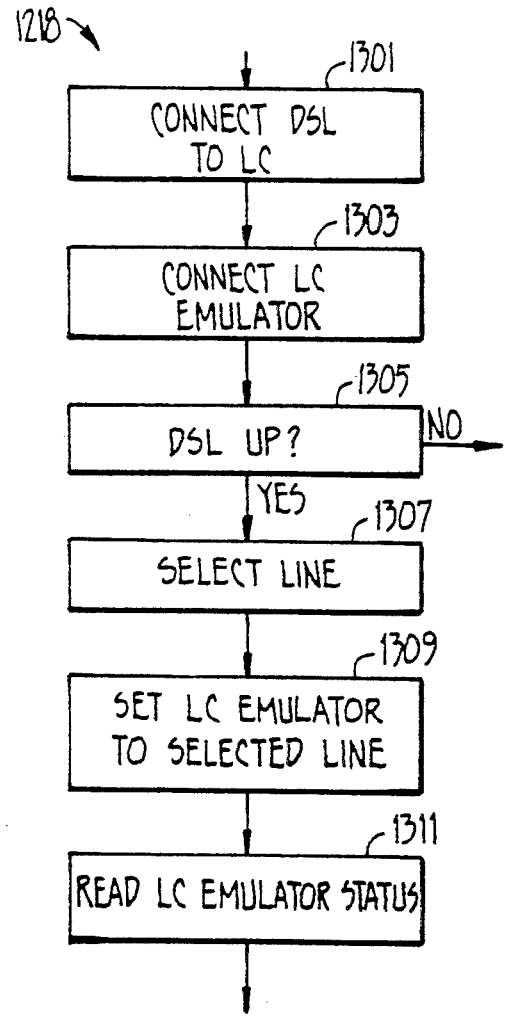
FIG._13j.
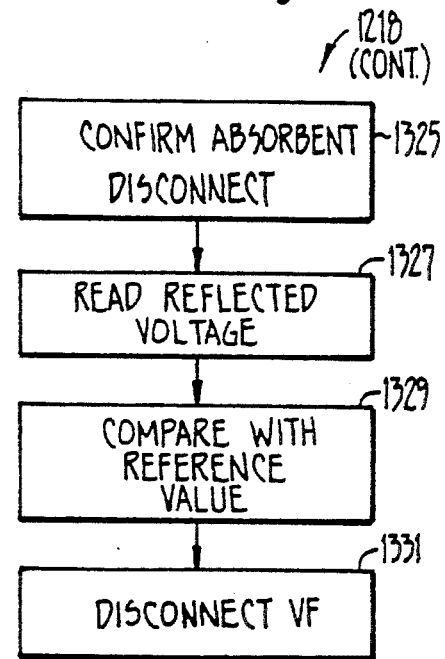
FIG._13i.

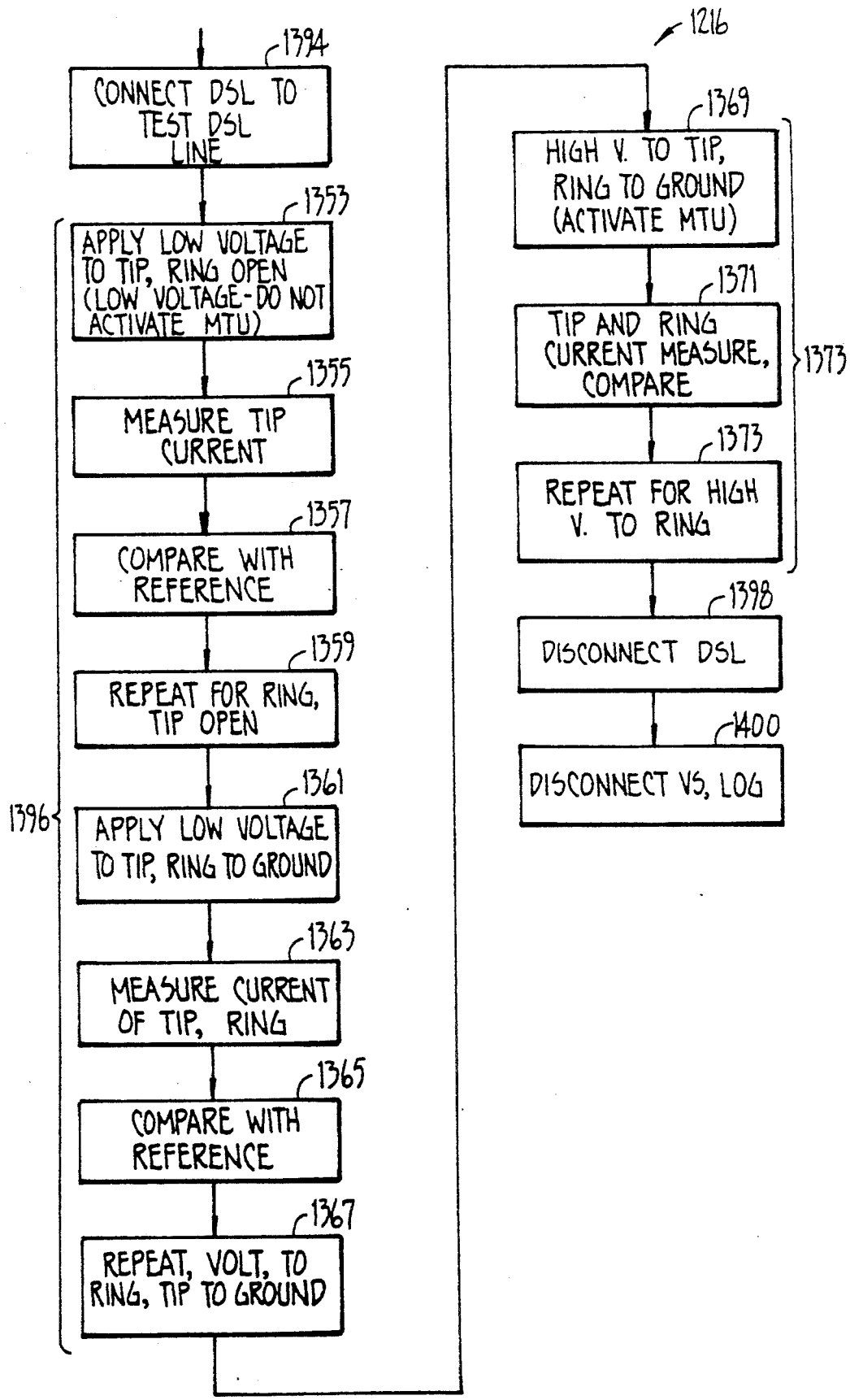
FIG._13i.

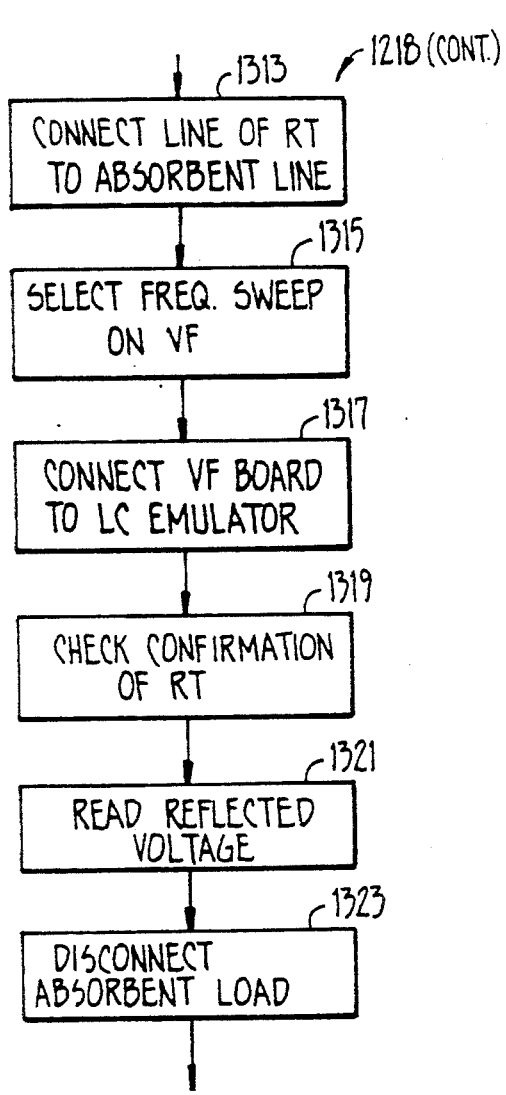
FIG._13k.
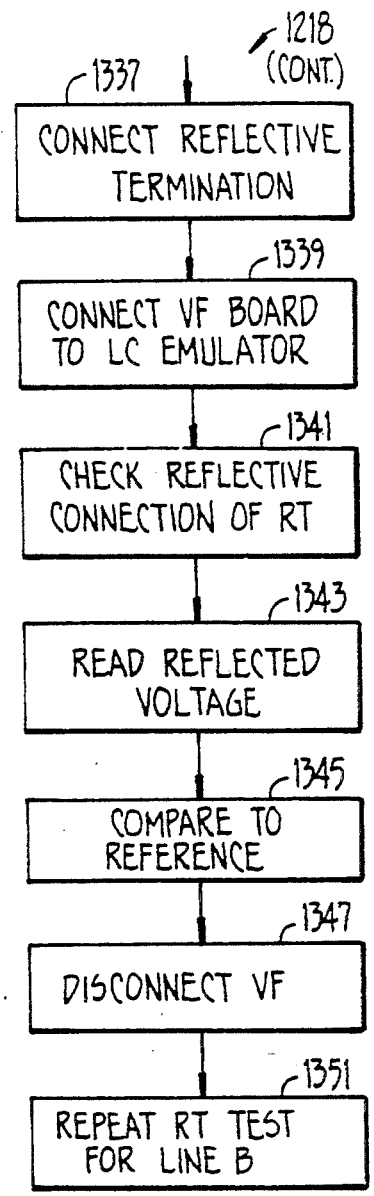
FIG._13n.
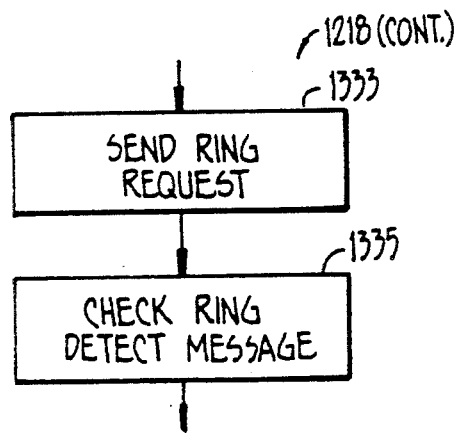
FIG._13m.

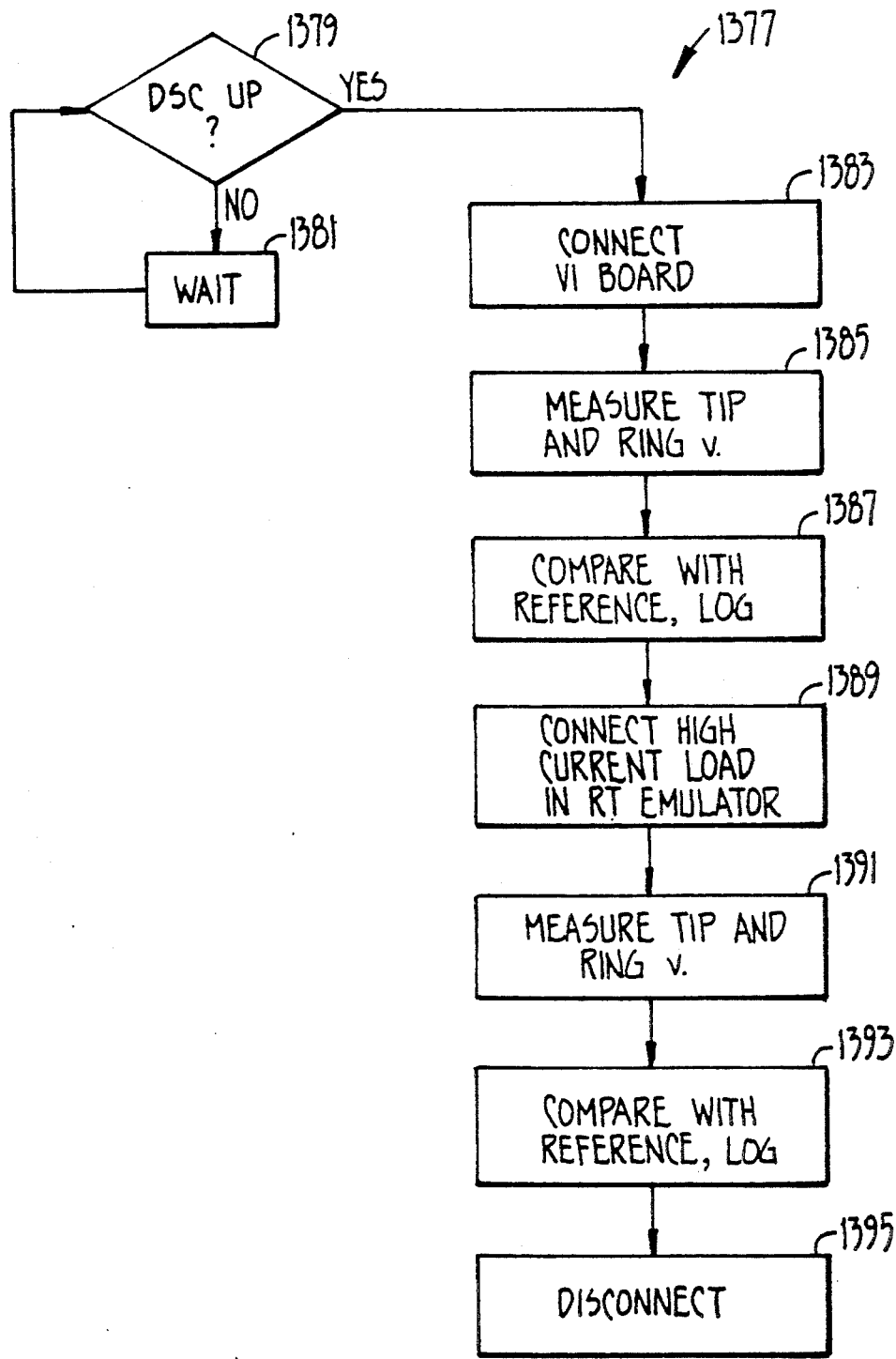
FIG._13o.

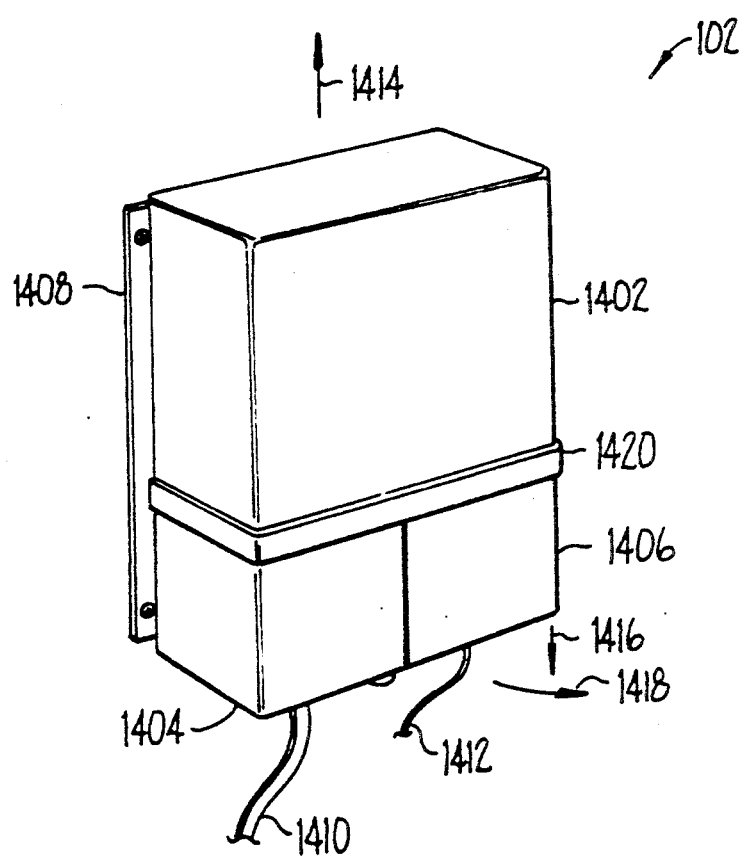
FIG._14.

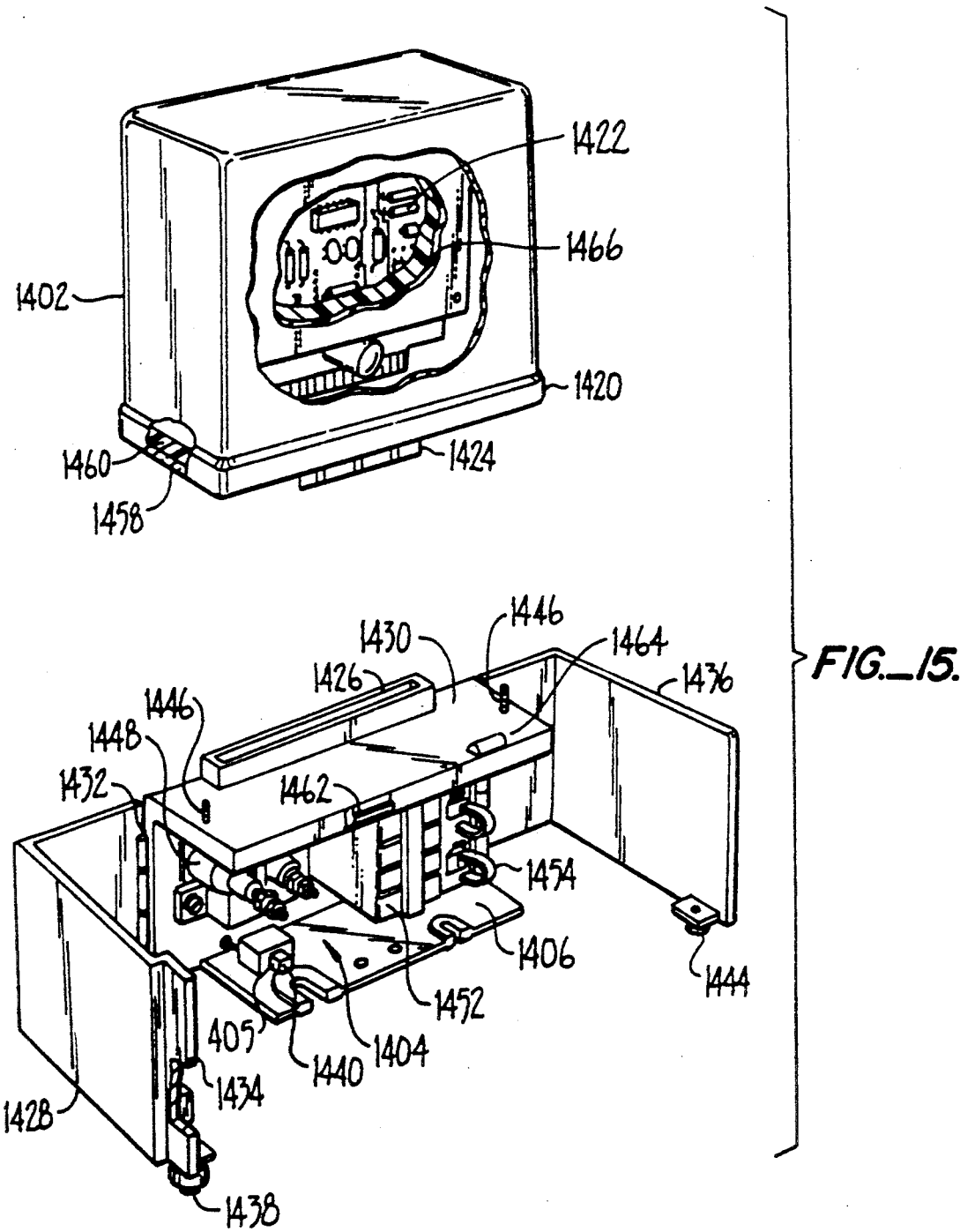
FIG._15.

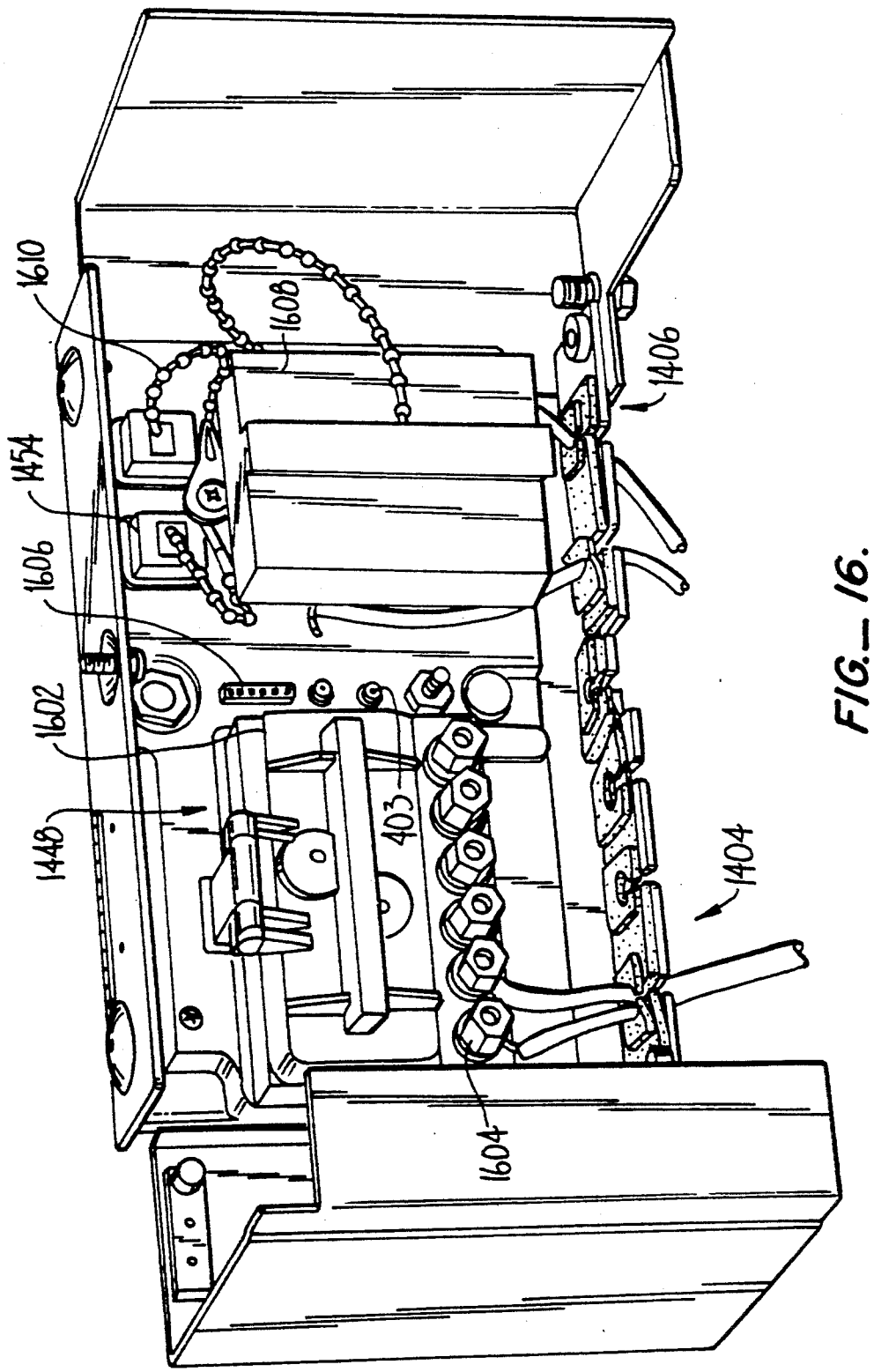
FIG._16.

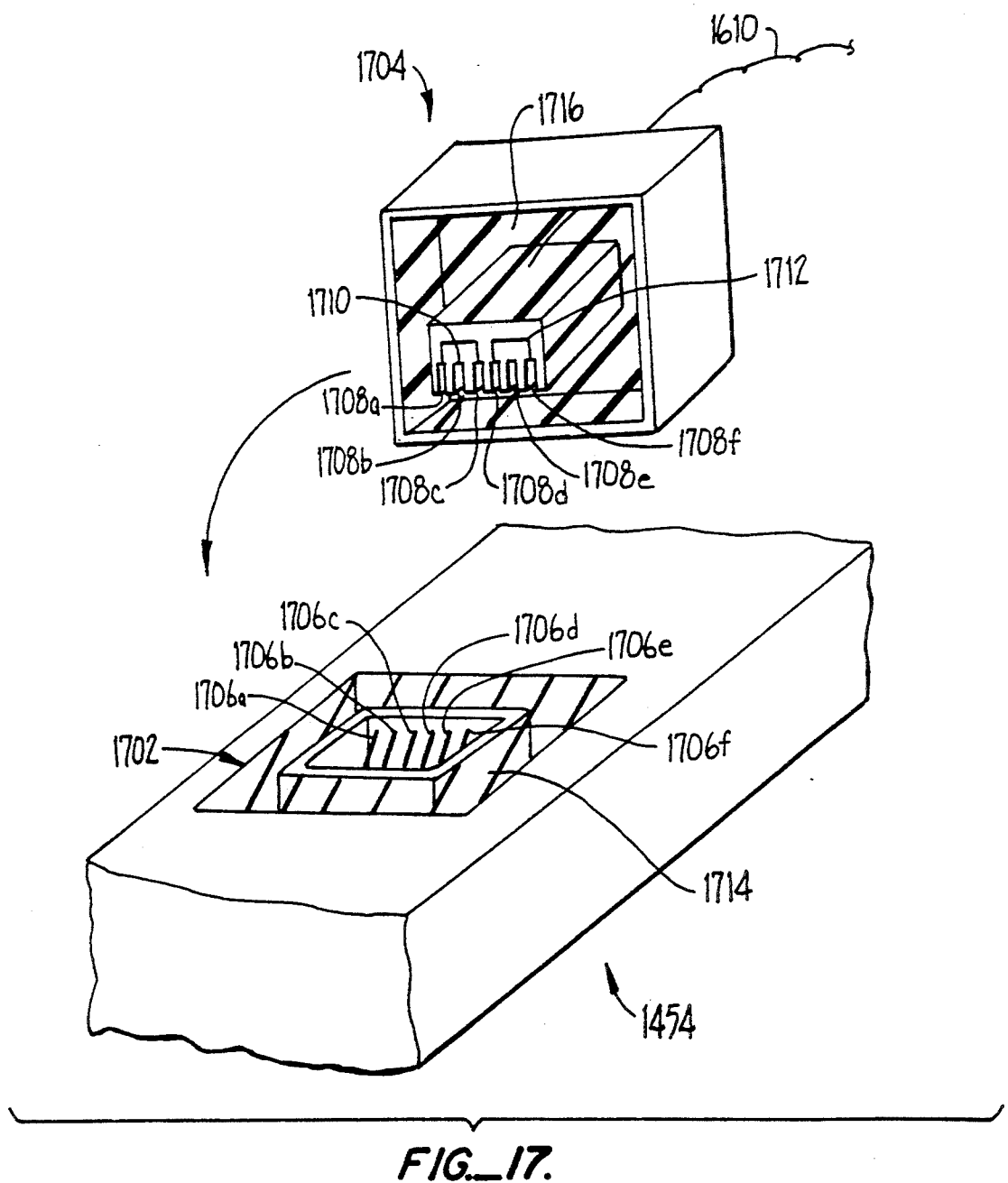
FIG._17.

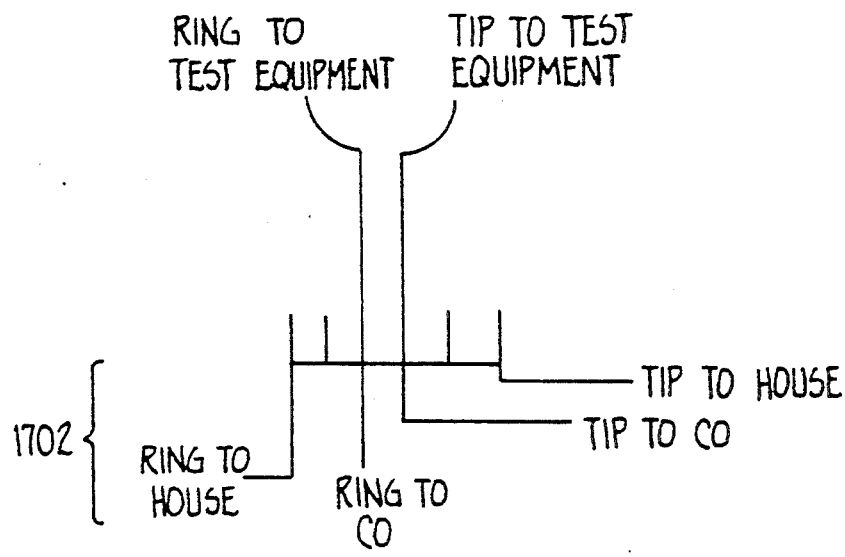
FIG.—18a.
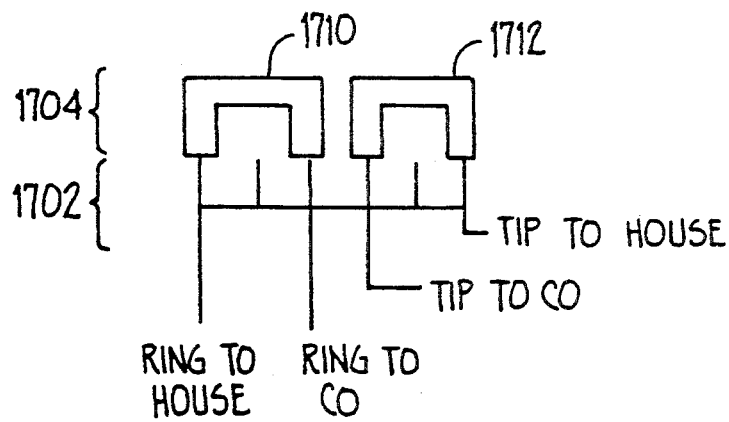
FIG.—18b.

ALARM AND TEST SYSTEM FOR A DIGITAL ADDED MAIN LINE

MICROFICHE APPENDIX

This application includes a microfiche of Appendices 1, 2, 3, and 4, having 10 sheets totalling 819 frames.

CROSS REFERENCE TO RELATED APPLICATIONS

This application is related to application Ser. No. 07/385,610, filed Jul. 25, 1989, which is completely incorporated herein by reference for all purposes.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to the field of telephone communication. More particularly, in one embodiment the present invention provides a method and apparatus for simultaneously transmitting information from multiple phone connections over a single twisted pair line.

Techniques for transmission of multiple voice or data signals over a single phone line are well known in the telecommunications industry and are commonly referred to as concentration techniques. In the past, frequency division multiplexing was the most commonly used technique for simultaneous transmission of multiple voice or data signals over a single line. Frequency multiplexing techniques are still commonly used in, for example, wideband transmission media.

Digital time division multiplexing techniques have been used since the 1960's and have become the most common concentration technique in, for example, interoffice circuits. An entire family of T-carrier (Trunk carrier) systems such as T1, T1C, T1D, T2, and T4, have been developed for concentration of multiple voice and data signals over a common line. Digital concentration techniques are described in, for example, Bellamy, *Digital Telephony*. Wiley and Sons, 1982, which is incorporated herein by reference for all purposes.

Digital communication has become relatively standard in, for example, intraoffice trunks. One example of a method for transmitting multiple voice or data signals over a single two- or four-wire transmission line is disclosed in Kaiser et al., "Digital Two Wire Local Connection Providing Office Subscribers With Speech, Data, and New Teleinformation Services," ISSLS, Mar. 20-24 (1978). In Kaiser et al., telephone data, viewdata, telecopier information and the like are transmitted in a digital fashion over a two- or four-wire line to a local exchange. Digital data are transmitted in data bursts which are later expanded and recovered using, e.g., time division multiplexing techniques.

Despite advances in the multiplexing techniques a variety of problems remain. For example, some multiplexing techniques continue to require complex and, therefore, uneconomical equipment. This equipment is particularly unsuitable for individual or small office users. Further, when applied to residential users, small office users, and the like, some systems require that the user provide a power source such as a transformer connection to a 120 v. power source, a battery power source or the like. Some systems require that the user replace existing two-wire connections with less conventional connections and/or are limited in the distance of twisted pair line over which information may be transmitted. In spite of certain advances in the ability to transmit multiple voice and data signals over single twisted pairs, most local switching units continue to provide a single analog signal over a single twisted pair to a typical home or office.

Prior techniques for providing service to home or office users have also provided limited capability for detection of failures in the system. Testing equipment has previously included, for example, the so-called MLT or 4TEL mechanical line testers and the SLIC 96. While meeting with some success, prior failure detection systems have met with certain limitations, particularly when applied to digital systems over twisted pairs between telephone company equipment and a subscriber. For example, some prior systems have been able to detect that a failure has occurred, but have been unable to identify the location of the failure. Other systems have been incompatible with existing telephone company facilities, or with digital twisted pair systems. Other equipment has required the installation of a test line between the central office terminal and a remote terminal at a customer facility. Still other systems have been exceedingly complex and/or costly.

Limitations with the mechanical enclosures for telephone equipment at customer facilities have also been encountered. Some enclosures have provided insufficient weather protection. Some enclosures have provided only limited access to frequently used components, have been excessively complex, utilize expensive components or fabrication techniques, or combinations of the above.

Problems have also arisen in connection with test ports for customer telecommunications equipment such as remote terminals at customer facilities. It is often desirable to provide an RJII connector of the type well known to those of skill in the art, or other such connector, at an external location at subscriber facilities such as a junction box leading to a house or a remote terminal of the type described above. Previously, such access is provided by installing a female RJ11 socket at such locations which is normally connected to a male RJ11 plug. The tip and ring wires (among others in some cases) lead from the female RJII socket, and connect to tip and ring connections in the male RJ11 plug, thereafter leading into the subscriber facility. When it is desired to connect test equipment to the RJ11 female socket, the plug is removed, and another male RJ11 is inserted into the female socket, thereby providing tip and ring connections for the test equipment.

Problems have arisen with such arrangements, however. For example, it is sometimes difficult to establish and maintain an adequate environmental seal in a removable male RJ11 plug, particularly when wires lead from the male RJ11 plug. Accordingly, moisture and other environmental contaminants are allowed to enter such plugs, sometimes resulting in corrosion and/or failure of the connection of the tip and ring connections in the socket/plug combination.

It is desirable to provide an improved and more economical method and associated apparatus for multiplexing multiple phone line connections over a single twisted pair connection especially for use in providing multiple phone lines over a single twisted pair into a home or office from a local telephone exchange. It would further be desirable to provide a system which provides useful alarm and failure detection systems which are also compatible with conventional telephone company service facilities. It is also desirable to provide an improved protection system for such equipment, as well as test access to customer equipment.

SUMMARY OF THE INVENTION

An improved method and apparatus for transmission of multiple signals over a single twisted pair is disclosed which provides in its various embodiments for the previously recited desirable features among others. In a preferred embodiment the invention provides for transmission of multiple voice and/or data signals over a single twisted pair from a local telephone exchange to a subscriber.

An improved test and alarm system for the digital transmission system is also disclosed. The alarm system provides for both automatic and self test. The system provides identification of the location of any failures in the system and is compatible with current telephone company repair and service facilities such as MLT/2 manufactured by AT&T, the Pair Gain Test Control (PGTC) system manufactured by AT&T, and 4TEL by Teradyne.

In one embodiment the test and alarm system comprises a test system for a digital main line system, the digital main line system including a line card (LC) at central office facilities and a remote terminal (RT) at a subscriber location. The digital added main line (DAML) system is adapted to transmit multiple signals in digital form from the line card to the remote terminal location over a twisted pair wire. The line card converts conventional analog signals to 2B1Q signals for transmission and the remote terminal converts the 2B1Q signals back to analog for use with conventional subscriber equipment. In a preferred embodiment, the system includes a remote terminal emulator at the central office facilities, the remote terminal emulator emulating output of the remote terminal with a predefined data pattern; and means for comparing a response of the line card to the emulated output so as to detect failures in the line card. The test system may further include a voltage source current monitor attached to the twisted pair, the voltage source current monitor adapted to detect failures in the twisted pair and generate ring and test request voltage for checking parts of the line card; a line card emulator, the line card emulator emulating output of the line card for transmission over the twisted pair; and means for detecting terminations, so as to detect failures in the remote terminal.

The test system may also include a voice frequency emulator, the voice frequency emulator connected to the line card or line card emulator for conversion to a digital signal for transmission over the twisted pair to the remote terminal, and means for evaluating a returned amount of noise or reflected signal so as to evaluate the function of the line card, the twisted pair and/or the remote terminal.

The test system includes testing of the digital-to-analog conversion equipment at the remote terminal, i.e., the RT is tested to a point after a subscriber line interface circuit. Furthermore, tests of a ring signal at the RT are conducted. Operation of test requests from telephone company equipment are tested by removing the analog input lines from service and reproducing various MLT voltage signals.

An improved enclosure for a remote terminal is disclosed. The enclosure includes a modular, sealed case for electronic components mounted on one or more circuit boards. The sealed case is preferably downwardly facing and mounted on a second enclosure. The second enclosure includes a first, user-accessible section and a second, restricted-access section. The user-accessible section is covered by a first door and the restricted access section is covered by a door having a limited access closure device such as a protected fastener, lock, one-way screw, or the like.

An improved test access port is also disclosed, especially for use in conjunction with the remote terminal in one embodiment. In a preferred embodiment the test access port includes, for example, a male plug and female RJ11 socket. Such connectors include tip and ring connections on, for example, the third and fourth terminals of the socket and plug.

In one preferred embodiment a male, dummy plug is provided for installation in the female test socket when the socket is not being used for attachment of test equipment. The male plug shorts or shunts the tip connection of the female RJ11 to, for example, the first terminal of the female RJ11 socket. The male dummy plug also shorts the ring connection of the female RJ11 socket to, for example, the sixth terminal of the RJ11 socket. The first and sixth terminals of the female socket are then connected electrically via, for example, a terminal block, to the wires leading into a home, office, or other subscriber location. The arrangement allows access to the female test socket for maintenance operations while allowing the system to be more effectively sealed from environmental contaminants during normal operations. In preferred embodiments, the female plug, a region surrounding the perimeter of the female plug, and/or a cap structure around the male plug are filled with gel sealant for further environmental protection.

A further understanding of the nature and advantages of the invention may be had with reference to the following figures and description.

BRIEF DESCRIPTION OF THE FIGURES

FIG. 1 is an overall block diagram of the system;

FIG. 2 is an overall block diagram of a remote terminal (RT) according to one embodiment of the invention;

FIG. 3 is an overall block diagram of a line card (LC) according to one embodiment of the invention;

FIG. 4a is a block diagram illustrating portions of the system used for test and alarm functions and FIG. 4b illustrates the master architecture in greater detail;

FIG. 5 illustrates the voltage source current monitor;

FIG. 6 illustrates the RT emulator in greater detail;

FIG. 7 illustrates the voice frequency OSC/monitor in greater detail;

FIG. 8 illustrates the LC emulator in greater detail;

FIG. 9 illustrates the PGTC interface and drop emulator in greater detail;

FIG. 10 illustrates the alarm status interface in greater detail;

FIGS. 11a to 11m are flow charts illustrating the LC/RT microprocessor code;

FIGS. 12a-12b is an overall block diagram illustrating the master control software architecture;

FIGS. 13a to 13o illustrate the master control operation and software in greater detail;

FIG. 14 is an isometric drawing illustrating the RT housing in a closed position;

FIG. 15 is an isometric view of the RT housing with open access doors;

FIG. 16 is a detailed front view of one embodiment of the customer and telephone company equipment compartments;

FIG. 17 is a mechanical illustration of the test access port at the RT or other subscriber equipment; and FIGS. 18a and 18b are simplified wiring diagrams schematically illustrating operation of the test access port.

DETAILED DESCRIPTION OF THE PREFERRED EMBODIMENTS

DETAILED DESCRIPTION OF THE PREFERRED EMBODIMENTS
CONTENTS

I. Definitions
II. General
III. Data Transmission Hardware
   A. RT Hardware
   B. LC Hardware
   C. Shelf Control Hardware
IV. Master Control Hardware
   A. General
   B. Overall Hardware Description
   C. Test Hardware
      1. VSCM Board (VI)
      2. RT Emulator
      3. Voice Frequency/OSC Monitor (VF)
      4. LC Emulator
      5. PGTC/Drop Emulator Interface
   D. Alarm Hardware
V. Software/Microprocessor Functionality
   A. RT/LC
   B. Master
      1. Software Architecture
      2. Test Software Operation
VI. RT Enclosure
VII. Test Access Port
VIII. Power Management
IX. Conclusion

I. Definitions

Certain terms and abbreviations are intended to have the following general definitions.

ACO — alarm cutoff
CID — craft interface device
COE — central office equipment
COT — central office terminal
COAS — central office alarm system
DAML — digital added main line
DSL — digital subscriber line
E2A (SAC) — Telemetry Standard for Alarms: status and command
E2A (APR) — Telemetry Standard for Alarms: alarm processing remote
IECQ — ISDN echo cancellation circuit, quaternary
ISDN — integrated services digital network
LC — line card
ICC — ISDN communications controller
MC — master controller
MTS — message telephone service (otherwise known as POTS lines)
OS/NE — Operation System/Network Element (An X.25 connection to central office equipment for monitoring and control of master controller)
OSC/OSI — Operating System Interface
PGTC — Pair Gain Test Control
POTS — plain old telephone service
RT — remote terminal
SC — shelf controller
SICOFI — dual channel signaling codec filter
SLIC — subscriber line interface circuits
X.25 — CCITT standard for interface to packet switched networks
2B1Q — Two Binary, One Quaternary, ANSI standard ISDN line transmission method for encoding 2 data bits onto a single 4-level symbol
4B3T — four binary, three ternary line transmission method

II. General

An improved method and apparatus for transmitting and receiving data over a single twisted pair wire are disclosed herein. The method and apparatus will find particular utility and is illustrated herein as it is applied in the transmission of multiple voice, data, and alarm signals over existing twisted pair lines which are used to connect homes, offices, and the like to local switching facilities, or central offices, but the invention is not so limited. The invention will find use in a wide variety of applications where it is desired to transmit multiple voice and/or data signals over a single twisted pair including, for example, facsimile, computer data, alarms, and/or low-speed video signals.

The Digital Added Main Line (DAML) described herein is a pair gain system. Parts of the system are drawn from and compatible with the Bellcore Universal Digital Channel. The system provides two Message Telephone Services (MTS) (a/k/a POTS lines), and two Auxiliary lines over a single copper twisted pair. The system uses ISDN 2B1Q line format to transport the signal, is line powered, and includes various self-test capabilities. The ISDN 2B1Q line format supports two 64 kbps voice channels and a single 16 kbps data channel, as well as additional signaling overhead over a single twisted pair. The data channel is partially used for system overhead functions and to support maintenance and alarm capabilities of the system.

As shown in FIG. 1, the system includes a digital subscriber line (DSL) 100, connected at the subscriber end to a Remote Terminal (RT) 102, and at the central office end 112 to a Line Card (LC) 104. Each RT-LC pair and its associated DSL constitute a line set (LS).

The remote terminal supports the connection of up to two analog POTS lines 106a and 106b connected to subscriber equipment 108, and two auxiliary lines 107a, 107b for continuity lines (used in, for example, burglar alarms). Each of several line cards 104 are connected to the exchange 109 in the central office by two analog subscriber lines 110a, 110b. Each line card also has two additional auxiliary ports 113a, 113b.

Up to, for example, 17 line cards are plugged into a powered backplane containing a single Shelf Controller (SC) 114. The shelf controller communicates with the line cards via a single serial line through a backplane with a 4.8 kbps asynchronous RS-232, also referred to as the shelf bus (SB) 116. The shelf controller serves to monitor and communicate with the line cards.

Up to, for example, 30 shelf controllers communicate with one master controller (MC) 118, over an RS-485, synchronous serial line running at, for example, 48 kbps, also referred to as the frame bus 120. The purpose of the master controller is to allow local or remote control and alarm and test functions for the line sets. The master controller can be controlled from a front panel 411 or a central office interface (OS/NE) 414, via an X.25 connection. The master controller also has an additional synchronous serial port RS-232 known as the craft interface 413 for maintenance purposes and has various central office alarms 416.

III. Data Transmission Hardware

A. RT Hardware

FIG. 2 is a block diagram of a remote terminal (RT) 102 according to one embodiment of the invention. The RT would be placed in, for example, a home, office or other subscriber facility for transmission and/or reception of voice or data signals over the single twisted pair line 100. A plurality of phones or other subscriber equipment would utilize analog signals produced by the RT and provide analog signals to the RT for transmission over the twisted pair.

A conventional two-wire DSL 100, which may be the type commonly leading into households, offices, or the like provides input/output to the RT. As will be readily apparent to those of skill in the art, the signals transmitted over the DSL could either be a telephonic voice or data signal from the LC. The invention will be illustrated herein as it applies to the RT primarily with regard to an incoming signal, but the process is similarly applied in reverse to provide voice and data signals from the RT to the LC.

The DSL signal, representing in digital form a voice or data signal, enters a two-wire to four-wire line transformer 202 for isolation and for impedance matching via a maintenance termination unit 406. The voice or data signal entering the line transformer 202 is an 80 ksymbols/sec (i.e., kbaud/sec) signal having one of four voltage levels (2B1Q). While the invention is illustrated herein with regard to the preferred 80 ksymbols/sec signal, it is believed that the invention herein would find utility using signals of between about 50 and 100, and preferably between 70 and 90 ksymbols/sec. Using other standards, such as 4B3T (a ternary symbol), other rates may be desirable such as 120 ksymbols/sec. The data rates and standards and rates used herein are of course only illustrative and will of course vary from one system to the next and as the underlying technologies evolve. The use of an 80 ksymbols/sec 2B1Q ANSI line protocol signal permits the transmission and reception of voice and data signals over extended lengths of twisted pair wires, e.g., 1,000, 15,000, 20,000, 60,000 feet or more, without substantial smearing, i.e., signal quality over large distances is improved because the lower frequency 80 ksymbols/sec signal may be more readily separated. These results are achieved over conventional line sizes such as 19, 22, 24 or 26 awg.

Preferred two- to four-wire conversion circuits are disclosed in U.S. application Ser. No. 07/579,006, "Improved Coupling Circuit for Two-Wire Transmission Systems", incorporated completely herein by reference for all purposes.

The signal from the line 2w/4w transformer 202 enters an ISDN Echo Cancellation-Quaternary (IECQ) chip 204 via line 203. The 80 ksymbols/sec 2B1Q ANSI line protocol signal contains 160 kbits/sec of information and the IECQ chip 204 converts the 80 ksymbols/sec signal into a 160 kbits/sec binary signal. The 160 kbits includes 16 kbits of control information and 144 kbits of user data. The ICC operates on a clock signal (CLK) at, for example, about 520 kHz and a frame control signal (FSC) at, for example, about 8 kHz.

Over a one-wire serial bus 213, the ICC chip 206 sends 8 bits of data on one channel, 8 bits of data on the other channel, 8 bits of control, and 8 bits of signal data to Codec Filter (SICOFI) 210, and then repeats, permitting substantially simultaneous transmission/reception of two or more voice or data signals. Monitor data, ring data, and other data which the microprocessor polls are also made available to the microprocessor.

SICOFI 210 converts the binary bits for each channel into analog voice or data signals in which frequency and amplitude are modulated. The analog signals are then transmitted over lines 209 to Subscriber Line Interface Circuits (SLIC's) 212a and 212b. SLIC's 212a and 212b are four-wire to two-wire converters and control the power available for utilization by the subscriber's phone or other communication device by superimposing the analog AC signal on DC such as 48 or 24 v. DC. Conventional analog information is provided to subscriber phones from the SLIC's over lines 214a and 214b.

Ring generator 216 is connected to a line via relays when it is desired for a phone to ring, under the direction of the microprocessor. The ring generator is not active under normal states, and is activated and connected to the line via a relay only when a ring signal is transmitted (in digital form) over the twisted pair in preferred embodiments. Power supply 218, using a process more fully described below, provides general power and ring power to the phones at appropriate times via a ring bus 220. Test loads 428/430 are used for imposing loads selectively on the lines under the direction of the microprocessor during testing operations. Auxiliary lines 1 and 2 are used for alarms and the like. Relays selectively connect the ring generator and test loads. A maintenance port 430 and status indicators 403 may also be provided in some embodiments.

Outgoing signals from the subscriber are processed in a similar but reverse method from incoming signals. In particular, analog signals enter SLIC's 212a and 212b for two-wire to four-wire conversion via lines 215. Signals from SLIC's 212a and 212b enter SICOFI 210 via lines 209 for analog-to-binary 8-bit word conversion. These 8-bit words are, thereafter, converted in ICC 206 into a binary stream containing 160 kbits/sec of user information (144 kbits of user data plus 16 kbits of line control) for input to IECQ 204 via line 205. IECQ 204 converts the 160 kbits/sec signal to an 80 ksymbols/sec quaternary signal for transmission to telephone company equipment over the twisted pair 100.

B. LC Hardware

FIG. 3 is a block diagram of a line card (LC) 104 which would be placed in a local switching unit, central office, or other telephone company equipment at the terminus of a twisted pair wire 100 from a home, office or the like. The function of the LC is similar to that of the RT, but reversed, i.e., the LC converts conventional analog signals from local exchange lines 110a and 110b to appropriate digital signals for transmission over the twisted pair and converts digital signals from the twisted pair to analog for transmission over local exchange lines. Of course, the LC is not generally power constrained (due to its location and lack of need to provide ring capability) and may function using a conventional 48-volt power supply. A DSL power feed 352 is used to power the RT from the local switching unit.

Ring detects 354a and 354b detect an incoming ring signal from switch lines 350a and 350b from the two analog switch lines by AC coupling. When a ring is detected the microprocessor sends an appropriate digital ring signal in the line control data so as to ring a line at the RT. Test detects 355a and 355b detect a voltage indicative of a test request from the local phone company.

Incoming analog signals enter SICOFI 356 from the switch lines via two-wire to four-wire converters 369 and lines 355a where they are converted to digital, 8-bit words similar to those in the RT described above. SICOFI 356 transmits to the ICC via bus 357. ICC 358 serves a multiplexing and data handling function similar to that of the ICC in the RT and transmits 160 kbits/sec of user information (144 kbits of user data plus 16 kbits of line control) to IECQ 360 via line 359 for conversion to 80 ksymbols/sec quaternary signals for transmission over twisted pair 100 via four-wire to two-wire converter 361 preferably using circuitry disclosed in the above referenced and incorporated application. The LC similarly processes incoming digital information from the RT in a reverse order.

The functionality of the LC is overseen by a microprocessor 360, similar to the RT. A clock (not shown) provides timing information for the microprocessor and the other components in the LC. Bus 366 serves to provide an office system interface from system alarms. Status indications 407 are provided via, for example, lights, alarms, or the like. Test bus 367 operates relays and provides connections via relays 371, 373, and 375 to the test lines TEST INPUT, TEST OUTPUT, and TEST DSL, the function of which is described in greater detail below.

Without in any way limiting the scope of the invention, Tables 1 and 2 provide a list of commercially available components which are useful in operation of the RT and LC, respectively, according to the above embodiments. It will be apparent to those of skill in the art that the components listed in Tables 1 and 2 are merely representative of those which may be used in association with the inventions herein and are provided for the purpose of facilitating assembly of a device in accordance with one particular embodiment of the invention. A wide variety of components readily known to those of skill in the art could readily be substituted or functionality could be combined or separated. It should be noted that CMOS-based devices are preferred (e.g., the microprocessor) so as to reduce power consumption of the RT in particular.

TABLE 1

| RT Components | |
|---|---|
| Line Transformer 2 | 13 mh, 1:1.32 |
| IECQ 4 | Siemens 2091 |
| ICC 6 | Siemens 2070 |
| Microprocessor 8 | Intel 80C49, 80C51 or 87C51 |
| SICOFI 10 | Siemens 2260, or 2060 |
| SLIC 12 | Erickson PBL 3764, or Harris equipment |
| Buffer 22 | 74HC244 |

TABLE 2

| LC Components | |
|---|---|
| Ring Detect 54 | Siemens PSB 6620 |
| SICOFI 56 | Siemens 2260 or 2060 |
| ICC 58 | Siemens 2070 |
| IECQ 60 | Siemens 2091 |
| Clock 62 | 74HC4060 |
| Microprocessor 60 | Intel 80C51, 87C51 or 80C49 |

C. Shelf Control Hardware

The shelf control 114 is comprised of a microprocessor such as those listed in the table above in conjunction with, e.g., a Siemens 82520 HDLC communication controller. The SC concentrates data from the various LC's in accordance with well known techniques.

IV. Master Control Hardware

A. General

FIGS. 4a and 4b illustrate test and alarm equipment for the digital added main line system in conjunction with abbreviated versions of the master control (MC), RT, and LC. Test and alarm services are provided to both the central office line card 104 and the remote terminal 102 by master test and alarm system 118. The system is compatible with metallic line testers such as the MLT, 4TEL and conventional pair gain test controllers (PGTC) 408.

The remote terminal 102 has two LEDs 403a and 403b for interfacing with the user/service personnel. The first indicates whether the link is up and the other indicates power-on, no link. The LEDs are preferably only active when the RT's limited access enclosure door is open. There is also a tamper sensor 405 which is activated when the limited access enclosure is opened, providing an indication to the MC that the device has been tampered with. A maintenance port 430 may optionally be provided on the RT for testing by service personnel from the subscriber facilities.

The line card has a single button on the front panel for lamp test. The line card 104 has a variety of LED's 407 to indicate the system states. In one embodiment they include the following:

minor: indicates minor alarm condition
DSL: lit if DSL is connected and active
test: used to indicate test request received and under test
tamper: used to indicate that tamper signal received from RT
line1: used to indicate status on line 1
line2: used to indicate status of line 2
aux1: used to indicate status of auxiliary 1
aux2: used to indicate status of auxiliary 2

The shelf controller has two buttons for input by a user, i.e., alarm cutoff (used to silence alarm); and lamp test (used to test lamps). Depressing both buttons simultaneously clears any outstanding alarms. The shelf controller has four LEDs 409 to indicate the system status. They include:

major indicates, for example, 13 or more LCs reporting faults
minor indicates, for example, 1-12 LCs reporting faults
test: indicates that shelf is connected to test bus
test OK: 0 LCs are down The master controller has two user interfaces: the front panel 411 and the craft interface 413. The front panel 411 of the master controller allows the operator to:

Set a channel into test
Query status of a channel, including test status, block error counts
Silence alarms The front panel includes an alphanumeric display element and a keypad 415, with keys for 0-9, up cursor, down cursor, left cursor, right cursor, alarm cutoff, test, status, special function, enter, and escape (level up).

The craft interface 413 includes a DB-25, RS-232 connection which allows the system operator to perform operations by connecting either an asynchronous terminal or a computer. Specifically, from this interface, the operator is able to perform the following:

Set a channel into test
Query status of a channel, including test status
Silence alarms In general, the test and alarm system tests the functionality of the entire system as well as various subsets of the entire system and alerts a user or craftsman of any problems. This enables detection of not only a failure in the digital added main line, but also definition of the source of the failure. Definition of the location of any failure enables the dispatch of a craftsman specific to the problem at hand. For example, if the problem is in the twisted pair between the COT and the RT, a line repairman may be dispatched, while a craftsman skilled in the repair of electronic components may be dispatched if the problem is located in the COT or the RT.

B. Overall Hardware Description

The DAML Master Control monitors and controls all other DAML subsystems including SC and LC subsystems. By polling all active SC's, abnormal conditions can be detected by the MC and reported to a Central Office Alarm System (COAS). In addition to monitoring functions, PGTC and MLT test requests are detected and test procedures are initiated by the MC on the selected subscriber line. The tests are performed by the MC test and a DAML flexible test bus (DAML FT bus). A Remote Maintenance Terminal (RMT) can, in preferred embodiments, be connected to any Remote Terminal end module for the purpose of performing maintenance. A limited number of simultaneously active remote maintenance terminals (RMT's) can communicate from the RT via the SC to the MC and access pertinent information about the LC.

The test and alarm hardware is illustrated in conjunction with the LC 104, the RT 102, and master control 118 in FIG. 4a. In the particular embodiment in FIG. 4a, the RT is provided with a maintenance termination unit (MTU) 406 between the twisted pair 100 and the link interface 202. MTU 406 may be, for example, two voltage-sensitive switches which close when the voltage reaches a given level (manufactured by, for example, Tycor). Within the RT 102, RT test termination equipment 412 is provided, including, for example, absorbent and reflective loads. Data concentrator/shelf control 114 is provided for management of message transmission.

The functions of the various pieces of test equipment are carried out under the control of one or more test microprocessors 402. The test microprocessor(s) communicate with phone company operating system interface via OSS (Operating Support System Interface) line 414. Line 414 may, for example, provide an indication of a failure of a channel to the telephone company directly.

Test microprocessor(s) 402 also provide output to alarm/alarm relay 416 for a physical indication of a failure (or non-failure) of any particular component or components. Alarm 416 may, for example, be appropriately illuminated lights such as described above, audible signals, physical connections to phone company facilities or, in preferred embodiments, interactive operator facilities. Microprocessor(s) 402 also controls the operation of voltage source current monitor 418 (the VI board), RT emulator 420, voice frequency OSC (oscillator/ monitor) 422 (the VF board), central office terminal LC (COTLC) emulator 424, and PGTC interface 426. A digital-to-analog converter (DAC) 427 serves to convert various analog signals to digital (and the reverse) to service microprocessor(s) 402, voltage source current monitor 418 and VF board 422.

Three test lines are connectable via the SC to various portions of the MC. They are test input (IN), test output (OUT), and test DSL (DSL). The VI board is connectable to all three, while the RT emulator is connectable to OUT and IN, the VF board is connectable to IN, the LC emulator is connectable to DSL, and the PGTC interface is connectable to all three.

FIG. 4b illustrates aspects of the MC in greater detail. The MC, in one embodiment, is mounted in a rackmount chassis with an industry standard STD-Bus. According to one specific implementation of the invention, each MC chassis contains the following STD board components:

a ZT8809 V20 board 436
a ZT8830 8088 board 438 with Zendex ZBX 354 Communication unit
an RS485 Driver PCB 439
a VersaLogic VL-1225 Analog/Digital Conversion PCB 441
a VI Test PCB 418
a VF Test PCB 422
an LC Emulator PCB 424
an RT Emulator PCB 420
a Central Office Alarm Interface PCB 416
a PGTC Interface PCB 426

As shown in FIG. 4b, the MC, in one embodiment, utilizes two Central Processing Units (CPU) located in each of two the boards 436 and 438. Board 436 in one embodiment is a single board computer based on the Intel 8088 CPU and modeled against the IBM PC/XT. Its peripheral devices are mapped according to the IBM PC I/0 map except for two additional timer/counters (Timer 1 and Timer 2). The actual CPU on board, in one embodiment is an NEC V20 or Intel 8088 operating at e.g., 8 MHz. Its maximum on-board memory is 512 kbytes of combined ROM and RAM. Board 436 is configured as a master processor in the STD-Bus. The STD-Bus allows for a multi-processor environment with one master and many slave processors. Of course, the particular devices discussed above are merely illustrative of those which could be utilized in conjunction with the invention and strike a balance of cost and operating performance. Naturally a wide array of more or less sophisticated devices could be utilized without departing from the scope of the invention herein.

Board 438 is an Intelligent I/0 Control Processor based on the Intel 8088. Board 438 is configured as a slave processor sharing the STD-Bus with board 436. It contains the 8088 CPU operating at, for example, 8 MHz, memory capacity of 32-kbit ROM and 32-kbit RAM, and a MULTIMODULE ZBX adapter. In one embodiment, this SBX adapter is furnished with a Zendex communication module based on the Zilog 8530 communication controller 439 which offers the HDLC synchronous formats.

In the MC, board 436, hereafter referred to as the MC Application Processor, is used to handle all application tasks such as status monitoring, alarm handling, test request handling, and LC coefficient supervision. In addition, it handles low throughput RS232C communications to the MC Front Panel and the Craft terminal. Board 438, hereafter referred to as the MC Communications Processor, is used to handle the communication requirements of the Frame communication (MC to SC), the OS/NE, and the E2A.

The RS485 Driver PCB 441 is used in conjunction with the Communications Processor 438 to provide RS485 drive interface.

C. Test Hardware

The major boards of the MC are discussed in greater detail below, along with a brief description of their functionality.

1. VSCM Board (VI)

In general, the purpose of the voltage source current monitor 418 is to detect failures in the twisted pair between the LC and the RT. In addition, the VSCM generates ring voltages to test the ring detector in the LC and generates test voltages to perform checks of the test detect module in the LC.

Generally, the DSL is tested for shorts between lines and to ground by disconnecting the DSL from the LC and connecting the DSL to the VSCM board via the Test DSL line of a test bus. The system then applies various voltages to the DSL and checks for shorts between tip and ring conductors (the two wires of the DSL) and between either of the conductors and ground.

FIG. 5 illustrates the VSCM board in greater detail. The board is selected by applying an appropriate address to the STD bus 502 and detected in address decoder 504. When the VSCM board is selected, data latch 506 pulls needed data off the STD bus according to means well known to those of skill in the art.

According to the data on the bus the board drives appropriate relays with relay drivers 508 for application of a selected voltage to a selected line. Relay K1 applies the selected voltage to the line labeled Test DSL in FIG. 4a (DSL), relay K3 applies the selected voltage to the line labeled Test Out (Out) in FIG. 4a, and relay K3 applies the selected voltage to the line labeled Test In (In) in FIG. 4a.

Using relay K5, the VSCM board can apply a voltage to the tip wire. The applied voltage may be selected from either of a constant voltage from a DAC 427 or a 20 Hz signal 510 from the VF board. The selected voltage is amplified in amplifier 512 having a gain of, for example, 30.

Current monitor 514 and voltage monitor 516 monitor the response of the system when these voltages are applied, reporting an analog signal to the DAC for ultimate determination of whether, for example, a short is present in the DSL to ground or between the two wires of the DSL.

As shown in the bottom portion of FIG. 5, a duplicate set of devices is provided for the ring wire of the DSL, operated under the direction of relay K4.

2. RT Emulator

As shown in FIG. 4a, the RT emulator 420 is used to generate signals similar to that which would be produced by the RT. The RT emulator is used for testing of the LC, for testing of the LC emulator, and the like, using signals from the voice frequency board. During testing, a test signal is injected by the VF board to the LC while the RT emulator is commanded to connect absorbent and reflective loads. The resultant reflected signals from the line under test are then evaluated to identify any failures in operation of the LC.

FIG. 6 illustrates the RT emulator in greater detail. As with the VSCM board, the RT emulator is selected by applying an appropriate address to the STD bus 502. The card is addressed via address decoder 602. The address for a desired register in the ICC 612 is then decoded and stored in buffer 604. Data from the STD bus are held in buffer 606 for the ICC 612.

Based on data provided from the bus, one of relays K1 or K2 is closed with relay driver 606 to apply or receive data from the Test DSL or Test Output lines. The emulator functions similarly to the RT except that it operates under the direction of the test microprocessor rather than a dedicated microprocessor. DSL signals are input to the system via hybrid (two- to 4-wire conversion) circuit 608 such as the one described in connection with the above incorporated patent application. These signals are then converted from 2B1Q to binary in IECQ 610, after which ICC 612 provides serial data to SICOFI/SLIC 614. These signals are then subjected to loads 616 and the signals are then reversed through the system for transmission back to, for example, an LC in test. Alternatively, if the ring generation of the LC is to be tested, a ring voltage is applied to the LC and, if the LC is functioning properly, a digital ring signal is received by the RT emulator, decoded, and the information transmitted back to the MC for confirmation of correct operation. MTU 618 acts in an analogous manner to the MTU of the RT.

By enabling selection of connecting the RT to either the Test DSL or Test Output lines, it is possible for the test system to perform a self test. Self test of the MC is accomplished by connecting the RT emulator to the Test DSL line while the LC emulator is similarly connected. Accordingly, tests of the test system may be performed in the same manner as tests of the actual LC and RT.

The RT emulator requires no separate power supply such as with the actual RT since it is located at the CO. The RT offers a load equivalent to the real RT with load circuit 616. Preferably, load 616 offers selection between one of several loads such as 5 and 33 mA to simulate real loads in the RT power supply for testing of the power feed and/or current limiters in the LC. In the RT emulator absorbent and reflective loads may be emulated by the SICOFI under control of the MC.

3. Voice Frequency/OSC Monitor (VF)

As shown in FIG. 4a, the voice frequency OSC/monitor 422 produces, for example, a simulated voice signal which is transmitted to the RT. From an evaluation of the amount of the reflected signal returned to the LC by absorbent loads 428 and reflective loads 431 in the RT it is possible to determine the overall function of the system. By "absorbent load" it is intended to mean herein, for example, a 600 ohm load. By reflective load it is intended to mean, for example, a short circuit. FIG. 7 illustrates the voice frequency OSC/monitor in greater detail.

As with the other boards in the MC, the address decoder 702 and the data buffer 704 of the VF board are connected to the STD bus 502. Depending upon the data obtained from the bus, the board operates relays K1, K2, and K3 via latches and drivers 708.

Function generator 710 is a waveform generator capable of generating a constant 20 Hz signal or generating a sweeping signal which alternates between various frequencies typically encountered in voice transmission. The specific output of the function generator is selected by way of relay K3. When the 20 Hz output is selected, it is passed through driver 712 and, thereafter, to the test input line for the ring test function of the MC. When the sweep function is selected, the signal passes through driver 714, transformer 716, and, thereafter, to either the Test Input line or the LC Emulator, depending upon the selection of either the K1 or K2 relays.

Loop current detector 718 is used for detection of loop current and is used to detect a condition in which the LC has seized because the phone is off the hook. For evaluation of returned signals, the reflected voltage is passed through a filter 720, RMS converter 722 and, thereafter, to the DAC on the MC.

4. LC Emulator

As shown in FIG. 4a, the LC emulator 424 produces a test signal or signals which emulate the actual LC from the voice frequency OSC/monitor 422, and transmits the signal to the actual RT or RT emulator. At least one of these test signals is in the voice frequency bandwidth. The system then measures the reflective signals at various terminations for a determination of whether the RT is functioning properly. FIG. 8 illustrates the LC emulator in greater detail.

As with the other boards, address and data are read from the STD bus. The address is decoded in decoder 802 and data and address information are latched into address buffer 804 and data buffer 806. Based on data input to the data buffer, relay driver 808 operates relays K1 and K2. When relays K1 are engaged the LC emulator is connected to the DSL. Relay K2 connects the LC emulator to the voice frequency board. When connected, input from, for example, the VF board is input to transformer T1, processed through hybrid circuit 810 for two-wire to four-wire conversion, and thereafter is processed through SLIC 812, ICC 814, IECQ 816, and hybrid circuit 818 and transformer T2 for output to the DSL in a manner analogous to the LC described above, using the improved two wire to four wire conversion described in the above incorporated patent. DSL power feed 820 supplies the RT with power in a similar fashion as the actual LC during testing operations. Necessary clock signals are generated by XTAL OSC 824 and frequency divider 822.

5. PGTC/Drop Emulator Interface

As shown in FIG. 4a, the emulator 432 serves to convert the various digital signals obtained from the various tests in the system to voltage signals compatible with conventional pair gain test controller 408. PGTC interface 426 serves as an interface between the 28-wire PGTC 408 and the digital test system 118. Conventional pair gain test controllers and their interfaces are disclosed in, for example, "Interface Between Loop Carrier Systems and Loop Testing Systems," *Bell. Comm. Res. Tech. Ref.* TR-TSY-000465 (Issue 2, April 1987) which is incorporated herein by reference for all purposes. FIG. 9 illustrates the PGTC interface 426 and the drop emulator 432 herein in greater detail.

The PGTC is connected to the standard bus and inputs an address-to-address decoder 902 and data decoder 904, respectively. The data input to the data transceiver are transmitted to PIA 906 such as a model no. 8255 made by Intel. PIA 8255 drives relay drivers 910 and 912 which control the interface with relays. The optical isolators 914 and 916 are for connecting/disconnecting loads. Responses are built into the line set code if, e.g., a reflective load must be connected when a ring is detected. The load portion 920 of the device serves as a dummy load in view of the so-called "golden pair" wire which is used in conventional MLT systems.

If the MLT system detects a pair gain circuit "signature," the system will apply a positive voltage to the tip conductor of the DSL with the ring conductor open. When this condition is detected the line card will apply a 333.3 Hz tone between tip and ring towards the PGTC. In the line card hardware this tone is generated by the SICOFI under control from the CPU and the CPU sends an appropriate message to the MC. The PGTC then waits for acknowledgement from the master control which will ground the SEIZE lead with the appropriate relay. When this SEIZE signal is present together with the 333.3 Hz tone, the PGTC will return a PROCEED signal to the master control. The conventional PGTC system has four test pairs, designated 1 through 4 in FIG. 9. Upon receipt of the PROCEED signal on one of the leads PROCEED 1 thru 4, the master control will close the relays of the tip and ring conductor 1, 2, 3 or 4, depending on the test channel indicated by the PROCEED lead.

There are two exception conditions which will prevent the PGTC test from proceeding. They are a) when the MC is a major alarm state it will ground the TMAJ lead and the PGTC system will remove the test request signal; and b) when the test bus is already in use, i.e., one of the four pairs is used, and a test request for another line is received, the SEZBY lead will be grounded. With a standard carrier system this signal is used to indicate that the "golden pair" is already in use.

Two options are available upon receipt of the PROCEED signal:

1) The tip and ring of the test pair are connected to one of the terminations 920 and the drop emulators and the PGTC system performs a channel test; or
2) The tip and ring of the DC test pair are connected to the DSL and the line card is connected to the RT emulator. The test system can do a metallic test of the real pair and the PGTC does a channel test of the line card connected to the RT emulator. In this case the MC connects the DC test pair to the DSL by closing the appropriate relay and connects the line card to the RT emulator by disconnecting the line card from the DSL and connecting the RT emulator to the TEST OUTPUT line.

When these connections are made the MC will ground the appropriate SLEEVE lead to signal that the necessary connections are made. Upon receipt of the SLEEVE signal the PGTC sends a LOCK signal and removes the PROCEED signal to the carrier system, indicating that all connections have been completed. When the loop testing system removes the positive voltage from the tip of the test trunk the PGTC completes the connection of the test trunk from the MC to the DC test pair (otherwise referred to as a "golden pair"). Removal of the LOCK signal indicates to the MC that testing has been completed and that all test connections are to be restored to normal. If a second test request is received for the same line, the "other" procedure is applied. Note the INHIBIT lead is not used in a DAML system as there is no real test pair or golden pair.

When an MLT test is detected by the LC, the MC will connect to the test pair of the MLT system. There are then two options:

1) The MLT system gets a resistive termination from which it can derive the status of the line: OK, LC fault, RT fault or DSL fault. In case of a DSL fault, access is given to the pair; or
2) The MLT system can get immediate access to the pair.

Either of these options can be chosen as default. When a second test request for the same line is received the other option will execute.

The PGTC interface allows a full testing by the Maintenance Center: the PGTC can do the channel test and the MLT or equivalent can do a test of the twisted pair. The system offers appropriate resistive signatures to indicate where the problem is based on the results of the test.

D. Alarm Hardware

FIG. 10 illustrates the alarm status board 416 in greater detail. An address decoder and data transceiver input address and data information from the STD bus via decoder 1002 and data transceiver 1004, respectively. Data are input to PIA 1006 such as a model no. 8255 made by Intel. PIA 1006 also receives input from optical isolators 1008. Optical isolators 1008 interface for input with four signals, i.e., CO Alarm Cutoff, which is a signal which shuts off the alarms at the direction of an operator, PSF, which is a power system fault alarm from each power supply, and 1,2 E2ASAC which are relay-activated telemetry systems. The output of PIA 1006 activates relay drivers 1010, which selectively drive 12 relays for activation of lights, buzzers, or the like, or for activation of the telephone company alarm system. In one embodiment, 8 alarms are output to the telephone company, as shown in a typical relay 1012 and 4 alarms are output at the CO, as shown with a typical relay 1014.

V. Software/Microprocessor Functionality

Appendices I to IV provide the major pieces of software used in operation of the digital added main line system disclosed herein. A description of each piece of code is provided below.

A. RT/LC

Appendix I provides an assembly language program listing (®Copyright 1990, Raychem Corporation, All Rights Reserved) for the RT microprocessor 208 discussed above. The code is adapted for and has been used on an Intel 80C51 microprocessor, although it will be apparent that the invention could be applied to a wide variety of such processors. Appendix II (®Copyright 1990, Raychem Corporation, All Rights Reserved) provides a similar listing for the code used in the microprocessor 360 in the line card. This code has been used in the Intel 80C51. Again, however, a wide variety of microprocessors could be used herein without departing from the scope of the invention.

FIGS. 11a to 11m illustrate overall operation of the LC and RT software. In particular FIG. 11a illustrates overall operation and architecture of the LC software. The software includes a main section 1101, an interrupt service routine for the ICC 1102, an interrupt service routing for clocks 1103, and an interrupt service routing for handling serial data 1104.

In the main section 1101 the system first initializes the various pieces of hardware and software at step 1105. The system then begins a main loop 1106 through which the system repeatedly cycles until the system is disconnected from power. The interrupt service clock initiates a section of code 1117 which performs routine operations needed during operation of the LC. The interrupt service for the ICC 1102 contains a section of code 1107 which handles DSL needs, and the interrupt service for serial data 1104 contains a section of code 1108 which handles various serial data requirements.

FIG. 11b illustrates the LC initialization and main loop 1105 and 1106 in greater detail. The initialization includes steps of hardware initialization 1109, memory initialization 1110, and timer/interrupt initialization 1111. The main loop then begins.

At step 1112, the SICOFI coefficients are set up and since this step occurs in the main loop may be varied over time. At step 1113 the system processes the serial port receiver. At step 1114 the system processes the serial port transmissions, and at step 1115 the system services watch dog timers. The system then idles at step 1116 until an interrupt is received.

FIG. 11c illustrates the interrupt service 1117 (isr.clk) in greater detail which is initiated based on a clock at, for example, 160 Hz. At step 1118 the system executes error control code and at step 1119 retrieves local status information. The system then services the first line (line "A") at step 1120 and the second line (line "B") at step 1121. At step 1122 a section of code provides output control and at step 1123 alarms are serviced. At step 1124 the system services the front panel display and at step 1125 the system provides DSL power control. At step 1126 the system sends DSL status information to the RT.

FIG. 11d illustrates the ICC chip service routine 1107 in greater detail. At step 1126 the system handles various fault problems and at step 1127 does synchronous transfer of data. At step 1128 the system handles various aspects of IECQ control and at step 1129 receives a message from the DSL.

FIG. 11e illustrates the serial interrupt service routine for the port shelf 1108 in greater detail. At step 1130 the system determines if a message is transmitted or received. At step 1131 the system outputs a byte for a buffer or, if a message is to be received, inputs a byte to a buffer at step 1132.

FIG. 11f illustrates the procedure 1113 used for receiving data on a serial port in the main loop. At step 1133 the system determines if a message has been transmitted and, if not returns to the main loop. If a message has been received, at step 1134 the system determines if it is a status request and, if so, processes the request. If not, at step 1135 the system determines if the message is a test request and, if so, processes it. If not, at step 1136 the system determines if a maintenance message is present and, if so, processes it. As shown in step 1138 the system may also be implemented to test for and process other types of messages.

FIG. 11g illustrates the process 1114 for transmitting outgoing messages in the main loop. At step 1139 the system determines if a message needs to be sent and, if not exits back to the main loop. If a message needs to be transmitted at step 1140 the system sets up for transmitting the message and at step 1141 tests to see if a test response is due. If so, the system adds the data and returns to the main loop. If not, the system tests at step 1142 to determine if a model response is due and, if so, adds the data. If not. the system proceeds to test for other responses due at steps 1143 and 1144 and, thereafter. returns to the main loop.

FIG. 11h illustrates the architecture and overall operation of the RT program. As with the LC code, the RT code includes a main section 1145, an interrupt section for the ICC service 1146, an interrupt section for clock-based routine service 1147, and a section for handling interrupts for serial data service for maintenance operations 1148. The main section 1145 initializes the hardware and software at step 1149 and then recursively iterates through a main code section 1150.

FIG. 11i illustrates the main section of code 1145 of the RT in greater detail. At step 1151 the various pieces of hardware in the RT are set up and the various memory locations are set up at step 1152. Timers and interrupts are started/set at step 1153. Thereafter, the system enters the main loop. As with the LC, the RT SICOFI coefficients are set up within the main loop at step 1154. Maintenance messages are then processed at step 1155 and a test request (if present) is processed at step 1156. Watch dog timers are set at step 1157 and the system then idles until an interrupt is received at step 1158.

FIG. 11j illustrates the clock interrupt service routine 1147 in greater detail. At step 1159 the system executes an error control sequence and, thereafter, at step 1160 obtains local status information. At step 1161 the system services line A and, thereafter, at step 1162 services line B. The system then executes an output control sequence at step 1163 and, at step 1164 services various alarms. At step 1165 the system reports service status and at step 1166 the status information is sent over the DSL to the LC.

FIG. 11k illustrates the ICC interrupt service routine 1146 in greater detail. At step 1167 various set up steps are conducted and at step 1168 the system does synchronous transfer of data to, e.g., the SICOFI. At step 1169 the system determines if additional data are to be transferred and, if so, returns to step 1168. If not, the system then handles IECQ control at step 1170 and, thereafter, receives a DSL message at step 1171. At step 1172 the system then handles any faults.

FIG. 11l illustrates the interrupt service routine for serial port maintenance 1148. At step 1172 the system determines if it is to transmit or receive. If it is to transmit, at step 1173 the system outputs a byte from a buffer. If it is to receive, it inputs a byte to a receive buffer at step 1174.

FIG. 11m illustrates the line service routine used at steps 1161 and 1162 in the RT. At step 1175 the system gets a state pointer and, if there is an indication to power down, the system does so at step 1176. If not, the system determines if an idle state is desired and, if so enters the idle state at step 1177, or if not checks for and, if necessary, enters a hold state at step 1178. At step 1179 the system determines if there is an on-hook condition and, if so, enters an active state. At step 1180 the system determines if there is a dial hold state and, if so, does a dial hold. If the system determines there is an on-hook active situation at step 1181 the system does an on-hook routine. If the system determines there is a ring wire condition at step 1182, it performs a ring wire routine, and, if there is a ring condition, performs a ring routine at step 1183. At step 1184 the system determines if a ring stop is to be executed and if so does a ring stop routine.

B. Master

The MC software is primarily resident with the Application Processor (Appendix III. ®Copyright 1990, Raychem Corporation, All Rights Reserved) and Communication Processor (Appendix IV. ®Copyright 1990, Raychem Corporation. All Rights Reserved), and operates the various hardware peripherals which perform the test and alarm functions herein.

The software is developed in a structured methodology using top-down design and bottom-up implementation practices. All code in the MC in the particular example shown herein is programmed in the "C" high-level language or 8088 Macro-assembly. Of course, the programming language and microprocessor environment will vary widely from one application to the next.

The software includes application modules interacting with lower-level hardware drivers architectured in a structured manner. The glue logic of all application modules and driver is a priority-based, multi-tasking, real-time, non-preemptive datagram operating kernel.

A datagram kernel provides the capability to application modules to be distinctly separated by function and still be able to intercommunicate and perform the combined functions of master controller. Generally speaking, MC application modules activate other modules by initiation of a datagram.

1. Software Architecture

FIG. 12a illustrates the overall architecture of the MC software in the Application Processor, the major portions of which are included in Appendix III. At the top of the MC Application Processor (MCAP) hierarchy is a MC System Manager module 1201 which oversees the functions of the MC including status monitoring, alarm reporting, line testing, coefficient management, and others. The MC System Manager initiates and manages subservient modules. The modules are: Command Interpreter 1203, Poll Handler 1205, Alarm Handler 1207, Test Supervisor 1209, Coefficient Handler 1211, and the Self-Test Supervisor 1213. The System Manager 1201, via a DSOS operating kernel 1215, provides communications input/output to front panel driver 1217, craft terminal interface 1219, OS/NE node driver 1221, and frame bus driver 1223. The system manager also provides test and alarm input/output to LC emulator driver 1225, RT emulator driver 1227, input handler 1229, and output handler 1231.

The Command Interpreter 1203 provides an interface to various external portions of the system and includes a front panel interpreter 1237, a craft interface interpreter 1239, an OS/NE interface interpreter 1241, and a maintenance port interpreter 1243.

The Poll Handler 1205 is primarily responsible for requesting information from the shelf controls. Any abnormalities detected by the Poll Handler will be reported to the pertinent application module. The Alarm Handler 1207 is responsible for reporting, recording, and handling of alarm conditions created by LC's or SC's.

The Test Supervisor 1209 is responsible for supervising the various test modules including the line set test module 1237, MLT/4TEL test module 1239, and PGTC test module 1241. Within the line set test module 1237, the system includes channel test module 1243, DSL test module 1245, LC test module 1247, and RT test module 1249. The LC test module and RT test module include RT emulator handler 1251 and LC emulator driver 1253. These subservient modules, under the general supervision of the Test Supervisor, interact with the MC test hardware and DAML test bus to execute the required tests.

The Coefficient Handler 1211 handles the support to special line coefficients, coefficient loading, and coefficient reports. The Self-Test Supervisor 1213 is responsible for performing integrity tests to the MC hardware subsystem. Tests can be performed on an on-demand basis, or on a scheduled basis. Subservient modules to the self-test supervisor include a CPU board verifier 1255, a power supply verifier 1257, and a test subsystem verifier 1259. The CPU board verifier is a normal PC board test. A test of the power supply is conducted in the power supply verifier.

The MC applications processor (MCAP) communicates with the MC Communication Processor by means of a full-duplex mailbox process which operates in the background and independent of the application tasks. Datagrams containing SC status information and other types of messages are passed back and forth between the MCAP and the Communication Processor using the command interpreter 1203. At the MCAP end, the messages are ultimately delivered to the corresponding module. At the Communication processor end, the destination would be a communication port such as the Frame Bus to the SC's or the X.25 connection to the OS/NE. All of the top level modules have available a number of drivers, specialized utilities, and general purpose operating system utilities such as queue handling, and timers to perform their assigned tasks.

From power-up, the MC System Manager directs an organized start-up of all other modules depending on whether the MCAP is starting from a cold start reset or a warm start. A cold start occurs when the system is powered-up for the first time from factory parameters. A warm start occurs if for some unforeseen reason the system is reset during operation, or as part of a software error recovery procedure.

During a cold start, the System Manager 1201 instructs the Self-Test Handler 1213 to begin a one-time test. If all tests pass, the System Manager begins operation. If any test fails, the System Manager issues a failure report via the designated system console. If the failure corresponds to a critical hardware component such as RAM memory failure, the start-up process is halted. Otherwise, the system is started in a degraded mode. The self-test may also be started on a periodic basis. This periodic self-test can be programmed after cold start using the system console. The self test is conducted by connecting the RT emulator and the LC emulator and performing the normal test sequences in the test subsystem verifier.

After the one-time self-test is completed, the System Manager continues the cold start procedure. Part of this procedure may be prompting the system operator to enter configuration data via the system console. For example, PGTC selected test procedure.

During a warm start, the System Manager retains all its data, and it reports the cause for warm start to the system console. Finally, after completing the start-up procedure, regardless of whether cold or warm start, it activates all subservient modules.

After the System Manager activates the Poll Handler, the LC and SC status information is gathered one at a time. When the Poll Handler is activated initially, it polls each SC from numbers 1-30 and gathers information. From this activity, the Poll Handler is able to record the status of SC's and LC's that respond to the poll.

The Poll Handler begins by issuing a STATUS REQUEST message to each SC starting from SC number 1 to the maximum number of 30. The STATUS REQUEST messages are automatically routed via the Communication Processor and then to the Frame Bus. Those SC's that do not respond after a predetermined timeout will be considered inactive or not connected. Those which respond to the call and send their status information are further analyzed.

SC's which respond to the STATUS REQUEST are analyzed to determine the status of their LC's. The information for all active LC's and SC's is recorded. If during the process of acquiring SC/LC status abnormal conditions such as minor alarms are detected, a message is issued to the Alarm Supervisor. For every LC which is down, a message DOWN LC REPORT is sent to the Alarm Supervisor. From time-to-time, other application modules or even modules which are external to the MCAP (for example, the RT maintenance terminal) may desire to request status information about a particular SC or LC.

When the Poll Handler begins polling all SC's, it does so at a rate of, for example, one SC every 100 msec. This polling cycle, which can be modified using the system console, is optimal for detecting LC ring conditions which are the most rapidly changing of the LC-related information.

The Alarm Handler 1207 is responsible for reporting, recording, and handling alarm conditions created by LC's or SC's. The following conditions are evaluated for possible alarms:

a) LC's are monitored for link down. This is a minor alarm 1216.
b) SC's are monitored for having from 1 to 11 LC's down. This is a minor alarm 1214.
c) SC's with 12 or more LC's down are considered major alarms 1218.
d) The system with 1 to 25 LC's down, or up to a maximum of 11 LC's down in one SC is considered to be in a minor alarm state. Similarly, 26 or more LC's reported down, or 12 or more LC's on one SC is considered a major alarm.

The Test Supervisor 1209 is responsible for the specialized task of testing and servicing the CO test request. The Test Supervisor has several subservient modules which handle each special test procedure, including the line set test module, the MLT/4TEL test module, and the pair gaing test control module. The specialized test modules are: LC Emulator Handler, RT Emulator Handler, Line Set Handler, LC Test Handler, and RT Test Handler.

Each test module is given the START TEST command. Upon test completion, the corresponding modules respond with a message further qualifying the test outcome, whether passed or failed, and a test report.

The Coefficient Supervisor 1212 handles the support to special line coefficients, coefficient loading, and coefficient reports.

When an LC becomes operational, a message will be sent by the LC to the Coefficient Manager. The Coefficient Manager will verify if there are special coefficients for the specified LC which may require loading.

If the newly logged LC is listed as requiring special coefficients, a message is sent to the remote LC unit via the corresponding SC. After a predetermined time, the Coefficient Manager will compare the loaded coefficients with the one sent. If both transmitted and received versions match, the loading is considered successful. Otherwise, the process is started again.

The Coefficient Supervisor will retry coefficient loading several times. If after this time it is still unsuccessful, a warning message is sent to the system console indicating the problem condition.

The Self-Test Handler 1206 is responsible for performing hardware integrity tests to the MC subsystem. Tests can be performed on an on-demand basis or on a regular basis. The IECQ handler and SICOFI handlers manage operation of the MC SICOFI and IECQ.

The MC Communication Processor (MCCP) software includes communication link control modules which transmit/receive data in a format specific to the channel being serviced. These modules perform the link control functions in an ISO layered architecture. The link control modules are: Frame Link module, OS/NE Link module, E2A Link module, and Mailbox Link module.

Link modules are supported by their respective communication drivers which are normally Interrupt Service Routines (ISR). These drivers correspond to their link control counterpart of the same name: Frame Driver, OS/NE Driver, E2A Driver, and Mailbox Driver.

The channel formats that will be provided for the DAML MCCP are: Frame for the MC-SC Frame bus, X.25 for OS/NE, Serial Asynchronous for E2A, and the Mailbox format.

A Router module which provides the network layer functions interfaces with all communication drivers and is capable of routing message packets from channel to channel. The routing is dependent on a routing table which matches destination module name with channel number. Thereby, messages need only be coded with a destination and the Router module would identify and route the message to the proper channel. At the end of the routed channel where the destination module is expected to reside.

2. Test Software Operation

FIG. 12b is an overall flow chart illustrating the functionality of the test and alarm system. It will be recognized that the master provides test capability to a number of RT/LC users (e.g., 100 or more) and that this process is rapidly repeated for each of the RT/LC pairs.

The system initially performs a test at step 1202 to determine if a line set is busy and, if not, a shelf is selected at step 1204. The system then performs an entire system test or channel test 1206 which tests the efficacy of the entire system from telephone company lines to and including the RT equipment. If the test is O.K. (step 1208), a report is made at step 1210 and the shelf is deselected at step 1212. If the channel test is not O.K., an RT emulator is then utilized to perform a test of the LC at step 1214. The voltage source current monitor is then utilized at step 1216 to determine if a failure such as a short between wires or to ground has occurred in the twisted pair between the master and the RT. If a failure is detected in the twisted pair, reports are made at step 1210 such that, for example, a line repairman may be dispatched to repair the twisted pair. If the DSL test is passed, a LC emulator is utilized to test the functionality of the RT at step 1218, followed by status reporting at step 1210.

FIG. 13a is a more detailed flowchart illustrating the optional line set test 1202. This portion of the test is skipped if a request to this effect is made. At step 1302, upon a provisional test request, the MC will check whether line A or B of the selected LS is busy. If one of the two lines is busy, the system increments a counter at step 1304 and, if the counter is greater than a selected number (step 1306), returns a line busy message at step 1308. If the counter is not greater than 10, the system waits a selected time at step 1310 and repeats busy-check. If none of the lines is busy, the test system continues.

The system then selects the appropriate shelf. FIG. 13b illustrates the select shelf step 1204 in greater detail. At step 1312 the system broadcasts a message to all shelves to disconnect from the test bus. Then, at step 1314, the system connects the selected shelf to the test bus by transmitting an appropriate message to the SC.

The system then performs a channel test; this checks the performance of both voice channels. In general, the channel test includes the steps of selecting the line, issuing a test request, performing an absorbent test, performing an on-hook test, testing the ringer, performing a reflective test, and deselecting the line. FIG. 13c illustrates the channel test 1206 in greater detail. At step 1316 the system checks whether the DSL of the selected line set is up (i.e., if the IECQ's are linking). If the DSL is not up the system waits for a short time and tries again for a selected number of times. If the DSL is still not up, the system logs the status in the test status database for the specific SC/LC, time stamps it, and exits the channel test at step 1318. This procedure is necessary because the Line Set may be trying to link. Especially when the LC Emulator or RT Emulator are used, it will take some time before they are linking. If the DSL link is up, the system continues.

The system then performs a test of line A. The system initially selects the desired line at step 1320 by transmitting a message to the selected LC. This also disconnects the line card from the exchange. A delay of, for example, 250 ms, may be allowed at step 1322 to allow for the LC to get the message and for confirmation to get back to the MC that the line is selected. The confirmation of the LC is checked and the result is logged.

The system then proceeds to test the selected line. At step 1324, the VSCM board Tip and Ring voltages are set to 0 volts. A delay of, for example, 15 ms may be allowed for the lines to settle. At step 1326 the system connects the VS board 418 to the input of the LC. A delay of, for example, 25 ms is then allowed for settling of the relays. At step 1328, the system applies a test request voltage of, for example, 113 volts to the tip of the VS board. The ring wire or line is left open. A delay of, for example, 250 ms is then allowed for settling of voltages and for the LC relay to get to the MC. At step 1330, the system checks for an LC test request message and logs the result. The system then resets the voltages of the VS board to 0 volts at step 1332. A delay of, for example, 100 ms is allowed for settling of voltages and the VS board is disconnected from the LC input.

The system then performs an absorbent test of the selected line. As shown in FIG. 13d, at step 1334 the selected line of the RT and the absorbent load of the RT are connected to the RT test bus by transmitting a message to the LC. This will close the seize relays as it simulates an off-hook condition and disconnect the subscriber from the line. At step 1336 the system selects the frequency sweep on the VF board. At step 1338 the VF board is connected to the test input line. A delay of, for example, 275 ms is then permitted to allow for MC to RT transmission, for settling of relays at the RT, and for RT to MC transmission. At step 1340 the system checks the confirmation of the RT and logs the result. At step 1342 the system reads the reflected voltage from the DAC input, allowing for delay of, for example, 100 ms for settling of A/D conversion.

At step 1344 the system compares the reflected voltage with a reference value(s) and, at step 1346, logs the result. At step 1348 the absorbent load is disconnected from the RT test bus by transmitting a message to the LC. This creates the on-hook condition. The seize relays will open as the RT will see on-hook.

FIG. 13e illustrates the on-hook portion of the channel test. The VF board is still connected to the test input line and the line at the RT is connected to the open RT test bus. After a delay of, for example, 275 ms to allow for MC to LC delay plus relay delay, LC to MC delay, and RT to MC transmission, at step 1350 the system checks for confirmation of the absorbent disconnect from the RT. The system then reads the reflected voltage from the DAC input at step 1352. After another delay of, for example, 100 ms for settling of A/D, the system compares the reflected voltage with reference value(s) and at step 1356 logs the result. The system then disconnects the VF board from the test input line.

FIG. 13f illustrates the ring test portion of the channel test. At step 1358 the system resets the VS board to 0 volts on Tip and Ring. At step 1360 the 20 Hz output on the VF board is selected and a delay of, for example, 25 ms is allowed for settling of the system. At step 1360 the VS board is connected to the test input line. At step 1362 the 20 Hz input on the VS board is connected to the ring and the tip remains at zero volts. After a delay of, e.g., 350 ms, the system checks the ring detect message from the RT and logs the result at step 1364. The 20 Hz signal from the VF board to the VS board is then disconnected at step 1366.

At step 1368 the VF frequency board is reset to frequency sweep. After a delay of, e.g., 25 ms for settling of relays and output voltage, the VS board is disconnected from the test input line. After an additional delay of, e.g., 25 ms for settling of relays, a reflective test is performed. The reflective test is illustrated in FIG. 13g.

Upon ringing the RT will connect the reflective short termination to the test bus. This connection will close the seize relays at the LC because the RT sees an off-hook state. At step 1370 the VF board is connected to the test input line after a delay of 150 ms. At step 1372 the system checks for the confirmation of reflective connection of the RT. The reflected voltage from the DAC input is tested at step 1374. After a delay of, e.g., 100 ms for settling of A/D, the system compares the reflected voltage with a reference value(s) at step 1376 and logs the result. At step 1378 the system disconnects the VF board from the test input line, and at step 1380 disconnects the reflective short termination from the RT test bus, disconnects the line in test from the RT test bus, and disconnects the line in test from the test input line by transmitting a return to normal message to the LC. The system then delays for, e.g., 125 ms and repeats the test for the other line at step 1382.

In preferred embodiments the system logs the status in a test status database for the specific SC/LC and time stamps it.

FIG. 13h illustrates the LC test procedure 1214 in greater detail. It is assumed below that the Shelf is already selected. At step 1375 the system initializes the RT emulator with a low current load. At step 1384 the system connects the DSL output of the selected LC to the TEST OUTPUT line by transmitting a message to the selected LC. At step 1386 the system connects the RT Emulator to the TEST OUTPUT line. The system then performs a DSL power feed test at step 1377. At step 1388 the system performs a channel test, which has been described in greater detail in relation to FIGS. 13c to 13g. At step 1390 the system disconnects the DSL output of the selected LC from TEST OUTPUT by transmitting a message to the selected LC. At step 1392 the system disconnects the RT-Emulator from the TEST OUTPUT line.

FIG. 13i illustrates the DSL test 1216 in greater detail. At step 1394 the DSL of the selected LC is connected to TEST DSL by transmitting a message to the selected LC. This disconnects the DSL from the LC. The DSL test is then performed at step 1396 and the system checks to see if the RT is connected at step 1373.

At step 1353 the system connects the tip line of the VSCM board to the TEST DSL and does not connect the ring line. The VSCM then applies a low voltage to the tip line, with the ring open. This test is conducted with a sufficiently low voltage such that the MTU in the RT is not effected and the voltage-sensitive switches therein do not close. At step 1355 the system measures the tip current and, at step 1357 the system compares with a reference value. At step 1359 a similar sequence of steps is conducted for the ring line with the tip line open. A high current at either step is indicative of the line in question being grounded.

Thereafter, at step 1361 the system connects both tip and ring to Test DSL and applies a low voltage to the tip line, with the ring to zero volts, and the current is measured at step 1363. The system then compares the measured current to a reference, and repeats at step 1367 with a low voltage at ring and tip at zero volts. A high current in either of these steps is indicative the tip and ground line shorted to each other.

The system then performs a test to ensure that the RT is connected. At step 1369 the system applies a high voltage to the tip line, this time sufficiently high to activate the MTU in the RT, i.e., to close the voltage-sensitive switches therein. The current to each of the tip and ring lines is then measured at step 1371, and compared to a reference value. At step 1373 this process is repeated with a high voltage to the ring line. A low current in either of these tests indicates that the RT is not connected. Optionally, a step may be performed to check for tip and ring reversal. For this test, the applied voltage must be high enough so that the voltage-sensitive switches in the MTU close, so as to connect the RT power supply electrically to the DSL. Just in front of a diode bridge of the RT power supply a load resistor such as a 200 K resistor in series with the diode is supplied. When tip and ring are connected correctly, the diode is blocking. By reversing the tip and ring voltage, a small increase of current will be detected.

Thereafter, at step 1398 the system disconnects the DSL and, at step 1400, disconnects the VS board and logs the results.

At step 1398 the DSL of the selected LC is disconnected from TEST DSL by transmitting a message to the selected LC. Thereafter, the VS board is disconnected from TEST DSL at step 1399. At this time the status in the test status is logged in a database for the specific SC/LC and time stamped at step 1400.

FIG. 13j illustrates the RT test 1218 in greater detail. At step 1301 the system connects the DSL of the selected LC to TEST DSL by transmitting a message to the selected LC. At step 1303 the system connects the LC-Emulator to TEST DSL.

At step 1305 the system checks whether the DSL of the selected line set is up by checking whether the IECQ chips are linking. If the DSL is not up, the system waits for a period of time and tries again. If the DSL is still not up, the status is logged in the test status database for the specific SC/LC, time stamped, and the test is exited. These steps are necessary because the Line Set may be trying to link. Especially when the LC Emulator or RT Emulator are used, it will take some time before they are linking. If the DSL link is up, the system continues.

At step 1307 the system selects one of the lines for test. The LC Emulator is set to the selected line. At step 1311 the system reads the line status of the LC Emulator. It is not relevant to issue a test request for the LC Emulator.

An absorbent test is then performed, as illustrated in FIG. 13k. At step 1313 the system connects the selected line of the RT and the absorbent load to the RT test bus by sending a message to the RT. The system then selects the frequency sweep on the VF board at step 1315. At step 1317 the system connects the VF board to the LC Emulator. After a delay (e.g., 50 ms) the system checks the confirmation of the RT and logs the result at step 1319. The system then reads the reflected voltage from the DAC input. After another delay (100 ms) for settling of A/D the system compares the reflected voltage with a reference value(s) at step 1321 and the results are logged.

At step 1323 the absorbent load is disconnected from the RT test bus by sending a message to the RT. This creates the on-hook condition. FIG. 13l illustrates the on-hook test.

The VF board is still connected to the LC emulator and the line at the RT is connected to the open RT test bus at this stage. After a delay (e.g., 50 ms), the system checks confirmation of the absorbent disconnect from the RT at step 1325. At step 1327 the system reads the reflected voltage from the DAC input and, after a delay (100 ms) for settling of A/D, compares the reflected voltage with reference value(s) at step 1329. The results accordingly are logged and the VF board is disconnected from LC emulator at step 1331.

The system then performs a ring test, which is illustrated in FIG. 13m. A ring request is sent to the RT at step 1333. After a delay of e.g., 200 ms the system checks the ring detect message from the RT and logs the result at step 1335.

The system then performs a reflective test, as illustrated in FIG. 13n. Upon ringing the RT will connect a reflective short termination to the test bus at step 1337. At step 1339, the system connects the VF board to the LC Emulator. After a delay (25 ms) a check at step 1341 confirms reflective connection of the RT. At step 1343 the system reads the reflected voltage from the DAC input and, after a delay (100 ms) for settling of A/D, compares the reflected voltage with reference value(s) at step 1345. The results are logged and the system disconnects the VF board from the LC Emulator at step 1347.

Thereafter, the system disconnects the reflective short termination from the RT test bus, and disconnects the selected line from the RT test bus by sending a return to normal message to the RT. The RT test is then repeated for the other line at step 1351.

Following testing of both lines at the RT, the system disconnects the DSL of the selected LC from the TEST DSL by transmitting a message to the selected LC and disconnects the LC-Emulator from the TEST DSL line. The status of the RT is then logged for the specific SC/LC and time stamped.

FIG. 13o illustrates the DSL power feed test 377 in greater detail. At step 1379 the system checks to make sure the selected DSL is up. If not, the system waits for a selected time at step 1381 and retries for a selected number of times. If the DSL is up, the system connects the voltage source board to the Test Output line at step 1383. At step 1385 the system measures the tip and ring voltage, and at step 1387 compares to a reference value, and logs the result. At step 1389 the system then connects a high current load in the RT emulator, and again measures the tip and ring voltages at step 1391. At step 1393 the system compares the values with a reference value and logs the result. At step 1395 the system disconnects the high load in the RT emulator and disconnects the RT emulator from the test output line.

By performing a test of the RT, followed by the DSL and LC tests, it is possible not only to identify that a failure has occurred in a LS, but also to identify the location of the failure within the LS. This has a variety of benefits. For example, if the failure is in the RT, a repairman can be dispatched to the user facilities and a modular RT electronics box readily replaced. If, on the other hand, the failure is in the DSL, a line repairman can be dispatched. If the failure occurs in the LC, an appropriately skilled person may be dispatched to the central office facilities containing the LC's.

VI. RT Enclosure

The RT electronics will often be located in an unprotected environment at a user location. Access to various portions of the RT is desirably limited. FIGS. 14 and 15 illustrate an enclosure which will find particular application with the RT disclosed herein.

As shown in FIG. 14, the enclosure includes an RT electronics case 1402, a telephone company equipment compartment 1404, and a customer line compartment 1406. The three portions of the enclosure are mounted to, for example, a wall, pole, or any other convenient location via a mounting plate 1408.

The electronics case houses the PCB containing the various electronic components used in D/A and A/D conversion and generally illustrated in FIG. 2. The telephone company equipment compartment contains one or more terminal blocks connected to a drop wire 1410 containing one or more DSL's. The customer line compartment houses one or more customer blocks for connection of subscriber equipment lines 1412.

The electronics case is preferably a modular plug-in unit which lifts directly off of and away from the lower portions of the enclosure, as indicated by the arrow 1414. A door over the customer line enclosure is hinged to drop down in the direction of arrow 1416 and then out in the direction of arrow 1418. A door over the telephone company equipment enclosure 1404 is similarly hinged. A skirt 1420 extends outward and downward from the electronics case and over the telephone company equipment compartment and the customer line compartment so as to prevent the influx of rainfall and the like in one embodiment. In a preferred embodiment, the entire case is sized to fit over the doors, rendering the skirt unnecessary. Downward movement of the doors to the two compartments 1404 and 1406 allows overhang of the skirt 1420 while also allowing access to the two compartments without removal of the case 1402.

FIG. 15 illustrates the enclosure in greater detail with the case 1402 lifted from its base and with the two compartment doors open. The case 1402 is shown partially cut away. As shown, the case 1402 encloses PCB 1422 which contains the various components shown in FIG. 2 along with their interconnections. Interconnections to the terminal blocks in the telephone company compartment 1404 and customer compartment 1406 are made via a multiple conductor plug 1424 and socket 1426 of the type well known to those of skill in the art.

In one preferred embodiment, the PCB is mechanically connected to the case 1402 and lifts away from the connector 1426 when the case is lifted away therefrom. In most preferred embodiments, the multiple conductor socket is at least partially filled with an environmental sealant. A wide variety of sealants are available for this use, including, for example, hot melts, but preferably including epoxies and dielectric gels such as urethanes, silicones, and styrene-ethylene-butylene-styrenes, including those disclosed in U.S. Pat. Nos. 4,634,207, 4,600,261, 4,643,924, 4,865,905, 4,662,692, and 4,942,270, which are incorporated herein by reference for all purposes. Preferred gels used in conjunction with the present invention include those having a cone penetration value of 50 to $350 \times 10^{-1}$ mm, preferably 100 to $300 \times 10^{-1}$ mm, and most preferably 100 to $250 \times 10^{-1}$ mm. Preferred gels also have an ultimate elongation of at least 50%, preferably at least 100%, and most preferably at least 200%. Such gels may be utilized by forming the gel directly in the socket or in other forms such as with tape such as those sold under the name Gel-Tek TM by Raychem Corporation.

In preferred embodiments, the bottom portion of the case 1402 is sealed with a plate 1458, as shown in the cut-away portion of FIG. 15. Above the plate 1458, the case is further sealed with hot melt 1460. Preferably, the case is filled with between 1/64" and ⅛" hot melt or mastic, preferably having good adhesion to metal properties at low temperatures (e.g., 0° C.) and not becoming brittle at low temperatures. Hot melt suitable for this purpose is preferably type number S1149 made by Raychem Corporation. In preferred embodiments the bottom of the case is sealed with hot melt although gels such as those described in the above incorporated patents may be used in some embodiments.

The door of the telephone company compartment 1428 is mounted to a frame 1430 with drop hinges 1432. Drop hinges allow the door to move both upward and downward, as well as allowing the door to swing open and shut. The door 1438 includes a lip 1434 which extends under a customer equipment door 1436 when the doors are in the closed position. This prevents encroachment of water from rain, as well as other environmental encroachments.

Door 1428 is provided with a protected fastener 1438 which engages the frame 1430 at a mounting point 1440. The protected fastener is designed to limit customer access to the telephone company compartment 1404. Protected fasteners that will find use in conjunction with the invention include one-way screws, twisted wires with seals which are destroyed when the door 1428 is opened, key locks, screws with heads accessible only with specialized tools, and the like. By contrast, customer compartment door 1436 is fastened to the frame 1430 with a conventional and readily utilized fastener 1444, such as a conventional screw, bolt, wing nut, friction fitting, or the like. Accordingly, a customer is provided ready access to compartment 1406, while only the telephone company has ready access to compartment 1404.

In some embodiments case 1402 is held to the frame 1430 by only the socket 1426, although in some embodiments one or more bolts or other fasteners 1446 extend through the frame and into the case. As shown, one of the bolts is connected to the frame in the telephone company compartment 1404 and, accordingly, removal of the case is limited to only those having access to the compartment 1404.

Inside the telephone company compartment 1404, terminal blocks 1448 are mounted to frame 1430. Terminal block 1448 serves as an interface between socket 1426 and a twisted pair wire entering the customer facility. According to one preferred embodiment, the terminal block 1448 is a Raychem DTerminator TM, Protected DTerminator TM, or the like.

Inside the customer compartment 1406 a customer terminal block 1450 is mounted to frame 1430. Customer terminal block 1450 preferably includes both screwed terminal connections 1452 and modular, plug-in connections 1454. Customer terminal block 1450 serves as an interface between socket 1426 and wires leading to subscriber equipment in the customer's facility. In most preferred embodiments, both of terminal blocks 1448 and 1450 are protected with terminal block caps filled with a gel such as the gels used in the socket 1426.

In the particular embodiment shown in FIG. 15, the modular plug in connections 1454 such as RJ11 connections include a male and female side. In normal operation, the male and female portions are connected and telephone signals to the subscriber equipment are transmitted over two or more wire conductors therein. When it is desirable to perform maintenance or check the subscriber equipment at the RT, the male side is disconnected and the test equipment, such as a phone used for testing, is plugged into the female side of the plug. Upon completion of the testing activities, the male plug in the RT is reinserted into the female side, reestablishing a connection with the subscribers equipment.

The enclosure provides a customer ready access to portions of the RT which require customer service. At the same time, the enclosure provides reliable environmental protection to the electronics of the RT, as well as the interfaces to the DSL and subscriber lines. The RT electronics are compartmentalized in the case 1402 such that when a failure of the RT electronics is detected, the entire case is simply removed and replaced with a new unit. A switch 405 detects opening of the telephone company compartment and reports such conditions via the test system.

The case, the customer compartment and/or the telephone compartment may be provided with additional environmental sealing using, for example, the gels mentioned in conjunction with the socket 1426.

For example, according to one embodiment a strip of environmental sealant (a section of which is illustrated by reference numeral 1462) is provided around the edges of the frame where the frame meets the doors 1428 and 1436. According to further embodiments, a strip of environmental sealant is provided along the top perimeter of the frame where the frame will meet the case (as illustrated by the section of sealant 1464). Sealant 1466 may optionally be provided in the case 1402 against the PCB 1422 to provide shock resistance and corrosion resistance for the components therein.

In normal operation, the enclosure is utilized in the configuration shown in FIG. 14. If the subscriber needs access to the customer compartment, the fastener 1444 is disengaged, the door is dropped to the lower limits of the hinges, and the door is swung open. The subscriber removes terminal covers (if any) from the terminal block and performs any required operations to the customer compartment. Access to the telephone company compartment is restricted due to the fastener 1438. Similarly, removal of the case 1402 and attendant electronics is restricted because the subscriber cannot access the fastener 1446 in the compartment 1404.

If the telephone company requires access to the terminal blocks 1448, the restricted fastener 1438 is released, the door is dropped to the bottom limits of its hinges (to clear the skirt 1420) and the door is swung open. If a failure of the RT electronics is detected by the test system, the case is released from the frame 1430 by releasing the fasteners 1446. According to preferred embodiments, rather than attempting service of any individual electronic component of the RT the entire case, including the enclosed electronics and gel sealant, is removed from the frame and replaced with a new case and electronics. According to alternative embodiments, the case is sealed to the frame with a gasket or seal, and lifts away from the frame without the internal electronics. In such embodiments the gels described in the above-incorporated patents are used for sealing and are placed in a trough which is engaged by the bottom of the case. The RT PCB or any particular component thereon is then appropriately replaced or serviced.

In preferred embodiments, each of the internal electronics and interconnections in the customer accessible compartment and telephone company accessible compartment are sealed individually, rendering sealing of the doors unnecessary. The frame is preferably self draining to weep holes or the like, preventing accumulation of moisture in the enclosure.

The enclosure and its various components may be made from any one of a wide variety of materials. Preferred among such materials are sheet metal, plastic, and the like.

FIG. 16 illustrates one embodiment of the bottom portion of the RT enclosure in greater detail. As shown the telephone company compartment encloses terminal block 1448. The terminal block 1448 is preferably formed with an upper portion 1602 and a lower portion 1604. The upper portion is shown in FIG. 16 with a cover thereon which encloses one or more of the above-described gels. The lower portion 1604 provides a connection to the drop wires.

The telephone company compartment further includes a maintenance interface 1606 such as a five-pin plug, as well as indicator lights 403.

In the customer compartment 1406, terminal block 1452 is shown with a gel-filled cover 1608 thereon. In the preferred embodiment shown in FIG. 16, wires need not extend from the male side of the RJ11 connector, using the "dummy" male connector described below. Optionally, a grasping means, such as a stiff plastic string 1610, is connected to the male side of the "dummy" RJ11 test connection, allowing it to be easily removed from the female side.

VII. Test Access Port

FIG. 17 illustrates the test port 1454 in greater detail according to one embodiment of the invention. In the particular embodiment shown in FIG. 17 the port includes a female, preferably RJ11, socket or jack 1702 and a male plug 1704. The male plug is inserted into the female socket for normal operation of the system by a subscriber. During testing operations, such as when service personnel desire to connect a phone at the RT for monitoring operations at the RT, the male dummy plug is removed and a conventional RJ11 connector is inserted into the female side 1702.

In the embodiment shown in FIG. 17 a RJ11 plug is used which contains six connectors such as 1706a, 1706b, 1706c, 1706d, 1706e, and 1706f. In the embodiment shown in FIG. 17 the third contact 1706c is the ring wire which provides signals which ultimately are generated at the CO. Similarly, the fourth contact 1706d is the tip contact which provides signals which are ultimately generated at the CO. In the particular embodiment shown in FIG. 17 the first contact 1706a is connected to the ring line which leads into the home, office, or other subscriber facility. The sixth contact 1706f is connected to the tip line which leads into the home, office, or other subscriber facility.

The male RJ11 plug 1704 is referred to herein as a "dummy" connection because it does not contain wires that extend from the male connection to subscriber equipment or elsewhere. The dummy male connector preferably includes slots 1708a-f for receiving the contacts 1706a-f. A first conductor 1710 such as a copper or aluminum strip or wire 1710 inside the male RJ11 electrically connects the first pin 1706a and the third pin 1706c of the female RJ11 when the male plug is inserted into the female plug. Similarly a second conductor 1712 in the male RJ11 electrically connects the fourth pin 1706d and the sixth pin 1706f of the female RJ11 when the male plug is inserted. It will be recognized that the conductors 1712 and 1710 could take on any one of a number of forms such as wires, deposited metal, separate metal strips, or the like. Accordingly, when the dummy male RJ11 is inserted into the female RJ11, a tip connection and ring connection between the subscriber facility and the CO (via the RT in the particular embodiment herein) is established.

Since wires need not extend from the body of the male RJ11 to an external location, environmental sealing is greatly simplified. Accordingly, in preferred embodiments gels such as those described in the above incorporated patents are provided in one or more of the inside of the female RJ11 1702, the inside portion of the male RJ11 1704, a trench 1714 around the perimeter of the female RJ11, and/or a trench formed by a cap 1716 around the male RJ11. For merely the purpose of illustration herein, the gel is shown only in the trench 1714 and in the cap 1716. In most preferred embodiments, the gel is provided only in the trench surrounding the female socket, while the cap around the male plug forms an edge lip which engages the gel in the female trench when the two are mated. In this most preferred embodiment the user has minimal contact with gel in the test plug. Alternatively, sealing means as taught in EPO Publication No. 0 213 874, Mar. 11, 1987 ("Corrosion Protection Apparatus") may be utilized, which is incorporated herein by reference (EP Application 86306401.0, Aug. 19, 1986, priority from USSN 767,555, filed Aug. 20, 1985).

FIGS. 18a and 18b illustrate the electrical connections made during test and normal operations modes, respectively, with the RJ11 arrangement herein. As shown in FIG. 18a during test operations a conventional RJ11 plug is used to connect test equipment to the tip and ring lines ultimately leading to the CO. The tip and ring lines leading to the home or office are disconnected. As shown in FIG. 18b when the male dummy plug 1704 is installed, the ring line leading to the CO is directly connected to the ring line leading into the house, and the tip line leading to the CO is directly connected to the tip line leading to the house.

VIII. Power Management

The system described above provides multiple-line telephone services to a user over a single twisted pair without the need to provide a battery or other current source at the RT. At the same time, the system maintains the line power within the limits proscribed by TR-TSY-000057 standard AII in a standby mode and AIII during active line use. In preferred embodiments the RT microprocessor is operated at a relatively slow speed (e.g., 4 MHz or less) as compared to the LC processor, which may be operated at relatively higher speeds (e.g., 11 MHz or more) for power conservation at the RT, particularly during "idle" periods.

Table 3 illustrates the power usage of the various components in the system according to one embodiment in a standby mode, an active mode, a 1-ring mode, and a 1-active, 1-ring mode. The data illustrated in Table 3 are based on a 16500-foot twisted pair using 26-gauge wire plus 1500 feet of 24-gauge wire. Table 3 illustrates that by use of the method/apparatus disclosed herein, in the standby mode the system is well within AII limits. Specifically, about 430 milliwatts may readily be provided in a typical system while remaining in AII limits, while only 373 milliwatts are needed during standby. Similarly, the 2302 milliwatts needed for 1-ring and 1-active signals are well within the amount of power which may be provided while staying within the time-dependent AIII limits.

TABLE 3

| | System Power Use (milliwatts) | | | |
|---|---|---|---|---|
| | Mode | | | |
| Component | Standby | 2-Active | 1-Ring | 1-Active, 1-Ring |
| Microprocessor | 25 | 25 | 25 | 25 |
| ICC | 3 | 3 | 3 | 3 |
| IECQ | 300 | 300 | 300 | 300 |
| SICOFI | 3 | 120 | 120 | 120 |
| SLIC | 42 | 90 | 42 | 66 |
| Loop | 0 | 1176 | 0 | 588 |
| Ring | 0 | 0 | 1200 | 1200 |
| TOTAL: | 373 | 1714 | 1690 | 2302 |

IX. Conclusion

The inventions claimed herein provide a substantially improved method and device for transmitting voice and data signals over a single twisted pair. It is to be understood that the above description is intended to be illustrative and not restrictive. Many embodiments will be apparent to those of skill in the art upon reviewing the above description. By way of example the inventions herein have been illustrated primarily with regard to transmission of voice and data signals (POTS), but they are not so limited. For example, the inventions could be applied in the transmission and reception of other types of signals such as radio and TV signals, telephoto, teletype, facsimile, and other electromagnetic and/or optical signals. By way of further example, the inventions have been illustrated above with reference to the simultaneous transmission of two signals over a single twisted pair, but the inventions could be extended to transmit three or more signals simultaneously over a single twisted pair. By way of still further example, the invention has been illustrated in conjunction with specific integrated circuits and operating speeds, but the invention is not so limited. By way of still further example, the specific connectors and the roles of the male and female connectors disclosed herein could readily be reversed or altered. The scope of the inventions should, therefore, be determined not with reference to the above description, but should instead be determined with reference to the appended claims, along with the full scope of equivalents to which such claims are entitled by the ordinary skilled artisan.

What is claimed is:

1. A test system for a digital main line system, said digital main line system including a line card for conversion of analog signals to digital signals and a remote terminal for conversion of said digital signals to analog signals for use in subscriber telephonic equipment, said digital main line system adapted to transmit multiple telephonic signals in digital form from said line card to said remote terminal location over a single twisted pair, comprising:
   a) a remote terminal emulator at central office facilities for performing a line card test, said remote terminal emulator emulating output of said remote terminal with a predefined output pattern; and
   b) means for comparing a response of said line card to emulated output of said remote terminal emulator so as to detect failures in said line card.

2. The test system as recited in claim 1 further comprising a voltage source and current meter attachable to said twisted pair for performing a twisted pair test, said voltage source and current meter adapted to detect failures in said twisted pair.

3. The test system as recited in claims 1 or 2 further comprising:
   a) a line card emulator for performing a remote terminal test, said line card emulator emulating output of said line card for transmission over said twisted pair; and
   b) means for applying and detecting terminations at said remote terminal, so as to detect failures in said remote terminal.

4. The test system as recited in claims 1 or 2 further comprising means for performing a channel test, said means for performing a channel test comprising:
   a) a voice frequency emulator, said voice frequency emulator connected to said line card for conversion to a digital signal for transmission over said twisted pair to said remote terminal; and
   b) means for evaluating a returned reflected signal so as to evaluate the function of the line card, the twisted pair and the remote terminal.

5. The test system as recited in claim 3 further comprising logic means in said test system for determining a location of a failure in said line card, said twisted pair, and said remote terminal.

6. The test system as recited in claim 4 further comprising logic means in said test system for determining a location of a failure in said line card, said twisted pair, and said remote terminal.

7. The test system as recited in claim 2 further comprising a pair gain test controller interface to said test system, said interface adapted to receive test request information from a PGTC, test selected portions of said digital added main line system, and output a resistive signature to said PGTC.

8. The test system as recited in claim 1 further comprising means for serially connecting a plurality of line cards at said central office facilities to said remote terminal emulator so as to detect failures in said plurality of line cards.

9. The test system as recited in claim 2 further comprising means for serially connecting a plurality of twisted pairs to said voltage source current meters so as to detect failures in said plurality of twisted pairs.

10. The test system as recited in claim 3 further comprising means for serially connecting a plurality of remote terminals to said line card emulator so as to detect failures in said plurality of remote terminals.

11. The test system as recited in claim 1 wherein said response of said line card indicates a failure in said line card when an analog to digital conversion portion of said line card is inoperative.

12. The test system as recited in claim 3 wherein said terminations are indicative of a failure in said remote terminal when an analog to digital conversion portion of said remote terminal is inoperative.

13. The test system as recited in claim 1 further comprising an operating system interface for communicating indications of failures in said line card to a telephone company operating system.

14. The test system as recited in claim 5 wherein said logic means comprises first and second microprocessors, said first microprocessor programmed to act as an input/output control device and said second microprocessor programmed to manage tests of at least said line card.

15. The test system as recited in claim 5 wherein said means for determining a location is programmed to:
   a) perform said channel test, said channel test testing the functionality of all of said remote terminal, twisted pair, and line card;
   b) if said channel test is not successful, perform said line card test using said remote terminal emulator, and perform said twisted pair test using said voltage source current meter; and
   c) if said twisted pair test is successful, perform said remote terminal test using said line card emulator.

16. The test system as recited in claim 15 wherein said means for detecting a location is further programmed to test whether one or more lines of said digital added main line system are in use before performing said channel test.

17. The test system as recited in claim 4 wherein said test system is programmed to perform said channel test by the steps of:
   a) selecting a line;
   b) disconnecting the selected line from a telephone exchange;
   c) performing a test request message test;
   d) performing an absorbent test of the selected line;
   e) performing an on-hook test of the selected line;
   f) performing a ring test of the selected line; and
   g) performing a reflective test of the selected line.

18. The test system as recited in claim 3 wherein said test system is programmed to perform said remote terminal test by the steps of:
   a) connecting said line card emulator to a selected line;
   b) connecting a remote terminal on said selected line to an absorbent load;
   c) connecting a voice frequency generator to said line card emulator; and
   d) reading a reflected voltage on said selected line and comparing the reflected voltage to a reference voltage so as to determine if said remote terminal is functioning.

19. The test system as recited in claim 18 wherein said test system is further programmed to:
   a) perform an on-hook test of said remote terminal;
   b) perform a ring request of said remote terminal; and
   c) perform a reflective test of said remote terminal.

20. The test system as recited in claim 5 wherein said test system further comprises:
   a) means for applying a first voltage to a tip wire of said twisted pair;
   b) means for measuring a current to said tip wire;
   c) means for applying said first voltage to a ring wire of said twisted pair;
   d) means for measuring a current to said ring wire;
   e) means for ground said ring wire and applying said first voltage to said ring wire; and
   f) means for grounding said tip wire and applying said first voltage to said ring wire; and
   g) means for applying a second voltage to said tip wire, said ring wire grounded, said second voltage activating a maintenance termination unit in said remote terminal.

21. A method of testing a digital added main line, said digital added main line comprising a line card for conversion of multiple analog signals at a local exchange to digital signals for transmission over a single twisted pair to a subscriber location, and a remote terminal for conversion of said digital signals to analog signals for use by subscriber equipment, said method comprising the steps of:
   a) emulating an analog signal at an input to said line card;
   b) converting said emulated analog signal to a digital signal for transmission over said twisted pair to said remote terminal;
   c) converting said digital signal at said remote terminal to an analog signal and retransmitting a reflected signal to said line card; and
   d) comparing said reflected signal to a reference standard, a deviation from said standard indicating a failure in at least one of said line card, said remote terminal, and said twisted pair.

22. The method as recited in claim 21 further comprising the step of testing said line card, said step of testing said line card comprising the steps of:
   a) connecting a remote terminal emulator to an output of said line card, said remote terminal emulator emulating a response of a functional remote terminal to digital signals from said line card;
   b) emulating an analog signal at an input to said line card;
   c) converting said emulated analog signal to a digital signal for transmission to said remote terminal emulator;
   d) converting said digital signal at said remote terminal emulator to an analog signal and retransmitting a reflected signal to said line card; and e) comparing said reflected signal to a reference standard, a deviation from said standard indicating a failure in said line card.

23. The method as recited in claim 21 further comprising the step of testing said twisted pair, said step of testing said twisted pair further comprising the steps of:
   a) applying a first voltage to a tip wire of said twisted pair, said first voltage not activating a maintenance termination unit in said remote terminal;
   b) measuring a current to said tip wire;
   c) applying said first voltage to said tip wire with said ring wire grounded; and
   d) measuring a current to said tip wire.

24. The test system as recited in claim 21 further comprising the step of testing said remote terminal, said step of testing said remote terminal further comprising the steps of:
   a) connecting a line card emulator to said twisted pair, said line card emulator emulating output of a functioning line card;
   b) connecting an absorbent load at an output of said remote terminal;
   c) transmitting a signal to said remote terminal and reading a reflected voltage from said line card;
   d) disconnecting said absorbent load at said remote terminal;
   e) connecting a reflective termination to an output of said remote terminal; and
   f) reading a reflected voltage from said line card.

25. A method of testing a digital added main line, said digital added main line comprising a line card for conversion of multiple analog signals at a local exchange to digital signals for transmission over a single twisted pair to a subscriber location, and a remote terminal for conversion of said digital signals to analog signals for use by subscriber equipment, said method comprising the steps of:
   a) performing a channel test of said digital added main line, said channel test testing all of said line card, said remote terminal, and said twisted pair;
   b) performing a test of said line card using emulated remote terminal output;
   c) performing a test of said twisted pair; and
   d) performing a test of said remote terminal using emulated line card output.

26. A method of testing a digital added main line, said digital added main line comprising a line card for conversion of multiple analog signals at a local exchange to digital signals for transmission over a single twisted pair to a subscriber location, and a remote terminal for conversion of said digital signals to analog signals for use by subscriber equipment, said method comprising the steps of:
   a) performing a channel test of said digital added main line, said channel test testing all of said line card, said remote terminal, and said twisted pair, said channel test comprising the steps of:
      i) connecting a reflective load to an output of said remote terminal;
      ii) emulating an analog signal to an input of said line card; and
      iii) comparing a reflected signal at said line card to a reference value;
   b) performing a test of said line card using emulated remote terminal signals, said test of said line card comprising the steps of:
      i) connecting a remote terminal emulator to an output of said line card;
      ii) connecting a remote terminal emulator to an output of said remote terminal emulator;
      iii) emulating an analog signal to an input of said line card;
      iv) comparing a reflected signal at said line card to a reference value;
   c) performing a test of said twisted pair, said test of a twisted pair comprising the steps of:
      i) applying a first voltage to a first wire of said twisted pair;
      ii) measuring a current to said first wire;
      iii) applying said first voltage to said first wire with a second wire grounded; and
      iv) measuring a current to said first wire;
   d) performing a test of said remote terminal using emulated line card output, said test of said remote terminal comprising the steps of:
      i) emulating output of a line card to an input of said remote terminal; and
      ii) comparing a reflected voltage from said remote terminal to a reference standard.

27. A test system for a digital main line system, said digital main line system including a line card for conversion of analog signals to digital signals and a remote terminal for conversion of said digital signals to analog signals for use in subscribed telephonic equipment, said digital main line system adapted to transmit multiple telephonic signals in digital form from said line card to said remote terminal over a single twisted pair, comprising:
   a) a line card emulator at central office facilities for performing a remote terminal test, said line card emulator emulating output of said line card with a defined data pattern;
   b) means for comparing a response of said remote terminal to emulated output of said line card emulator so as to detect failures in said remote terminal.

28. An enclosure for telecommunications equipment comprising:
   a) a frame, said frame defining a limited access region and an accessible region, said limited access region comprising limited access telephone line connections, said accessible region comprising accessible telephone line connections;
   b) a first cover over said limited access region, said cover permitting access to said limited access region upon release of an access restrictive fastener;
   c) a second cover over said accessible region, said second cover permitting access to said accessible region upon release of a second fastener; and
   d) a components case, said component case enclosing at least one electronics component for processing signals from and to said limited access telephone line connections and said accessible telephone line connections, said component attached to said accessible telephone line connections and said limited access telephone line connections with a socket and plug assembly.

29. The enclosure as recited in claim 28 wherein said components case is secured to said frame with at least one fastener in said limited access region.

30. The enclosure as recited in claim 28 wherein said at least one component for processing signals comprises a circuit board for conversion of digital signals from a twisted pair to analog signals for use in subscriber telephone equipment.

31. The enclosure as recited in claim 25 wherein said components case is secure to said at least one of said components, said components removed from said socket upon removal of said case.

32. The enclosure as recited in claim 28 wherein said first and second covers comprise hinged doors.

33. The enclosure as recited in claim 32 wherein said components case comprises a skirt extending downward over said doors, said doors hinged to move downward away from said skirt upon release of said fasteners.

34. The enclosure as recited in claim 28 further comprising a seal for limiting ingress of environmental contaminants to said case.

35. The enclosure as recited in claim 28 wherein said components case further comprises an environmental sealing material over at least one opening thereof.

36. The enclosure as recited in claim 35 wherein said environmental sealing material comprises a hot melt.

37. The enclosure as recited in claim 36 wherein said hot melt is S1149.

38. The enclosure as recited in claim 28 further comprising a gel seal in said socket and plug assembly.

39. The enclosure as recited in claim 38 wherein said gel is selected from the group of urethanes, silicones, and styrene-ethylene-butylene-styrenes.

40. The enclosure as recited in claim 38 wherein said gel has a cone penetration value of between about 50 and $350 \times 10^{-1}$ mm and an ultimate elongation of at least 50%.

41. The enclosure as recited in claim 40 wherein said gel has a cone penetration value of between about 100 to $300 \times 10^{-1}$ mm.

42. The enclosure as recited in claim 40 wherein said gel has a cone penetration value of between about 100 to $250 \times 10^{-1}$ mm.

43. The enclosure as recited in claim 40 wherein said gel has an ultimate elongation of at least 100%.

44. The enclosure as recited in claim 40 wherein said gel has an ultimate elongation of at least 200%.

45. The enclosure as recited in claim 28 further comprising a switch for detection of an open condition of said first cover.

46. An environmental enclosure for protection of electronic equipment used for analog to digital telephonic signals at a subscriber location, comprising:
   a) a frame, said frame partially enclosing a telephone company twisted pair block and a user terminal block for connection of subscriber equipment;
   b) a first hinged door for enclosing said twisted pair block, said hinged door securable to said frame with a fastener, said fastener limiting access of a subscriber to said twisted pair block;
   c) a second hinged door for enclosing said block for connection of subscriber equipment, said first and said second hinged doors rotatable about an axis and slidable along said axis from a first position to a second position;
   d) an electronics board case, said electronics board case electrically connectable to said block for connection of subscriber equipment and said twisted pair block with a socket and plug assembly on top of said frame, said electronics board case secured to said frame mechanically with at least one fastener accessible from a region enclosed by said first hinged door.

47. Apparatus for connecting first and second telephone lines alternately to a subscriber location and to test equipment comprising:
   a) a first connection means containing first, second, third, and fourth electrical conductors, said first and second electrical conductors providing telephone signals, said third and fourth conductors electrically connectable to subscriber equipment, said connection means connectable to said test equipment; and
   b) a second connection means connectable with said first connection means, said connection means comprising a first shunt conductor for connecting said first and said third conductors, and a second shunt conductor for connecting said second and said fourth conductors.

48. Apparatus as recited in claim 47 wherein said first connection means is an RJ11 socket.

49. Apparatus as recited in claim 48 further comprising said test equipment, said test equipment further comprising a RJ11 plug.

50. Apparatus as recited in claim 47 wherein said second connection means is shaped in the form of an RJ11 plug.

51. Apparatus as recited in claim 50 wherein:
   a) said first connection means is an RJ11 socket;
   b) said first shunt conductor electrically connects first and third terminals in said RJ11 socket;
   c) said second shunt conductor connects fourth and sixth terminals in said RJ11 socket.

52. Apparatus as recited in claim 47 wherein said second connection means contains no conductors extending out of a body of said second connection means.

53. Apparatus as recited in claim 47 further comprising sealing means for environmentally protecting said first connection means.

54. Apparatus as recited in claim 53 wherein said sealing means comprises a gel in at least one of said first connection means or said second connection means.

55. Apparatus as recited in claim 53 wherein said gel has a cone penetration value of 50 to $350 \times 10^{-1}$ mm and an ultimate elongation of at least 50%.

56. Apparatus as recited in claim 53 wherein said gel has a cone penetration value of 100 to $300 \times 10^{-1}$ mm and an ultimate elongation of at least 100%.

57. Apparatus as recited in claim 53 wherein said gel has a cone penetration value of 100 to $250 \times 10^{-1}$ mm and an ultimate elongation of at least 200%.

58. Apparatus as recited in claim 54 wherein at least a portion of said gel is located in a trench around said first connection means.

59. Apparatus as recited in claim 54 wherein at least a portion of said gel is located in a trench around said second connection means.

60. Apparatus as recited in claim 54 wherein said second connection means is a plug, said trench formed by a cap around said plug.

61. Apparatus as recited in claim 60 wherein said plug is a male RJ11 compatible plug.

62. A service module for alternately connecting subscriber tip and ring lines and service means comprising:
   a) an RJ11 socket;
   b) a first electrical conductor connecting a first terminal of said female RJ11 to a tip line in a subscriber location;
   c) a second electrical conductor connecting a second terminal of said female RJ11 to a ring line in a subscriber location;
   d) a third electrical conductor connecting a third terminal of said female RJ11 to a means for providing tip signals from a telephone switch;

e) a forth electrical conductor connecting a fourth terminal of said female RJ11 to a means for providing ring signals from a telephone switch; and
f) an RJ11 plug insertable in said female RJ11 socket, said RJ11 plug comprising:
   i) a first shunt conductor for connecting said first electrical conductor and said third electrical conductor; and
   ii) a second shunt conductor for connecting said second electrical conductor and said fourth electrical conductor when said RJ11 plug is inserted in said RJ11 socket.

63. Apparatus as recited in claim 62 wherein said RJ11 plug contains no conductors extending out of a body thereof.

64. Apparatus as recited in claim 62 further comprising sealing means for environmentally protecting said RJ11 socket.

65. Apparatus as recited in claim 64 wherein said sealing means comprises in at least one of said RJ11 plug or socket.

66. Apparatus as recited in claim 65 wherein said gel has a cone penetration value of 50 to $350 \times 10^{-1}$ mm and an ultimate elongation of at least 50%.

67. Apparatus as recited in claim 65 wherein said gel has a cone penetration value of 100 to $300 \times 10^{-1}$ mm and an ultimate elongation of at least 100%.

68. Apparatus as recited in claim 65 wherein said gel has a cone penetration value of 100 to $250 \times 10^{-1}$ mm and an ultimate elongation of at least 200%.

69. Apparatus as recited in claim 65 wherein at least a portion of said gel is located in a trench around said first connection means.

70. Apparatus as recited in claim 65 wherein at least a portion of said gel is located in a trench around said RJ11 plug.

71. Apparatus as recited in claim 65 wherein said trench is formed by a cap around said plug.

* * * * *